US010329179B2

(12) United States Patent
Huang

(10) Patent No.: US 10,329,179 B2
(45) Date of Patent: Jun. 25, 2019

(54) ZERO VALENT IRON SYSTEMS AND METHODS FOR TREATMENT OF CONTAMINATED WASTEWATER

(71) Applicant: The Texas A&M University System, College Station, TX (US)

(72) Inventor: Yongheng Huang, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 14/836,790

(22) Filed: Aug. 26, 2015

(65) Prior Publication Data

US 2016/0052808 A1 Feb. 25, 2016

Related U.S. Application Data

(63) Continuation-in-part of application No. 13/509,963, filed as application No. PCT/US2010/049528 on Sep.
(Continued)

(51) Int. Cl.

| | |
|---|---|
| ***C02F 1/70*** | (2006.01) |
| ***B01J 20/30*** | (2006.01) |
| ***B01J 20/02*** | (2006.01) |
| ***B01J 20/06*** | (2006.01) |
| *C02F 103/18* | (2006.01) |

(Continued)

(52) U.S. Cl.
CPC ........... *C02F 1/705* (2013.01); *B01J 20/0229* (2013.01); *B01J 20/06* (2013.01); *B01J 20/3085* (2013.01); *C02F 1/281* (2013.01); *C02F 2101/10* (2013.01); *C02F 2101/106* (2013.01); *C02F 2101/108* (2013.01); *C02F 2101/12* (2013.01); *C02F 2101/163* (2013.01); *C02F 2101/20* (2013.01); *C02F 2101/203* (2013.01); *C02F 2101/22* (2013.01); *C02F 2101/36* (2013.01); *C02F 2103/18* (2013.01); *Y02W 10/37* (2015.05)

(58) Field of Classification Search
None
See application file for complete search history.

(56) References Cited

U.S. PATENT DOCUMENTS

| | | |
|---|---|---|
| 4,599,177 A | 7/1986 | Hayashi et al. |
| 5,389,262 A | 2/1995 | Guess |

(Continued)

FOREIGN PATENT DOCUMENTS

| | | |
|---|---|---|
| CN | 1861093 A | 11/2006 |
| CN | 1926071 A | 3/2007 |

(Continued)

OTHER PUBLICATIONS

Chu et al. (Treatment Technology Summary for Critical Pollutants of Concern in Power Plant Wastewaters, 2007, pp. 1-88).*

(Continued)

*Primary Examiner* — Clare M Perrin
(74) *Attorney, Agent, or Firm* — Christensen O'Connor Johnson Kindndess PLLC

(57) ABSTRACT

Hybrid zero-valent iron systems and methods for treating a fluid containing a contaminant that removes or reduces the concentration of contaminants, such as toxic metals, metalloids, oxyanions, and dissolved silica.

21 Claims, 26 Drawing Sheets

Related U.S. Application Data 20, 2010, now abandoned, application No. 14/836,790, filed on Aug. 26, 2015, which is a continuation-in-part of application No. 13/071,343, filed on Mar. 24, 2011, which is a continuation-in-part of application No. PCT/US2010/049528, filed on Sep. 20, 2010.

(60) Provisional application No. 62/042,140, filed on Aug. 26, 2014, provisional application No. 61/243,875, filed on Sep. 18, 2009, provisional application No. 61/357,466, filed on Jun. 22, 2010, provisional application No. 61/351,194, filed on Jun. 3, 2010.

(51) Int. Cl.

| | |
|---|---|
| *C02F 101/10* | (2006.01) |
| *C02F 101/36* | (2006.01) |
| *C02F 101/20* | (2006.01) |
| *C02F 101/22* | (2006.01) |
| *C02F 101/16* | (2006.01) |
| *C02F 101/12* | (2006.01) |
| *C02F 1/28* | (2006.01) |

(56) References Cited

U.S. PATENT DOCUMENTS

| | | | | |
|---|---|---|---|---|
| 5,620,607 | A | 4/1997 | Bowie, Jr. | |
| 5,635,073 | A | 6/1997 | Aktor | |
| 5,798,043 | A | 8/1998 | Khudenko | |
| 5,833,388 | A | 11/1998 | Edwards | |
| 5,975,800 | A | 11/1999 | Edwards | |
| 6,093,328 | A * | 7/2000 | Santina | C02F 1/5245 210/679 |
| 6,132,623 | A | 10/2000 | Nikolaidis | |
| 6,207,114 | B1 | 3/2001 | Quinn | |
| 6,254,786 | B1 | 7/2001 | Carpenter | |
| 6,322,701 | B1 | 11/2001 | Delighiannis | |
| 6,358,396 | B1 | 3/2002 | Gu | |
| 6,432,693 | B1 | 8/2002 | Hince | |
| 6,531,065 | B2 | 3/2003 | Gurol | |
| 6,719,902 | B1 | 4/2004 | Alvarez | |
| 6,761,827 | B2 | 7/2004 | Coffey | |
| 6,770,483 | B2 | 8/2004 | Lyon | |
| 6,833,075 | B2 | 12/2004 | Hughes | |
| 6,921,477 | B2 | 7/2005 | Wilhelm | |
| 6,942,807 | B1 | 9/2005 | Meng | |
| 6,982,040 | B2 | 1/2006 | Costa | |
| 7,008,964 | B2 | 3/2006 | Clausen | |
| 7,025,887 | B1 | 4/2006 | Kirts | |
| 7,147,786 | B2 | 12/2006 | Costa | |
| 7,160,465 | B2 | 1/2007 | Kirts | |
| 7,201,841 | B2 | 4/2007 | Hughes | |
| 7,238,278 | B2 | 7/2007 | Coffey | |
| 7,255,793 | B2 | 8/2007 | Cort | |
| 7,320,761 | B2 | 1/2008 | Costa | |
| 7,329,349 | B2 | 2/2008 | Hill | |
| 7,393,452 | B2 | 7/2008 | Tay | |
| 7,470,369 | B2 | 12/2008 | Diallo | |
| 7,476,324 | B2 | 1/2009 | Ciampi | |
| 7,531,089 | B2 | 5/2009 | Mankiewicz | |
| 7,540,966 | B2 | 6/2009 | Costa | |
| 7,572,378 | B2 | 8/2009 | Rosen | |
| 7,575,682 | B2 | 8/2009 | Olsta | |
| 7,611,637 | B2 | 11/2009 | Zhang | |
| 7,758,755 | B2 | 7/2010 | Diallo | |
| 7,785,468 | B2 | 8/2010 | Baseeth | |
| 7,850,854 | B2 | 12/2010 | Gurol | |
| 7,854,330 | B2 | 12/2010 | Olsta | |
| 7,897,049 | B2 | 3/2011 | Ghosh | |
| 8,025,800 | B2 | 9/2011 | Kane | |
| 8,048,317 | B2 | 11/2011 | Rima | |
| 8,057,675 | B2 | 11/2011 | Baseeth | |
| 8,057,682 | B2 | 11/2011 | Hoag | |
| 8,071,055 | B2 | 12/2011 | Newcombe | |
| 8,080,163 | B2 | 12/2011 | Moller | |
| 8,101,087 | B2 | 1/2012 | Kane | |
| 8,114,279 | B2 | 2/2012 | Jin | |
| 2003/0132160 | A1 | 7/2003 | Khudenko | |
| 2003/0196961 | A1 | 10/2003 | Santina | |
| 2004/0134857 | A1 | 7/2004 | Huling | |
| 2005/0051493 | A1 | 3/2005 | Hensman | |
| 2005/0103707 | A1 | 5/2005 | Olsta | |
| 2005/0133458 | A1* | 6/2005 | Gurol | C02F 1/32 210/748.13 |
| 2006/0032803 | A1 | 2/2006 | Costa | |
| 2006/0049091 | A1 | 3/2006 | Cheetham | |
| 2006/0175266 | A1 | 8/2006 | Rima | |
| 2006/0249465 | A1* | 11/2006 | Jin | A61L 9/16 210/764 |
| 2006/0286888 | A1 | 12/2006 | Dlsta | |
| 2006/0289349 | A1 | 12/2006 | Hughes | |
| 2007/0039894 | A1* | 2/2007 | Cort | C02F 1/488 210/695 |
| 2007/0119785 | A1 | 3/2007 | Englehardt | |
| 2007/0158275 | A1 | 7/2007 | Zhang | |
| 2007/0163958 | A1 | 7/2007 | Newcombe et al. | |
| 2007/0181511 | A1 | 8/2007 | Smith | |
| 2007/0209989 | A1 | 9/2007 | Hayashi | |
| 2007/0227981 | A1 | 10/2007 | Olsta | |
| 2007/0241063 | A1 | 10/2007 | St-Laurent | |
| 2007/0256985 | A1 | 11/2007 | Zhao | |
| 2008/0073280 | A1 | 3/2008 | Cort | |
| 2008/0073281 | A1 | 3/2008 | Cort | |
| 2008/0073282 | A1 | 3/2008 | Cort | |
| 2008/0073283 | A1 | 3/2008 | Cort | |
| 2008/0073284 | A1 | 3/2008 | Cort | |
| 2008/0135491 | A1 | 6/2008 | Cort | |
| 2008/0161184 | A1 | 7/2008 | Tseng | |
| 2008/0185341 | A1 | 8/2008 | Diallo | |
| 2008/0264876 | A1* | 10/2008 | Block | B09C 1/002 210/759 |
| 2008/0311288 | A1 | 12/2008 | Dong | |
| 2009/0127208 | A1 | 5/2009 | Berkowitz | |
| 2009/0191084 | A1 | 7/2009 | Liskowitz | |
| 2009/0200233 | A1 | 8/2009 | Bergendahl | |
| 2009/0200246 | A1 | 8/2009 | King | |
| 2009/0272698 | A1 | 11/2009 | Hill | |
| 2009/0298165 | A1 | 12/2009 | Wiedemann | |
| 2010/0126944 | A1 | 5/2010 | Braida | |
| 2010/0126945 | A1 | 5/2010 | Patel | |
| 2010/0140185 | A1 | 6/2010 | Hill | |
| 2010/0147769 | A1 | 6/2010 | Kane | |
| 2010/0227381 | A1 | 9/2010 | Hoag | |
| 2010/0276360 | A1 | 11/2010 | Smith | |
| 2010/0282690 | A1 | 11/2010 | Padmanabhan | |
| 2010/0307980 | A1 | 12/2010 | Tranter | |
| 2011/0000854 | A1 | 1/2011 | Nichols | |
| 2011/0017671 | A1 | 1/2011 | Alley, Jr. | |
| 2011/0094972 | A1 | 4/2011 | King | |
| 2011/0114563 | A1 | 5/2011 | Kane | |
| 2011/0120929 | A1 | 5/2011 | Ghosh | |
| 2011/0139726 | A1 | 6/2011 | Jin | |
| 2011/0174743 | A1 | 7/2011 | Huang | |
| 2011/0309021 | A1 | 12/2011 | Jin | |
| 2011/0309023 | A1 | 12/2011 | Kane | |
| 2012/0055873 | A1 | 3/2012 | Hoag | |

FOREIGN PATENT DOCUMENTS

| | | | |
|---|---|---|---|
| WO | 95/06004 | A1 | 3/1995 |
| WO | 95/06005 | A1 | 3/1995 |
| WO | 98/49106 | A1 | 11/1998 |
| WO | 99/28243 | A1 | 6/1999 |
| WO | 99/65830 | A1 | 12/1999 |
| WO | 2004/071960 | A2 | 8/2004 |
| WO | 2004/099093 | A1 | 11/2004 |
| WO | 2005/014482 | A2 | 2/2005 |
| WO | 2005/042412 | A1 | 5/2005 |
| WO | 2005/102942 | A1 | 11/2005 |
| WO | 2006/065825 | A2 | 6/2006 |
| WO | 2007/092914 | A2 | 8/2007 |

(56) References Cited

FOREIGN PATENT DOCUMENTS

| | | | |
|---|---|---|---|
| WO | 2008/039936 | A2 | 4/2008 |
| WO | 2008/119063 | A1 | 10/2008 |
| WO | 2008/136814 | A2 | 11/2008 |
| WO | 2011/035263 | A2 | 3/2011 |
| WO | 2011/046943 | A1 | 4/2011 |
| WO | 2011/056203 | A2 | 5/2011 |

OTHER PUBLICATIONS

Zhang et al. (Journal of Environmental Quality, 2005, 34, p. 487).*

Huang et al. (Journal of Environmental Quality, 2003, 32, 1306-1315).*

Cahan, B.D., and C.-T. Chen, "The Nature of the Passive Film on Iron. III. The Chemi-Conductor Model and Further Supporting Evidence," Journal of The Electrochemical Society 129(5) 921-925,1982.

Huang, Y.H., and T.C. Zhang, "Effects of Dissolved Oxygen on Formation of Corrosion Products and Concomitant Oxygen and Nitrate Reduction in Zero-Valent Iron Systems With or Without Aqueous $Fe^{2+}$," Water Research 39(9)1751-1760, May 2005.

Huang, Y.H., and T.C. Zhang, "Enhancement of Nitrate Reduction in $Fe^0$-Packed Columns by Selected Cations," Journal of Environmental Engineering 131(4):603-611, Apr. 2005.

Huang, Y.H., and T.C. Zhang, "Kinetics of Nitrate Reduction by Iron at Near Neutral pH," Journal of Environmental Engineering 128(7):604-611, Jul. 2002.

Huang, Y.H., and T.C. Zhang, "Nitrite Reduction and Formation of Corrosion Coatings in Zerovalent Iron Systems," Chemosphere 64(6):937-943, Aug. 2006.

Huang, Y.H., and T.C. Zhang, "Reduction of Nitrobenzene and Formation of Corrosion Coatings in Zerovalent Iron Systems," Water Research 40(16):3075-3082, Sep. 2006.

Huang, Y.H., et al., "Effects of Oxide Coating and Selected Cations on Nitrate Reduction by Iron Metal," Journal of Environmental Quality 32(4):1306-1315, Jul./Aug. 2003.

Kanel, S.R., et al. , "Removal of Arsenic(III) From Groundwater by Nanoscale Zero-Valent Iron," Environmental Science & Technology 39(5):1291-1298, Mar. 2005.

Meng, X., et al., "Removal of Selenocyanate From Water Using Elemental Iron," Water Research 36(15):3867-3873, Sep. 2002.

Ponder, S.M., et al., "Remediation of Cr(VI) and Pb(II) Aqueous Solutions Using Supported, Nanoscale Zero-Valent Iron," Environmental Science & Technology 34(12):2564-2569, Jun. 2000.

Shaw, J.A., "The Design of Draft Tube Circulators," Proceedings of the Australasian Institute of Mining and Metallurgy 283:47-58, Sep. 1982.

Wang, J., et al., "Performance and Characteristics of an Anaerobic Baffled Reactor," Bioresource Technology 93(2):205-208, Jun. 2004.

Zhang, T.C., and Y.H. Huang, "Effects of Surface-Bound $FE^{2+}$ on Nitrate Reduction and Transformation of Iron Oxide(s) in Zero-Valent Iron Systems at Near-Neutral pH," Journal of Environmental Engineering 132(5):527-536, May 2006.

Zhang, T.C., and Y.H. Huang, "Profiling Iron Corrosion Coating on Iron Grains in a Zerovalent Iron System Under the Influence of Dissolved Oxygen," Water Research 40(12):2311-2320, Jul. 2006.

Huang, Y., "Nitrate Degradataion by $Fe^{0-}$: Mechanisms, Kinetics, and the Role of Iron Dxide Coatings," doctoral dissertation, University of Nebraska, Lincoln, Nebraska, 2002, 260 pages.

International Preliminary Report on Patentability dated Mar. 20, 2012, issued in International Application No. PCT/US2010/049528, filed Sep. 20, 2010, 5 pages.

International Search Report dated May 31, 2011, issued in International Application No. PCT/US2010/049528, filed Sep. 20, 2010, 3 pages.

Notification of the First Office Action dated Aug. 30, 2012, issued in Chinese Application No. 201080052261.8, filed Sep. 20, 2010, 8 pages.

Extended European Search Report dated Oct. 1, 2013, issued in European Application No. 10817988.8, filed Sep. 20, 2010, 9 pages.

Chinese Rejection Decision dated Jun. 8, 2015, issued in related Chinese Application No. 20180052261.8, filed Sep. 20, 2010, 8 pages.

Eurasian Official Action dated Apr. 7, 2015, and Russian foreign associate's comments dated Jun. 8, 2015, issued in Eurasian Application No. 201290898, filed Sep. 20, 2010, 5 pages.

Zhang, Y., et al., "Effect of Arsenate and Molybdate on Removal of Selenate From an Aqueous Solution by Zero-Valent Iron," Science of the Total Environment 350(1-3)1-11, Nov. 2005.

Communication Pursuant to Article 94(3) EPC dated May 16, 2017, issued in corresponding European Application No. 10817988.8, filed Sep. 20, 2010, 8 pages.

communication Pursuant to Article 94(3) EPC dated Feb. 2, 2018, issued in corresponding European Application No. 10817988.8, filed Sep. 20, 2010, 6 pages.

Office Action dated Nov. 7, 2018, in corresponding Canadian Application No. 2,787,032, filed Aug. 20, 2010, 3 pages.

Chinese First Office Action dated Feb. 1, 2019, issued in corresponding Chinese Application No. 201610899705.0, filed Sep. 20, 2010, 15 pages.

* cited by examiner

| | | Phase 1 | Phase 2 |
|---|---|---|---|
| pH | SU | 3.5 | 7.1 |
| ORP | Mv | +408 | +196 |
| Oxidants | mg/l | ~1.5 g/l | none |
| | | | |
| Aluminum | (ug/l) | 1,405 | 297 |
| Arsenic | (ug/l) | 1.9 | 2.3 |
| Cadmium | (ug/l) | 69 | 120 |
| Calcium | (mg/l) | 1,401 | 2180 |
| Chromium, Total | (ug/l) | 106 | 2.5 |
| Copper | (ug/l) | 283 | 8.6 |
| Iron | (ug/l) | 414 | 963 |
| Manganese | (mg/l) | 2.9 | 61 |
| Mercury | (ug/l) | 100 | 3.9 |
| Selenium, Total | (ug/l) | 1,820 | 242 |
| | | | |
| Bromide | (mg/l) | 5.4 | 87 |
| Chloride | (mg/l) | 3,608 | 6,517 |
| Nitrate Nitrogen | (mg/l) | 63 | 35 |
| Sulfate | (mg/l) | 3,215 | 1,683 |
| TDS | (mg/l) | 12,596 | 15,167 |

FIG. 21.

| Effluent | | | | | | |
|---|---|---|---|---|---|---|
| | Average Influent | | Avg | Min | Max | Data Points |
| Selenium, Dissolved | (ug/l) | 1,789 | 223 | 6.1 | 437 | 12 |
| Selenium, Total | (ug/l) | 1,820 | 226 | 5.2 | 435 | 12 |
| Average Se Removal = 88% / Maximum Removal = 99.7% | | | | | | |
| Selenate, Dissolved | (ug/l) | 1,606 | 198 | <0.28 | 404 | 12 |
| Selenite, Dissolved | (ug/l) | 4 | <4.0 | <0.65 | <12 | 12 |
| Methyl Seleninic Acid Dissolved | (ug/l) | 2.2 | <2.3 | <0.36 | <12 | 12 |
| Selenocyante, Dissolved | (ug/l) | 2.3 | <2.8 | <0.24 | <18 | 12 |
| Selenomethionine, Dissolved | (ug/l) | 2.2 | <2.3 | <0.36 | <12 | 12 |
| Selenosulfate, Dissolved | (ug/l) | 7.6 | <13.7 | <0.36 | <70 | 12 |
| Unknown Se species, Dissolved | (ug/l) | 2.2 | <2.3 | <0.36 | <12 | 12 |

*FIG. 23.*

| | Average Influent | | Average | % Removal | Minimum | % Removal |
|---|---|---|---|---|---|---|
| Arsenic | (ug/l) | 1.9 | 0.51 | 73.7% | 0.28 | 85.4% |
| Boron | (mg/l) | 93 | 87 | 6.5% | 68 | 26.8% |
| Cadmium | (ug/l) | 69 | 0.75 | 98.9% | 0.028 | 100.0% |
| Chromium, Total | (ug/l) | 106 | 1.1 | 99.0% | 0.38 | 99.6% |
| Copper | (ug/l) | 283 | 1.1 | 99.6% | 0.36 | 99.9% |
| Lead | (ug/l) | 0.97 | 0.187 | 80.7% | 0.03 | 96.9% |
| Manganese | (mg/l) | 2.9 | 4 | (39.4)% | 0.73 | 74.6% |
| Mercury | (ug/l) | 100 | 0.118 | 99.9% | 0.007 | 100.0% |
| Nickel | (ug/l) | 750 | 15.7 | 97.9% | 0.70 | 99.9% |
| Nitrate-Nitrogen | (mg/l) | 63 | 5.9 | 90.6% | 0.68 | 98.9% |
| Thallium | (ug/l) | 0.81 | 0.094 | 88.4% | 0.004 | 99.5% |
| Zinc | (ug/l) | 788 | 13.3 | 98.3% | 2.2 | 99.7% |

*FIG. 25.*

| | Effluent | | | | | |
|---|---|---|---|---|---|---|
| | | Average Influent | Avg | Min | Max | Data Points |
| Selenium, Dissolved | (ug/l) | 238 | 12.7 | 2.5 | 38 | 8 |
| Selenium, Total | (ug/l) | 242 | 13.0 | 3.7 | 38 | 8 |
| | | Average Se Removal = 94.7% / Maximum Removal = 98.5% | | | | |
| Selenate, Dissolved | (ug/l) | 161 | 17.7 | 1.1 | 81 | 11 |
| Selenite, Dissolved | (ug/l) | 22 | <1.4 | 0.82 | 2.5 | 11 |
| Methyl Seleninic Acid Dissolved | (ug/l) | <2.0 | <1.1 | <0.72 | <1.5 | 11 |
| Selenocyante, Dissolved | (ug/l) | <1.0 | <1.2 | <0.51 | <2.4 | 11 |
| Selenomethionine, Dissolved | (ug/l) | <1.0 | <1.1 | <0.72 | <1.5 | 11 |
| Selenosulfate, Dissolved | (ug/l) | <1.0 | <1.6 | <0.72 | <4.4 | 11 |
| Unknown selenium species, Dissolved | (ug/l) | <1.0 | <1.1 | <0.72 | <1.5 | 11 |

*FIG. 27.*

| | | Average Influent | Average | % Removal | Minimum | % Removal |
|---|---|---|---|---|---|---|
| Arsenic | (ug/l) | 2.3 | 0.62 | 72.6% | 0.18 | 92.0% |
| Boron | (mg/l) | 85 | 76 | 10.7% | 49 | 42.0% |
| Cadmium | (ug/l) | 120 | 0.103 | 99.9% | 0.059 | 100.0% |
| Chromium, Total | (ug/l) | 2.5 | 1.1 | 57.5% | 0.32 | 87.2% |
| Copper | (ug/l) | 8.6 | 1.3 | 85.1% | 0.58 | 93.2% |
| Lead | (ug/l) | 0.21 | 0.125 | 40.4% | 0.09 | 57.1% |
| Manganese | (mg/l) | 61 | 34 | 44.3% | 5.1 | 91.6% |
| Mercury | (ug/l) | 3.9 | 0.012 | 99.7% | 0.007 | 99.8% |
| Nickel | (ug/l) | 1,288 | 4.2 | 99.7% | 0.92 | 99.9% |
| Nitrate-Nitrogen | (mg/l) | 35 | 12 | 65.0% | 0.54 | 98.5% |
| Thallium | (ug/l) | 1.1 | 0.050 | 95.5% | 0.009 | 99.2% |
| Zinc | (ug/l) | 523 | 7.8 | 98.5% | 1.6 | 99.7% |

*FIG. 29.*

| Metal | Limits | Results | | | Units | Method |
|---|---|---|---|---|---|---|
| | | Phase 1 Sample A | Phase 1 Sample B | Phase 2 Sample A | | |
| Silver | 5 | <0.12 | <0.12 | <0.050 | mg/L | EPA 1311/6010 |
| Arsenic | 5 | <0.02 | <0.02 | <0.10 | mg/L | EPA 1311/6010 |
| Barium | 100 | 1.38 | 1.22 | <0.25 | mg/L | EPA 1311/6010 |
| Cadmium | 1 | <0.034 | <0.034 | <0.020 | mg/L | EPA 1311/6010 |
| Chromium | 5 | 0.0042 | 0.0058 | <0.050 | mg/L | EPA 1311/6010 |
| Mercury | 0.2 | <0.0018 | <0.0018 | <0.0002 | mg/L | EPA 1311/7470 |
| Lead | 5 | 0.079 | 0.116 | <0.1 | mg/L | EPA 1311/6010 |
| Selenium | 1 | <0.36 | <0.36 | <0.1 | mg/L | EPA 1311/6010 |

*FIG. 30.*

ZERO VALENT IRON SYSTEMS AND METHODS FOR TREATMENT OF CONTAMINATED WASTEWATER

CROSS-REFERENCES TO RELATED APPLICATIONS

This application claims the benefit of U.S. patent application Ser. No. 62/042,140, filed Aug. 26, 2014; and is a continuation-in-part of U.S. patent application Ser. No. 13/509,963, filed Jul. 17, 2012, which is a National Stage of International Application No. PCT/US2010/049528, filed Sep. 20, 2010 (published as WO 2011/035263), which claims the benefit of U.S. Provisional Application No. 61/243,875, filed Sep. 18, 2009; U.S. Provisional Application No. 61/357,466, filed Jun. 22, 2010; and U.S. Provisional Application No. 61/351,194, filed Jun. 3, 2010; and is a continuation-in-part of U.S. patent application Ser. No. 13/071,343, filed Mar. 24, 2011, which is a continuation-in-part of International Application No. PCT/US2010/049528, filed Sep. 20, 2010 (published as WO 2011/035263), which claims the benefit of U.S. Provisional Application No. 61/243,875, filed Sep. 18, 2009; U.S. Provisional Application No. 61/357,466, filed Jun. 22, 2010; and U.S. Provisional Application No. 61/351,194, filed Jun. 3, 2010 Each application is expressly incorporated herein by reference in its entirety.

BACKGROUND OF THE INVENTION

Wastewater treatment is one of the most important and challenging environmental problems associated with coal-based power generation. Using wet scrubbers to clean flue gas is becoming more popular worldwide in the electrical power industry. In the coming years, hundreds of wet scrubbers will be installed in the U.S. alone. While wet scrubbers can greatly reduce air pollution, toxic metals in the resulting wastewater present a major environmental problem, and the energy industry will be investing billions of dollars to meet increasingly stringent environmental regulations. Cost-effective and reliable technologies capable of treating such complicated wastewater are in demand.

Zero-valent iron systems are known to be effective for reducing the concentration of contaminants in wastewater streams. Among zero-valent iron systems are hybrid zero-valent iron (hZVI) systems in which the iron corrosion process is utilized to transform and immobilize various heavy metals and reactive anionic contaminants in wastewater. In the hZVI system, an activated iron media is created and maintained to treat contaminated waters. The activated iron media includes three components: zero-valent iron (Fe(0) or ZVI) particles having at least a partial magnetite ($Fe_3O_4$) coating, discrete magnetite particles, and ferrous ion ($Fe^{2+}$) in solution in the environment of the particle components. Some ferrous ion may be adsorbed onto the solid surface of the particles and become surface-bound Fe(II). The ferrous ion in solution plays a central role in preventing the formation of ferric oxides during the iron corrosion process, which occurs due to the presence of oxidizing compounds in the water, such as dissolved oxygen, nitrate, and selenate, among others. In the hZVI process, discrete magnetite particles acquire electrons from ZVI particles and become electron-enriched reactive magnetite that can react with various contaminants by delivering electrons to the target contaminants (i.e., magnetite affects contaminant reduction). Thus, the discrete magnetite particles host the redox reactions and play the role of electron shuttle.

In the hZVI system, ZVI is the primary electron source. With its magnetite coating, the ZVI particles also serve as reaction sites for various redox reactions.

The various roles of ZVI in the hZVI system suggest that ZVI particle size may affect the system performance. For example, under the same ZVI concentration (e.g., 100 g/L), the use of a smaller ZVI particle size means that a higher surface area is available for hosting the reactions for contaminant transformation and immobilization. Moreover, the higher specific surface area also means that more effective electron transfer between ZVI and discrete magnetite particles, thus high surface area ZVI may be expected to be more efficient in generating reactive magnetite particles and thereby indirectly support contaminant removal. Overall, it may be postulated that smaller ZVI particle size may increase hZVI system performance.

Alternatively, other factors may need to be considered: Examples of these other factors include (1) price, fine ZVI source particles are more expensive than coarse ZVI source particles, (2) safety, extra-fine ZVI source particles may be too reactive to be handled safely, and sub-micron size ZVI source particles may pose a risk of explosion or as a self-inflammable hazard, and (3) fine particles may be more difficult to settle and thus may not be compatible with a typical hZVI reactor design for rapid solid/liquid separation.

Despite the advances in hZVI technologies to date, a need exists for improved hZVI systems and methods for more effectively reducing the concentrations of contaminants in wastewaters. The present invention seeks to fulfill this need and provides further related advantages.

SUMMARY OF THE INVENTION

The present invention provides treatment systems and methods for removing or reducing the concentration of a contaminant in a fluid (e.g., contaminated water).

In one aspect, the invention provides a treatment system for removing or reducing the concentration of a contaminant in a fluid. In one embodiment, the treatment system comprises a reactive zone comprising:

(a) a reactive solid comprising zero-valent iron and one or more iron oxide minerals in contact therewith, wherein the zero-valent iron from which the reactive solid is prepared has particle size from about 5 μm to about 200 μm;

(b) a secondary reagent in contact with the reactive solid, wherein the secondary reagent is ferrous iron.

In certain embodiments, the zero-valent iron from which the reactive solid is prepared has particle size from about 5 μm to less than about 20 μm. In other embodiments, the zero-valent iron from which the reactive solid is prepared has particle size from about 20 μm to about 50 μm. In further embodiments, the zero-valent iron from which the reactive solid is prepared has particle size greater than about 50 μm to about 200 μm.

In certain embodiments, the one or more iron oxide minerals in contact with the reactive solid is magnetite. In certain embodiments, the reactive solid comprises a plurality of particles.

In certain embodiments, the treatment system further includes a secondary solid. Suitable secondary solids include iron oxide minerals. Representative the iron oxide minerals include magnetite. In certain embodiments, the secondary solid is a plurality of particles.

In certain embodiments, the reactive zone comprises a fluidized bed. In certain embodiments, the treatment system further includes a settling zone in fluid communication with the reactive zone.

In another aspect of the invention, methods for removing or reducing the concentration of a contaminant in a fluid are provided.

In one embodiment, the method of removing or reducing the concentration of a contaminant in a fluid, comprises:

(a) contacting a fluid comprising a contaminant with a reactive solid, wherein the reactive solid comprises zero-valent iron and one or more iron oxide minerals in contact therewith, and wherein the zero-valent iron from which the reactive solid is prepared has a particle size from about 5 μm to about 200 μm;

(b) introducing a secondary reagent to the fluid in contact with the reactive solid, wherein the secondary reagent is ferrous iron.

In another embodiment, the method of removing or reducing the concentration of a contaminant in a fluid, comprises:

(a) treating zero valent iron with an oxidant and ferrous iron to provide a reactive solid comprising zero-valent iron and one or more iron oxide minerals in contact therewith, wherein the zero-valent iron has particle size from about 5 to about 200 μm; and (b) contacting a fluid comprising a contaminant with the reactive solid and a secondary reagent, wherein the secondary reagent is ferrous iron.

In certain embodiments, the oxidant is aqueous nitrate.

In certain embodiments of the above methods, the zero-valent iron from which the reactive solid is prepared has particle size from about 5 μm to less than about 20 μm. In other embodiments, the zero-valent iron from which the reactive solid is prepared has particle size from about 20 μm to about 50 μm. In further embodiments, the zero-valent iron from which the reactive solid is prepared has particle size greater than about 50 μm to about 200 μm.

In certain embodiments of the above methods, the one or more iron oxide minerals in contact with the reactive solid is magnetite. In certain embodiments, the reactive solid comprises a plurality of particles.

In certain embodiments of the above methods, the secondary reagent is continuously introduced.

In certain embodiments of the above methods, the methods further include adding a secondary solid to the fluid in contact with the reactive solid. Suitable secondary solids include iron oxide minerals. Representative the iron oxide minerals include magnetite. In certain embodiments, the secondary solid is a plurality of particles.

In certain embodiments of the above methods, the methods are carried out using the treatment systems of the invention.

Fluids treatable by the systems and methods of the invention include industrial wastewater, such as flue gas desulfurization wastewater, among others. Contaminants treatable by the systems and methods of the invention include metals, metal ions, metalloids, oxyanions, chlorinated organic compounds, and combinations thereof. Representative treatable contaminants include arsenic, aluminum, antimony, beryllium, mercury, selenium, cobalt, lead, cadmium, chromium, silver, zinc, nickel, molybdenum, thallium, and vanadium compounds, ions, and oxyanions thereof; borates, nitrates, bromates, iodates, and periodates; trichloroethylene; dissolved silica; and combinations thereof. In certain embodiments, the treatable contaminant is selenate.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

FIG. 13A compares Selentate-Se (mg/L) as a function of time for the tests. FIG. 13B compares Dissolved $Fe^{2+}$ (mg/L) as a function of time for the tests. FIG. 13C compares pH as a function of time for the tests.

FIG. 21 summarizes influent differences for a pilot testing program having two phases (Phases 1 and Phase 2) that investigated the effectiveness of a representative system and method of the invention to remove or reduce the concentration of contaminants in industrial waters.

FIG. 23 summarizes selenium removal for Phase 1 of the pilot testing program.

FIG. 25 summarizes results for removal of other contaminants for Phase 1 of the pilot testing program (based on twelve weekly samples).

FIG. 27 summarizes selenium removal for Phase 2 of the pilot testing program.

FIG. 29 summarizes results for removal of other contaminants for Phase 2 of the pilot testing program (based on eight weekly samples).

FIG. 30 compares limits and final contaminant concentrations for Phase 2 and demonstrates consistent compliance with USEPA TCLP Tests.

DETAILED DESCRIPTION OF THE INVENTION

Figure 1:
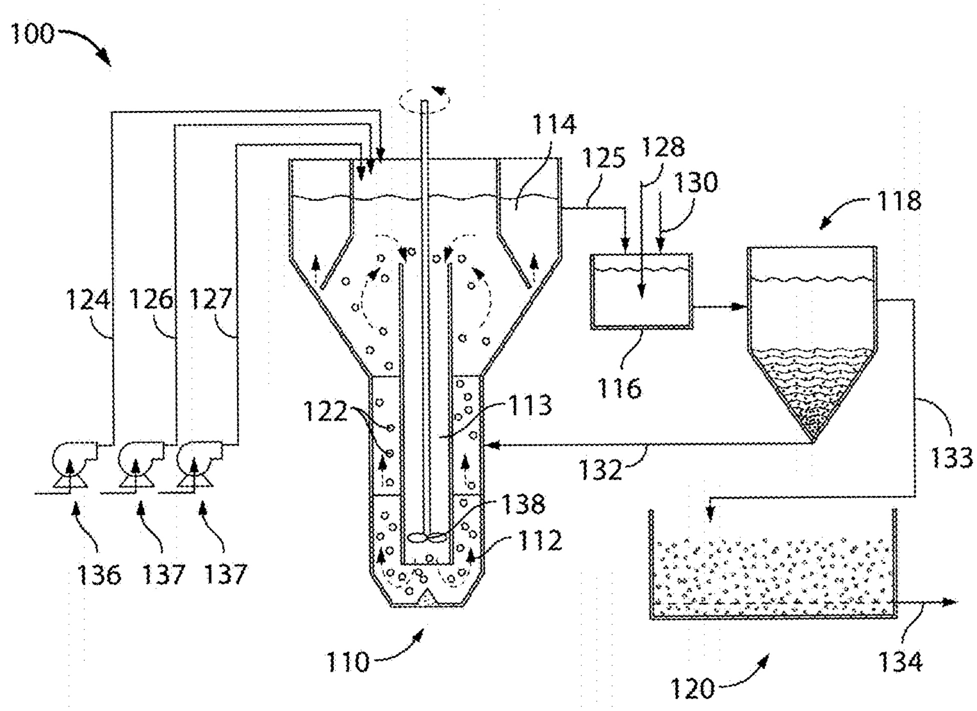
FIG. 1 is a schematic illustrating a single-stage fluidized bed reactor.

Presented herein are compositions, systems, and processes for treating a fluid so as to reduce the concentration of a contaminant in the fluid. The compositions, systems, and processes are robust, flexible, and based on cost-effective materials. For example, treatment processes may cost-effectively treat all major pollutants in flue gas desulfurization (FGD) wastewater in a single process. In some embodiments, a fluidized reacting system is provided that uses a hybrid reactive solid/secondary reagent reactor that may cost-effectively remove many toxic metals from a fluid. Some embodiments may be effective to treat an aqueous suspension as well. In addition to removing toxic metals, embodiments herein may remove oxyanion pollutants and metalloids as well as dissolved silica. Typically, processes may be performed at ambient temperature and atmospheric pressure and well as near neutral pH.

According to some embodiments, a composition, system, and process involve a composite for removing a contaminant from a fluid stream, wherein the composite comprises a reactive solid including a base material (e.g., zero-valent iron), a supplementary material (e.g., iron oxide mineral), and a secondary reagent (e.g., ferrous iron), wherein the secondary reagent is disposed so as to produce an activating material and optionally facilitate maintenance of the activating material, and wherein the composite is active for removing the contaminant from the fluid stream.

Embodiments herein typically use common, non-toxic, and inexpensive chemicals and cost much less to construct and operate than biological treatment systems, which tend to be more complex. Typically, embodiments herein are more robust and manageable than biological processes when exposed to toxic chemicals or any disturbances and changes in wastewater quality or quantity.

Accordingly, some embodiments provide a treatment system for removing or reducing the concentration of a contaminant comprised in a fluid, the treatment system comprising a first reactive zone, the first reactive zone comprising:

(a) a first reactive solid comprising a base material defined as zero-valent iron or zero-valent zinc and a supplementary material comprising one or more iron oxide minerals in contact with the base material;

(b) a first secondary reagent, wherein the first secondary reagent is in contact with the reactive solid; and (c) optionally a first additive, wherein the first reactive zone is comprised in a first packed bed or a first fluidized bed.

As used herein, "in contact" refers to a juxtaposition of one agent with another. For example, a layer of the supplementary material may be formed on the base material or the two may form an interpenetrating network, such as with respect to the interaction of an iron oxide mineral with zero-valent iron as described further herein, or a combination thereof; or, for example, a secondary reagent ion (e.g., $Fe^{2+}$) may adsorb or be surface-bound to the reactive solid, or may be incorporated therein, or a combination thereof, as explained further herein.

In some embodiments, the first reactive zone is comprised in a first fluidized bed. In some embodiments, a treatment system further comprises a first settling zone in fluid communication with the first reactive zone. In some embodiments, the first reactive zone is comprised within a first reactor. A treatment system may further comprise, e.g., a sulfide generator in liquid communication with the first reactor. In some embodiments, a treatment system may further comprise at least a second reactor comprising a second reactive solid, a second secondary reagent, and optionally a second additive, wherein the second reactor is in fluid communication with the first reactor, such that the treatment system is further defined as a multi-stage reactor treatment system. A treatment system may further comprise one or more of the following: an internal solid/liquid separating zone, an aerating basin, a final settling basin, a wastewater pump, a reagent pump, or sand filtration bed.

In some embodiments, a first reactive solid comprises a plurality of particles. In some embodiments, the first secondary reagent is further defined as a first ferrous iron. In some embodiments, at least one iron oxide mineral of the supplementary material is magnetite. In some embodiments, the first additive comprises a sulfide. In some embodiments, the first additive comprises an oxidant. In some embodiments, the contaminant comprises a metal, metal ion, metalloid, oxyanion, chlorinated organic compound, or a combination thereof. In some embodiments, a contaminant is selected from arsenic, aluminum, antimony, beryllium, mercury, selenium, cobalt, lead, cadmium, chromium, silver, zinc, nickel, molybdenum, thallium, vanadium, and ions thereof; borates, nitrates, bromates, iodates, and periodates; trichloroethylene; and dissolved silica; and combinations thereof. In some embodiments, the contaminant is selenate or dissolved silica. The fluid may comprise industrial waste fluid, for example. The pH of a reactive zone may be between about pH 6 and about pH 8.

Methods are also provided herein, such as a method of removing or reducing the concentration of a contaminant comprised in a fluid, comprising (a) exposing the fluid to the first reactive solid comprised in the first reactive zone of the treatment system, such as the treatment system described above;

(b) introducing the first secondary reagent to the first reactive solid, thereby forming a composite that is active for removing or reducing the concentration of the contaminant.

In some embodiments, the first secondary reagent is continuously introduced. Some embodiments may further comprise a nitrate pretreatment step, wherein the composite is exposed a solution comprising nitrate prior to exposing the fluid to the composite.

I. Hybrid Treatment Systems—Generally

A treatment system (also referred to as a reactor system, a chemical system, and variants thereof) comprises a reactive solid, such as reactive solid particles. The term "reactive solid" is used interchangeably with "reactive material." A reactive solid includes a base material, and a supplementary material. Zero-valent iron (ZVI, Fe(0)) is illustrative of a base material, as is zero-valent zinc. It is to be understood that when zero-valent iron is referred to in this disclosure, zero-valent zinc may alternatively be employed, and vice-versa.

The supplementary material is positioned so as to assist in the functionality of the base material. A supplementary material typically comprises one or more iron oxide minerals (also termed "iron oxides" and also referred to herein as "$FeO_X$"). Magnetite is illustrative of an iron oxide mineral. Other iron oxide minerals include passivating ferric oxides such as lepidocrocite, maghemite, hematite, and other non-conducting ferric oxides. The iron oxide mineral may be non-stoichiometric. The iron oxide mineral may be a conductive. As used herein, "conductive" includes both metal-like and semi-conductive. The iron oxide mineral may be a defect iron oxide mineral. For example, magnetite is known to have a defect structure where atoms can be missing and charge compensated for. Magnetite has a spinel structure with semi-conducting properties. While not wishing to be limited by theory, the present inventor believes that the spinel structure or semi-conducting properties facilitate the ability of magnetite to activate zero-valent iron for removal of contaminants from a fluid. According to some embodiments, an iron oxide mineral such as magnetite is formed by transformation of a passivating ferric oxide, discussed below. Alternatively or in combination, an iron oxide mineral is formed by transformation of zero-valent iron.

A reactive solid may be in the form of a plurality of particles. A reactive solid particle may include a core and a shell. The core may include primarily the base material. The shell may include primarily the supplementary material. The shell may be continuous. Alternatively, the shell may be discontinuous. The shell may include a plurality of particles of a supplementary material. A supplementary material may form a layer on top of the base material. A supplementary material may be a secondary solid. The secondary solid may be in the form of particles. Thus, a reactor system may include a plurality of reactive solid particles and a second plurality of secondary solid particles. The supplementary material may be in equilibrium with the reactive solid.

According to some embodiments, a reactor system includes a secondary solid. The secondary solid may assist the functionality of the reactive solid. The secondary solid may be in the form of particles. Thus, the reactor system may include a plurality of reactive solid particles and a second plurality of secondary solid particles. The secondary solid may be in equilibrium with the reactive solid. The secondary solid may include the same material as the supplementary material. Thus, when the supplementary material includes magnetite, the secondary solid may include magnetite.

According to some embodiments, a reactive solid is exposed to a secondary reagent that acts as a passivation reversal agent (see the discussion of passivation below). An example of a secondary reagent is ferrous iron. Aluminum ion, $Al^{3+}$, may substitute for ferrous iron (e.g., added as aluminum sulfate). It will be understood that when ferrous iron is discussed, aluminum ion may be substituted therefore.

Upon reaction of the secondary reagent with the reactive solid, an activating material is formed that is active to remove a contaminant. In this way, at least a portion of the supplementary material may be transformed into an activating material such that the supplementary material comprises an activating material. The activating material may be adapted to electronically mediate an electrochemical reaction between the zero-valent iron and the contaminant so as to facilitate precipitation of the contaminant. The activating material may behave as a zero-valent iron promoter or a semi-conductor, or a combination thereof. For example, as the activating material may be adapted to overcome the tendency of zero-valent iron to passivate in solution, the activating material itself may act as a zero-valent iron promoter. The activating material may be semi-conducting. The typical iron oxide mineral of an activating material is magnetite. A supplementary material may further comprise ferric oxides (e.g., lepidocrocite) and amorphous mixed valent ferric-ferrous (oxy)hydroxides (e.g., γ-FeOOH); while these may act as passivating agents, these agents may be transformed to an activating material such as magnetite. The activating material may form a layer that is a reactive film. Methods of formation of activating materials are discussed further herein.

Taken together, a reactive solid and a secondary reagent form a composite, such as a zero-valent iron (ZVI)/$FeO_X$/Fe(II) composite, also referred to as a hybrid zero-valent iron/$FeO_X$/Fe(II) composite, also referred to as hybrid ZVI or hybrid ZVI/$FeO_X$/Fe(II). In general, an advantage of the hybrid ZVI/$FeO_X$/Fe(II) is a sustainability of a high level of activity and improved lifetime, particularly in comparison to zero-valent iron alone. A composite may be produced in situ as part of a contaminant removal process. A composite comprises a supplementary material that may be, at least in part, transformed into an activating material, as described herein. A composite may comprise a particle, having a core comprising zero-valent iron and a layer over the core, wherein the layer comprises the activating material. The composite particle may further comprise a second layer over the first layer. The second layer may comprise a plurality of fingers extending from the first layer. The second layer may comprise a passivating material, such as lepidocrocite, maghemite, hematite, and other non-conducting ferric oxides. As discussed herein, non-conducting ferric oxides may be transformed to conducting magnetite.

While not wishing to be limited by theory, the present inventor believes that the following are contributing mechanisms for the present system and process when it is iron based: (a) using the reducing power of Fe(0) and Fe(II) to reduce various contaminants in oxidized forms to become insoluble or non-toxic species; (b) using the high adsorption capacity of iron oxide surfaces for metals to remove various dissolved toxic metal species from wastewater and other fluids; and (c) promoting mineralization of iron oxides and growth of crystalline iron oxides so that surface-adsorbed or precipitated toxic metals and other pollutants may be incorporated into the iron oxide crystalline structure and remain encapsulated in a stabilized form for final disposal.

A composite may be produced by an activation process. The activation process may involve oxidizing at least a portion of a zero-valent iron so as to form an intermediate material (i.e., the supplementary material, described above) and exposing the intermediate material to dissolved ferrous ion to form the activating material. The ferrous ion may adsorb onto the intermediate material. The ferrous ion may convert at least a portion of the intermediate material into activating material. For example, exposing such an intermediate layer to ferrous ion may transform the intermediate layer into a layer of activating material. When the zero-valent iron is a particle, the intermediate material may form as an intermediate layer over a zero-valent iron core. The oxidizing may include maintaining the zero-valent iron in an oxidizing environment. The oxidizing environment may be a solution containing an oxidant. Oxidants are described herein. Oxidant is typically consumed in the activation process when at least a portion of the zero-valent iron is oxidized to form activating material.

A composite may rapidly reduce contaminants, such as selenate to become insoluble selenium species, which are then adsorbed or precipitated along with various of other toxic metals (such as arsenic and mercury, if present) in a fluid onto the iron oxide sludge. Some embodiments herein may be employed for removing selenate-Se. Other contaminants are described herein.

Some embodiments described herein are based on the theory that as a secondary reagent, ferrous iron acts as a passivation reversal agent for the base material, e.g., zero-valent iron. Thus, according to some embodiments, a treatment system comprises a secondary reagent suitable for a reactive solid comprising zero-valent iron. Passivation is generally the process of rendering an active material, for example zero-valent iron or zero-valent zinc, inactive. The mechanism of action is complex. While not wishing to be limited by theory, the present inventor believes that passivation is partially caused by corrosion of iron in a water environment. It is believed that ferrous iron acts to cause conversion of iron corrosion product on the surface of the zero-valent iron to magnetite. In some embodiments, boron and dissolved silica that may be present in a fluid, such as wastewater, may further contribute to passivation of zero-valent iron and it is believed that ferrous iron facilitates removal of the boron and dissolved silica from the zero-valent iron reactive system.

While not wishing to be limited to theory, the present inventor proposes that passivation of Fe(0) is caused by ferric oxides (e.g., lepidocrocite) or amorphous ferrous (oxy)hydroxides. Ferric oxides or amorphous ferrous (oxy) hydroxides are formed under most natural or engineered environments. A magnetite coating on Fe(0) may maintain high Fe(0) reactivity. Magnetite is an excellent semiconductor, in which electrons can move almost freely; whereas lepidocrocite is an electron barrier. Reactivity of Fe(0) involves a balance between the oxidizing power of a compound and the electron transfer resistance of the yielded iron corrosion coating. Adding a secondary reagent, such as dissolved $Fe^{2+}$, may promote transformation of ferric oxides or amorphous ferrous (oxy)hydroxides to magnetite under the right chemical environments. In this way, Fe(0) reactivity may be sustained.

An iron corrosion coating may result on zero-valent iron in an oxidizing environment. Iron corrosion may produce various iron oxides under different chemical conditions. Other factors such as pH, dissolved $Fe^{2+}$, and oxidants may be combined to facilitate magnetite production. For example, a pH of 6.5-7.5, adequate dissolved $Fe^{2+}$that may form surface-bound Fe(II), and appropriate species and concentration of oxidants may be manipulated to optimize magnetite generation. Oxidants may be certain oxyanions such as selenate, nitrate, nitrite, iodate ($IO_3^-$) and periodate ($IO_4^-$). Other oxidants are described herein. Oxidation of zero-valent iron by these oxidants tends to form ferric oxides (e.g., lepidocrocite) and amorphous mixed valent ferric-ferrous (oxy)hydroxides (e.g., γ-FeOOH). As noted above, ferric oxides and (oxy)hydroxides may be transformed to magnetite in the presence of a secondary reagent (e.g., surface-adsorbed Fe(II)). Accordingly, although in the hybrid ZVI/$FeO_X$/Fe(II) treatment system, magnetite ($Fe_3O_4$) is the predominant desirable iron oxide, the presence of other iron oxide species may be observed (e.g., lepidocrocite γ-FeOOH) in various amounts in some circumstances. Under near neutral conditions with the presence of dissolved oxygen or other oxidizing contaminants or impurities such as selenate, nitrite, or persulfate, the corrosion of ZVI tends to form ferric oxides. The ferric oxides (e.g., $Fe_2O_3$, FeOOH) are generally passive in term of reactivity. When $Fe^{2+}$ is present in water, these ferric oxides tends to be converted to a magnetite coating. Under more acidic conditions (e.g., pH<5.5), corrosion of ZVI may form an amorphous iron oxide-coating that is rich in Fe(II). Such Fe(II)-rich amorphous oxide is also passive compared with a magnetite coating.

Figure 6A:
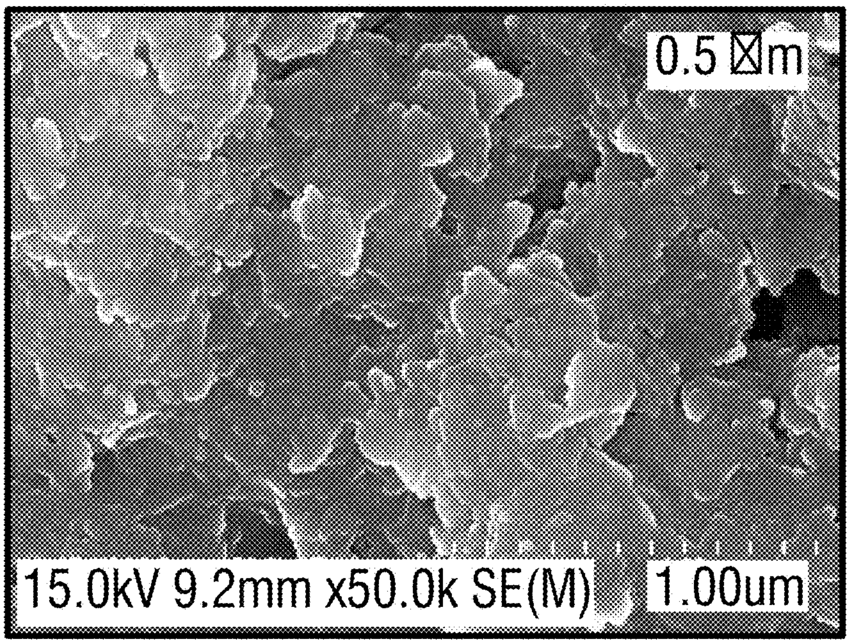
FIGS. 6A, 6B, 6C, and 7 are SEM micrographs of ZVI/$FeO_X$/Fe(II) particles.
Figure 6B:
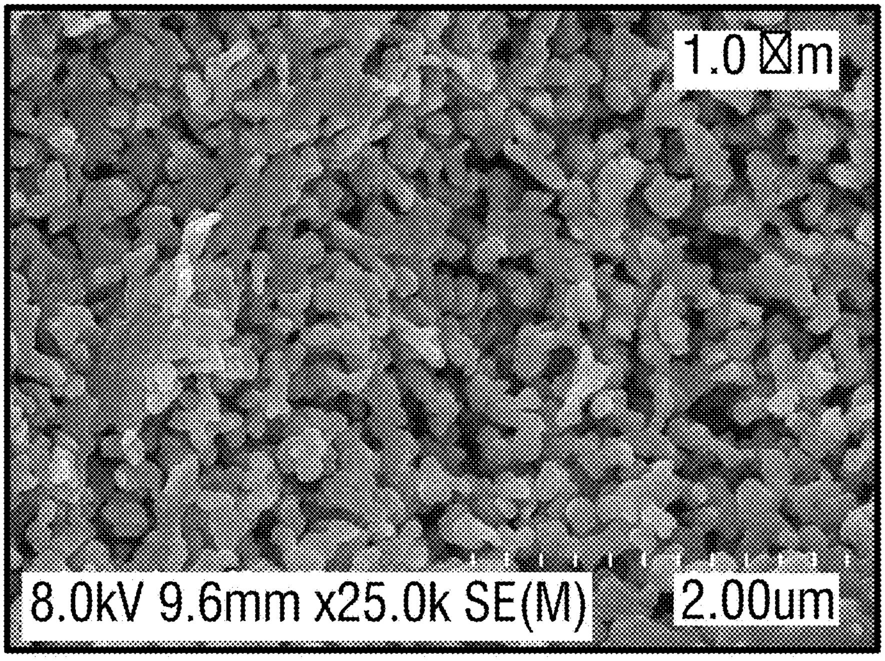
Figure 6C:
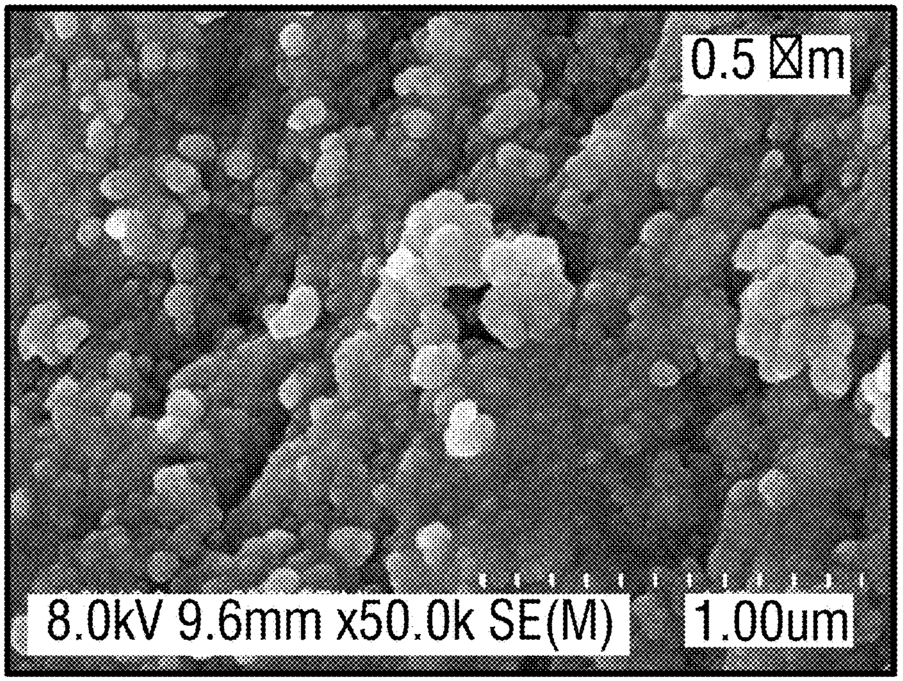
Figure 7:
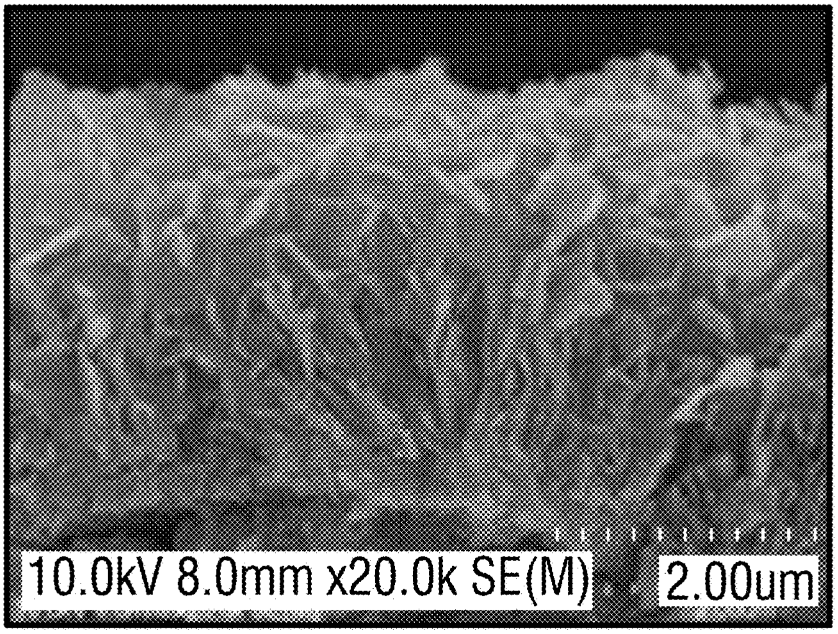
Figure 8:
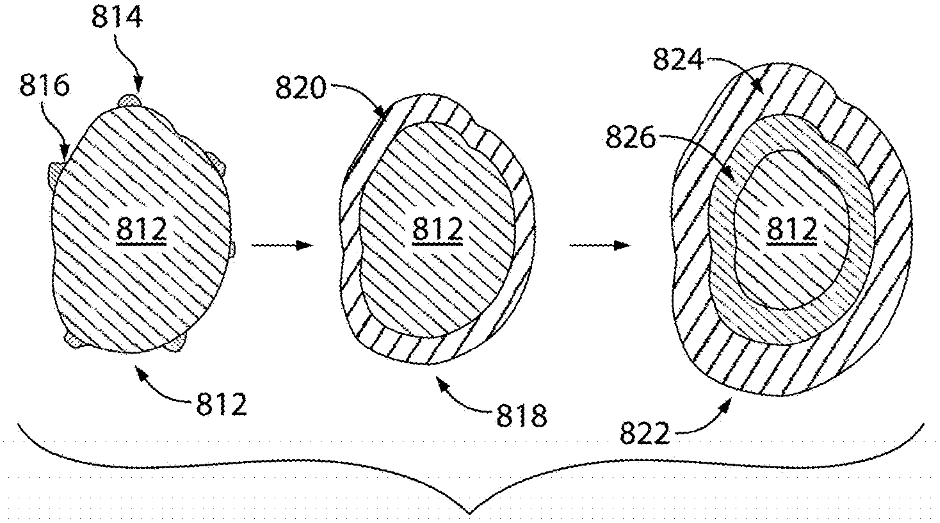
FIG. 8 shows a cartoon of formation of particles with and without $Fe^{2+}$.

While not wishing to be limited by theory, the present inventor proposes a semi-conducting corrosion model. Referring to FIGS. 6 and 7, SEM micrographs of a corrosion coating on zero-valent iron show (a) an outer layer dominated by lepidocrocite, (b) middle layer including both magnetite and lepidocrocite, and (c) an inner layer dominated by magnetite. In the presence of oxidants in an aqueous solution with near neutral or weak alkaline pH (e.g., pH 6-10), iron corrosion in such an aqueous chemical environment tends to develop a ferric oxide coating (e.g., lepidocrocite) as part of its corrosion products. Referring to FIG. 8 as an example, source iron grain 810 includes Fe(0) 812, α-$Fe_2O_3$ 814, and $Fe_3O_4$ 816. Without $Fe^{2+}$, iron grains 812 are coated by lepidocrocite 820 (including γ-FeOOH) from a Fe(0)-nitrate (or selanate) reaction, forming undesirable particles 818. With $Fe^{2+}$, lepidocrocite 826 (including γ-FeOOH) is rapidly converted into magnetite 824 (including $Fe_3O_4$), followed by rapid reduction of selenate, forming desirable particles 822. It will be understood that the core/shell structure shown in FIG. 8 is a simplified schematic illustration of a hybrid ZVI/$FeO_X$/Fe(II) material. The iron oxide mineral may be interpenetrated with one or more of the zero-valent iron and a passivating ferric oxide. Thus, the hybrid ZVI/$FeO_X$/Fe(II) material may include an interpenetrating network. This is illustrated in FIG. 6, in which an outer layer was dominated by lepidocrocite, an inner layer was dominated magnetite, and a middle layer included both lepidocrocite and magnetite.

Figure 9:
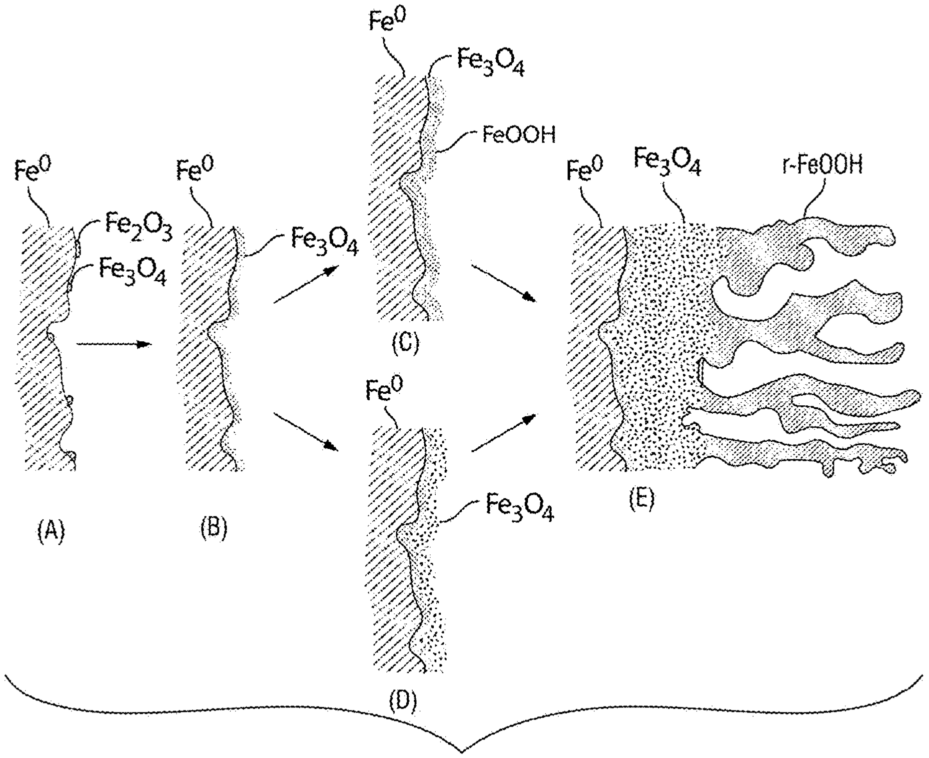
FIG. 9 illustrates an iron corrosion model of ZVI/$FeO_X$/Fe(II) particles.

It will be understood that the finger structure shown in FIG. 9 is illustrative of a porous structure. The porous structure may be of a corrosion coating. Alternatively or in combination, the porous structure may be of a passivating ferric oxide. Some reaction sites are located at the bottom of pores.

According to some embodiments, a sufficient amount of magnetite is produced so as to optimize removal of toxic materials by a reactive system including zero-valent iron. According to some embodiments, a process uses a highly reactive mixture of zero-valent iron, iron oxide minerals ($FeO_X$), and ferrous iron (Fe(II)) to react with, absorb, and precipitate various toxic metals and metalloids from a fluid, such as wastewater, forming chemically inert iron oxide crystalline (e.g., magnetite ($Fe_3O_4$) powder), whose particles are physically dense for easier solid-liquid separation and disposal as encapsulated pollutants. Thus, according to some embodiments, the process produces removable solids. According to some embodiments, the removable solids contain encapsulated toxic material. According to some embodiments, the encapsulated toxic material is solid. According to some embodiments, the removable solids contain toxic material encapsulated in magnetite.

Some embodiments herein may include sustaining an iron corrosion reaction. Sustaining the iron corrosion reaction may be accomplished by continuously providing ferrous ion to the reactive solid, such as a reactive solid comprised in a reaction zone, and optionally maintaining the reaction zone in an oxidizing environment. With respect to the word "continuously," it is to be understood that this term does not necessarily mean without interruption. Methods performed "continuously" are contrasted to "batch" processes. As a secondary reagent such as $Fe^{2+}$ may be consumed at various rates to maintain the reactive surface of a hybrid ZVI composite, the secondary reagent may be supplied from an external source at a constant rate or added intermittently before it is exhausted. One may monitor the amount of secondary reagent or other aspects of the contaminant removal process and add secondary reagent as needed to the system to maintain a desired level of activity. "Continuously" is not meant to prohibit normal interruptions in the continuity of a process due to, for example, start-up, reactor maintenance, or scheduled shut down periods Addition of secondary reagent (e.g., ferrous iron ion) in the presence of an oxidant in situ may facilitate formation of activating material in situ. As described herein, oxidant is consumed in the iron corrosion reaction. A process for treating a liquid stream in a multi-stage reactor system may include sustaining an iron corrosion reaction in the first reaction zone.

According to some embodiments, a treatment process employs a hybrid zero-valent iron/$FeO_X$/Fe(II) composite to treat toxic metal-contaminated wastewater. Accordingly, a present system and process may involve a hybrid zero-valent iron/$FeO_X$/Fe(II) composite for removing toxic metals in wastewater. According to some embodiments, the process employs a fluidized bed system and uses a reactive mixture of zero-valent iron, $FeO_X$, and Fe(II) to absorb, precipitate, and react with various toxic metals, metalloids and other pollutants for wastewater decontamination.

According to some embodiments, a reactor system includes an additive, such as an additive solid. The additive solid may include a material promoting mercury removal, or the removal of lead, copper, cadmium, zinc and the like. The additive reagent may include sulfide ion. The material may be an iron sulfide. An iron sulfide may be selected from among FeS, $FeS_2$, and combinations thereof. The iron sulfide may be pyrite. Other additives are described herein.

A. Optional Nitrate Pretreatment

Formation of the hybrid ZVI/$FeO_X$/Fe(II) via a corrosion coating of passivating ferric oxide is illustrative of formation of the hybrid ZVI/$FeO_X$/Fe(II). Alternatively, using a nitrate pretreatment process, hybrid ZVI/$FeO_X$/Fe(II) forms directly upon adding ferrous iron and nitrate to a zero-valent iron suspended in a solution.

A main purpose of nitrate pretreatment is to produce a $Fe_3O_4$ (magnetite) coating on fresh ZVI grain surface. As discussed herein, magnetite coating on ZVI was found to be much more reactive than other type of iron rust coating (e.g., a $Fe_2O_3$ rust coating). Once the initial magnetite coating is emplaced, the reactive system has a tendency to produce more magnetite from the corrosion of ZVI and thereby maintain a highly reactive ZVI-$Fe_3O_4$ mixture as the main reactive solid in the system after the initial nitrate pretreatment is terminated. For nitrate pretreatment, water (tap water or service water) augmented with 30 mg/L nitrate-N and 100 mg/L $Fe^{2+}$ (added as $FeSO_4$) may be fed at a flow rate corresponding to a hydraulic retention time of 12 h in the ZVI reactor. In some embodiments, two days treatment is sufficient to produce adequate magnetite coating on ZVI grain surface and complete the start-up process (see Example 1 below).

In addition, nitrate solution was also found to be very effective in rejuvenating a fouled system in which the system was accidentally acidified (e.g., pH dropped to below 4.0) for a few hours, which might permanently damage iron oxide reactivity and result in extremely poor performance even after returning to normal operation conditions.

B. Particle Size

Zero-valent iron (ZVI, Fe(0)) may be employed in the form of a particle or a plurality of particles (e.g., a powder). Such powders are commercially available (e.g., Hepure Technology, Inc.). No specific high purity of the particles is required: purities greater than about 95% may be employed.

Particle sizes, average particle sizes, or particle size distribution of zero-valent iron may vary. For example, particles may be less than 50 microns in size. Particles may range from about 5-50 microns in size. Particles may have a distribution of about 45-150 microns, wherein the predominant distribution is 60-100 microns.

In general, the smaller the particle size, the easier the pH of the system is to control. With larger particles, one may operate a system at a higher pH such that the equilibrium point of the reaction is higher. Thus, one may choose particle sizes based on the operating conditions. For example, in a pilot-scale (1 gallon per min) field test for treating FGD wastewater at a power plant, ZVI powder was used that had a primary particle size of about 100 micron. It was noticed that the pH in the hybrid ZVI reactors was generally stabilized between 7.5 and 8.0. Adding small amount of acidity (e.g., adding 2 mM HCl+2 mM $Fe^{2+}$) will not be able to significantly change the reaction pH. In comparison, when fine ZVI powder with primary particle size of about 30 microns was used, adding small amount of acidity (e.g., 0.5 mM HCl+1 mM $Fe^{2+}$) was sufficient to lower the reaction pH to below 6.8. In both cases, the reactive system achieved satisfactory removal efficiency for selenate-Se and dissolved Hg. pH affects the surface charge of iron oxide particles, and thus the settling properties of the reactive solids in the ZVI reactor. Operating at lower pH (e.g., pH<7.0) generally helps improve solid/liquid separation in the settling zone of the ZVI reactor.

Although smaller particle sizes would be expected to yield better activity than larger particles, one may still achieve comparable activity levels with larger particle sizes. The larger the particle size, the higher the RPM should be for the propeller that mixes the reagents to achieve a fluidized system. The higher the RPM, the higher the friction, and the higher the sheer force exerted on the iron oxide surface. With larger particles, mixing is more intense such that the iron oxide coating is typically thinner than the coating on smaller particles, where mixing is less intense. Thinner layers allow for easier electron movement and improved reactivity: it is proposed that thinner iron oxide layers contribute to the good performance of larger particles. With controllable mixing, one may control the thickness of the iron oxide layer and therefore affect reactivity. In general, one does not want the composite to be too reactive as it may react with water to form hydrogen gas, and may waste the zero-valent iron.

Other treatment materials besides zero-valent iron are also contemplated. For example, according to some embodiments, the reactive solid includes zero-valent zinc.

As noted above, ZVI particles are commercially available in a variety of sizes ranging from fine to coarse. Nano-scale ZVI particle sources having a particle size in the sub-micron scale (e.g., 100 nm) have been studied extensively for potential use in environmental remediation. In the development of the present hZVI system, in addition to medium size ZVI particles (e.g., 20-50 μm) and large size ZVI particles (e.g., 50-100 μm), the effectiveness of small size ZVI particles (e.g., 2-10 μm) was studied.

In the following experiments, three sizes of ZVI particle were used.

The first ZVI particle was a fine particle (referred to in the tests as 5 μm ZVI, Sunlight Sheds, Niagara Falls, N.Y.). This ZVI particle is a hydrogen gas-reduced iron particle having a mean particle size between 4.5 and 6.0 μm, and a particle size distribution: <1 μm (0.5% maximum); <3 μm (15.0% maximum); <15 μm (95.0% minimum); <20 μm (99.0% minimum) (Beckman Coulter Particle Size Analyzer). These ZVI particles are representative of small size ZVI particles (e.g., 2-10 μm).

The second ZVI particle was a medium-sized particle (referred to in the tests as 325-mesh ZVI, Sunlight Sheds, Niagara Falls, N.Y.). This ZVI particle is a hydrogen gas-reduced iron particle having a particle size<44 μm. The primary size of the iron particles ranged from 10 to 40 micron, with an iron purity of about 98%. These particles have a particle size distribution: NLT 100% through 100 mesh screen; NLT 95% through a 325 mesh screen; NMT 2% retained on a 200 mesh screen (ASTM E 11). These ZVI particles are representative of medium size ZVI particles (e.g., 20-50 μm).

The third ZVI particle was a large-sized particle (referred to in the tests as 100-mesh ZVI, Hepure Technology (Flemington, N.J.). This ZVI particle has a particle size<150 μm, with an iron purity of about 95.5% (impurities include carbon (1.75-4.50%), silicon (1.0-2.50%), sulfur (0.01-0.15%), and oxygen (2.5% maximum), and about 0.5% Mn impurity by weight). The particle size varies from about 5 to greater than 100 μm, with a specific gravity of 2.8-3.2 g/$cm^3$ and a BET surface area of 1.14 $m^2$/g. These ZVI particles are representative of large size ZVI particles (e.g., 50-100 μm).

The effect of ZVI particle size on hZVI system performance based on lab and field testing are described below.

Laboratory Tests

In the laboratory tests, a single hZVI reactor (constant stirred tank reactor, CSTR) system was used. A schematic illustration of the system is shown in FIG. 15.

Figure 15:
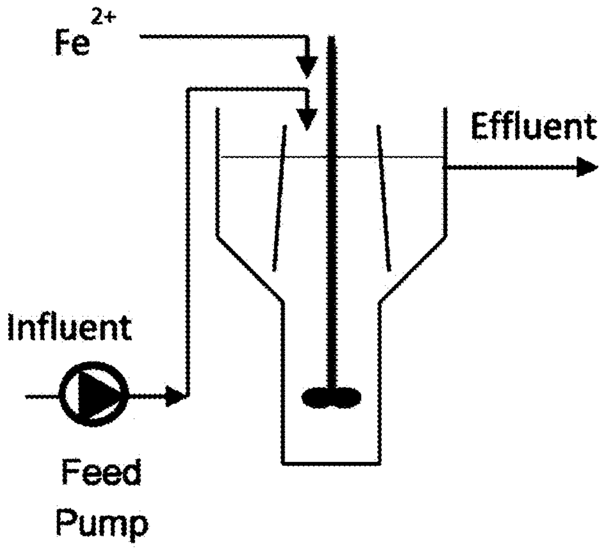
FIG. 15 is a schematic illustration of a representative single-stage activated iron treatment system.

Referring to FIG. 15, the system included a reactor (6-liter reaction (mixing) zone) and settling tank (4-liter settling zone).

hZVI Media Preparation. For these experiments, 300 g ZVI (50 g/L), 8.5 g $NaNO_3$ (0.10 mol) and 14.9 g $FeCl_2.4H_2O$ (0.075 mol) were added to the reactor. The reactor was operated in a batch mode (no influent and effluent) for 48 hrs to precondition the media. All nitrate was reduced after 2 days, magnetite was formed as a coating on the ZVI particles, and discrete magnetite particles were also formed. After preconditioning, the hZVI media included about 280 g ZVI and 30 g $Fe_3O_4$ (magnetite).

For the three tests, ZVI concentration was 50 g/L at start up to provide a standard condition for performance comparison. It will be appreciated that ZVI concentration can vary depending on wastewater characteristics, design loading, lifespan of media, and other factors. In the methods of the invention, the ZVI concentration can range from a low concentration of about 10 g/L to a high concentration of about 300 g/L. In certain embodiments, the ZVI concentration is from about 10 to about 50 g/L. In other embodiments, the ZVI concentration is from about 50 to about 100 g/L. In further embodiments, the ZVI concentration is from about 100 to about 300 g/L.

Test Conditions. The wastewater treated was synthetic wastewater prepared by spiking distilled water with 30 mg/L nitrate-N($NaNO_3$) and 10 mg/L selenate-Se ($Na_2SeO_4$). Wastewater was pumped into the reactor at a flow rate of 2 L/h, corresponding to a HRT=3 hr. 50 mM $FeCl_2$ solution was prepared and pumped into the reactor to maintain a concentration of 2 mM $Fe^{2+}$ in the reactor.

For the continuous-flow tests, synthetic wastewater was pumped into the reactor at a flow rate of 2 L/hr; and $Fe^{2+}$ reagent (as a 50 mM $FeCl_2$ stock solution) was pumped into the reactor at a flow rate of 0.08 L/hr into the reactor, corresponding to a dosage of 2 mM $Fe^{2+}$ per 1 L wastewater pumped into the reactor.

The tests were run conducted under atmospheric conditions (not anoxic conditions).

Results. The results are shown graphically in FIGS. 16A-16C (325 mesh), 17A-17C (100 mesh), and 18A-18C (5-μm).

Figure 16A:
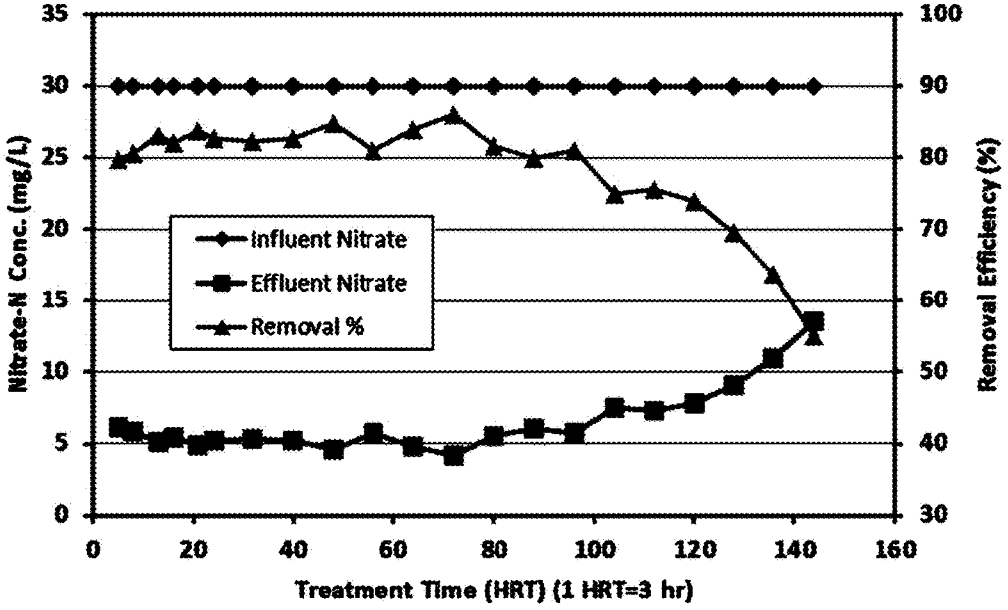
FIGS. 16A-16C compare results for a representative system and method of the invention utilizing 325 mesh ZVI: nitrate removal over time (16A); selenate removal over time (16B); and ZVI consumptions over time (16C).
Figure 17A:
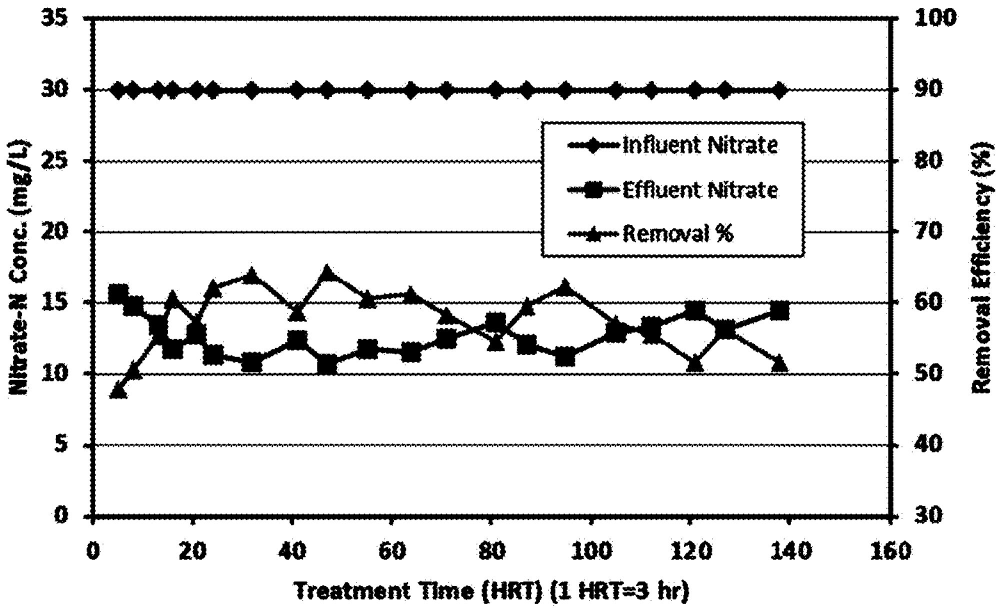
FIGS. 17A-17C compares results for an hZVI system and method utilizing 100 mesh ZVI: nitrate removal over time (17A); selenate removal over time (17B); and ZVI consumptions over time (17C).
Figure 18A:
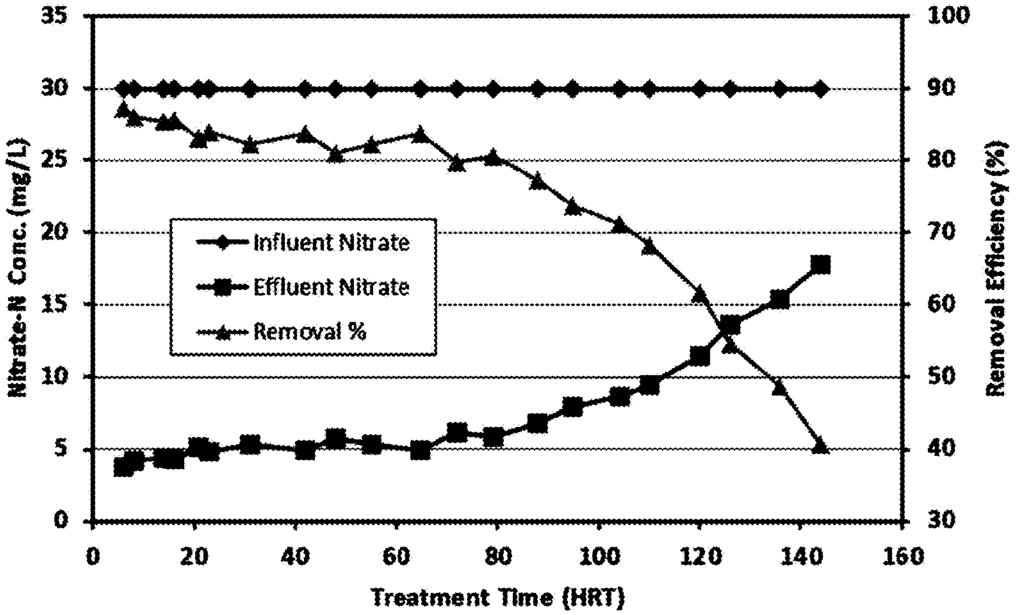
FIGS. 18A-18C compares results for an hZVI system and method utilizing 5 μm ZVI: nitrate removal over time (18A); selenate removal over time (18B); and ZVI consumptions over time (18C).

FIGS. 16A, 17A, and 18A compare nitrate-N concentration (mg/L) and nitrate removal efficiency (%) as a function of treatment time (HRT) (1 HRT=3 hr) for 325 mesh ZVI particles, 100 mesh ZVI particles, and 5 μm ZVI particles, respectively. Nitrate removal efficiency and the time period of efficient nitrate removal was best for 325 mesh ZVI particles followed by 5 μm ZVI particles, which suffered from a relatively pronounced fall off in efficiency over time. Nitrate removal efficiency and the time period of efficient nitrate removal was low, but relatively consistent for 100 mesh ZVI particles.

Figure 16B:
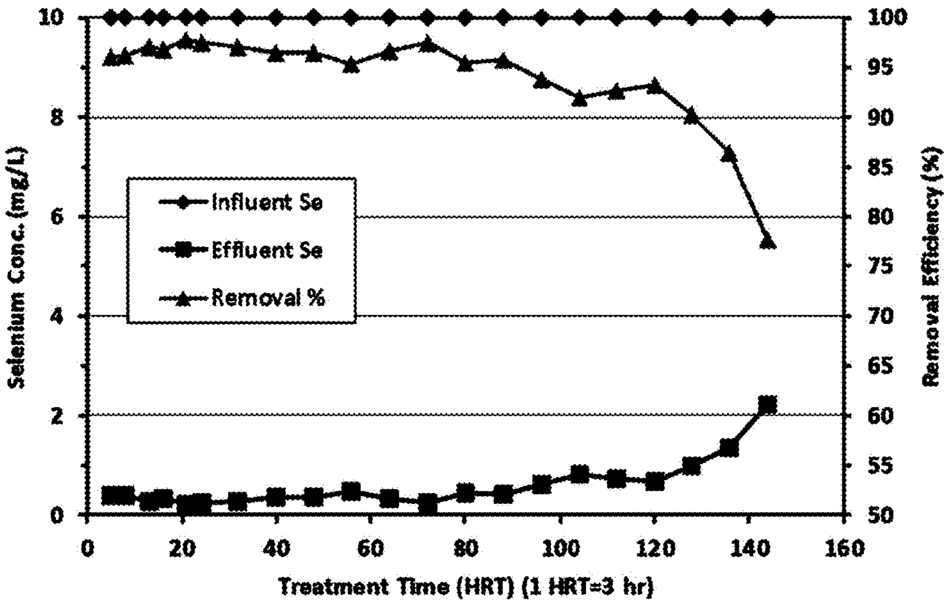
Figure 17B:
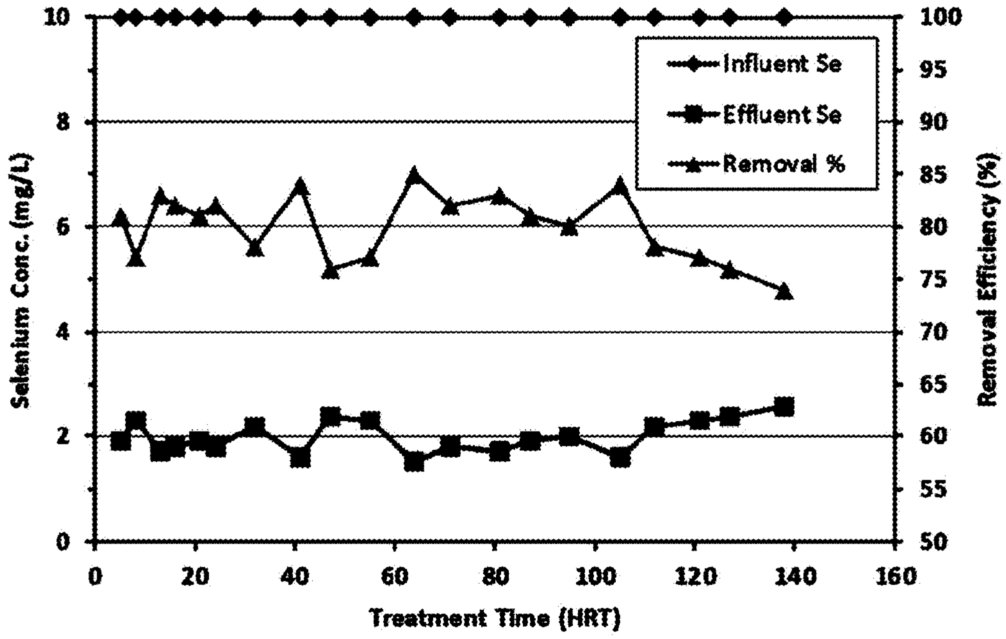
Figure 18B:
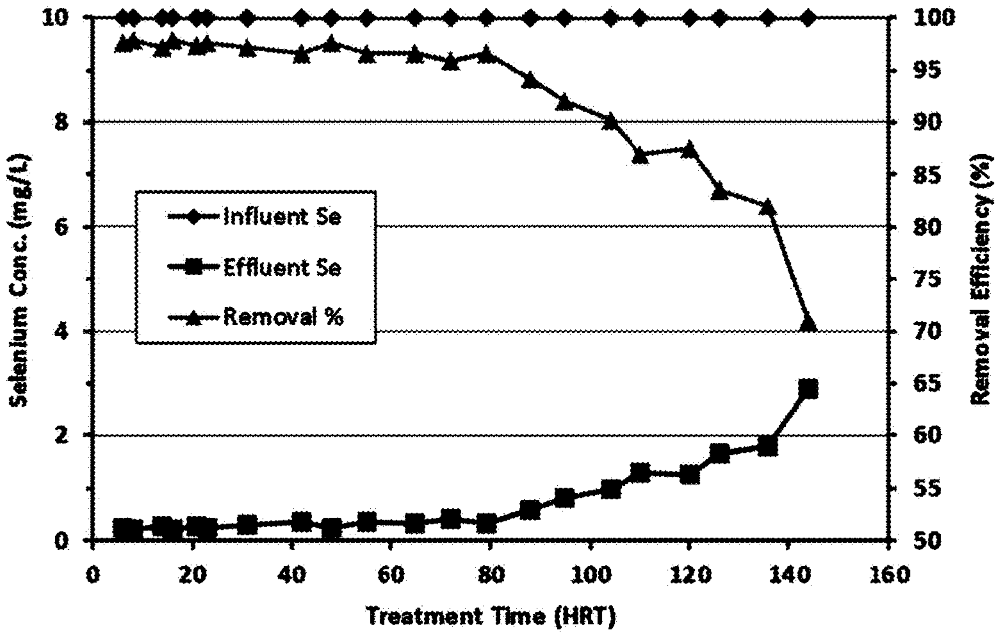

FIGS. 16B, 17B, and 18B compare selenium concentration (mg/L) and selenium removal efficiency (%) as a function of treatment time (HRT) (1 HRT=3 hr) for 325 mesh ZVI particles, 100 mesh ZVI particles, and 5 μm ZVI particles, respectively. Selenium removal efficiency and the time period of efficient selenium removal was best for 325 mesh ZVI particles followed by 5 μm ZVI particles, which suffered from a relatively pronounced fall off in efficiency over time. Selenium removal efficiency and the time period of efficient selenium removal was low, but relatively consistent for 100 mesh ZVI particles.

Figure 16C:
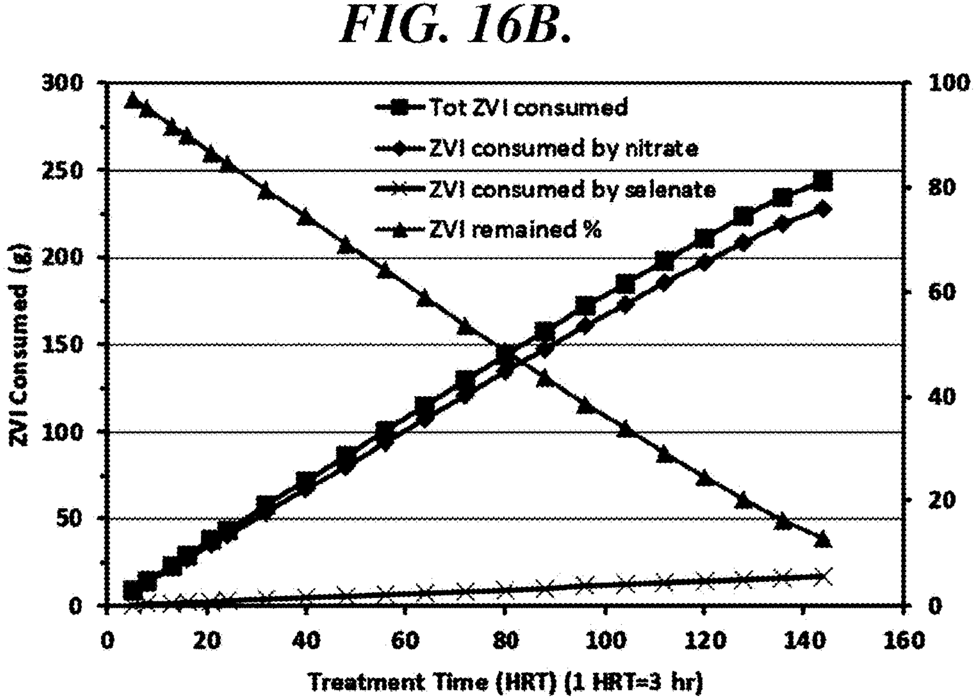
Figure 17C:
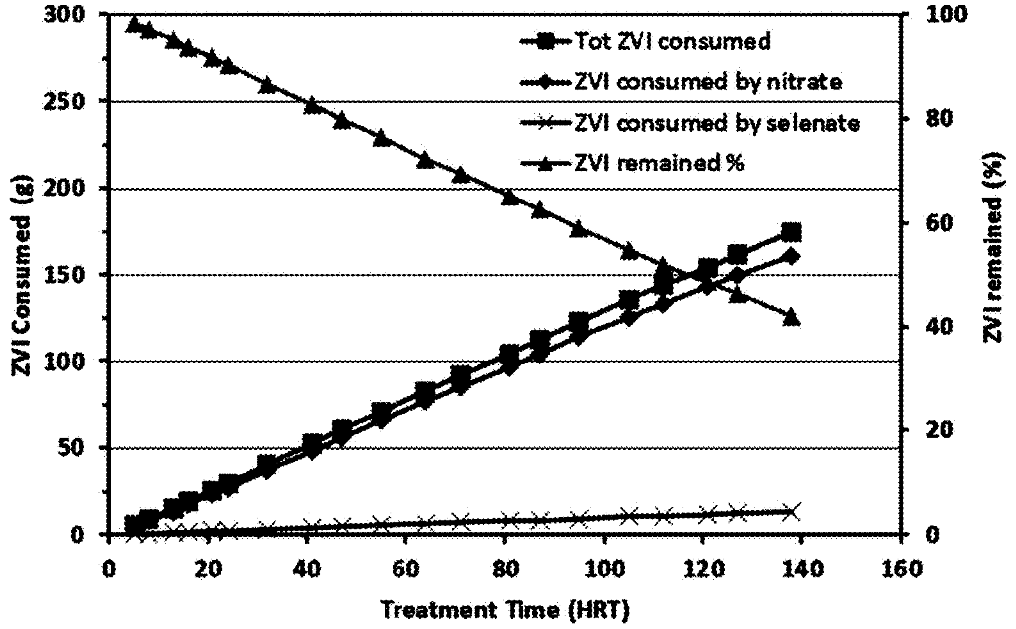
Figure 18C:
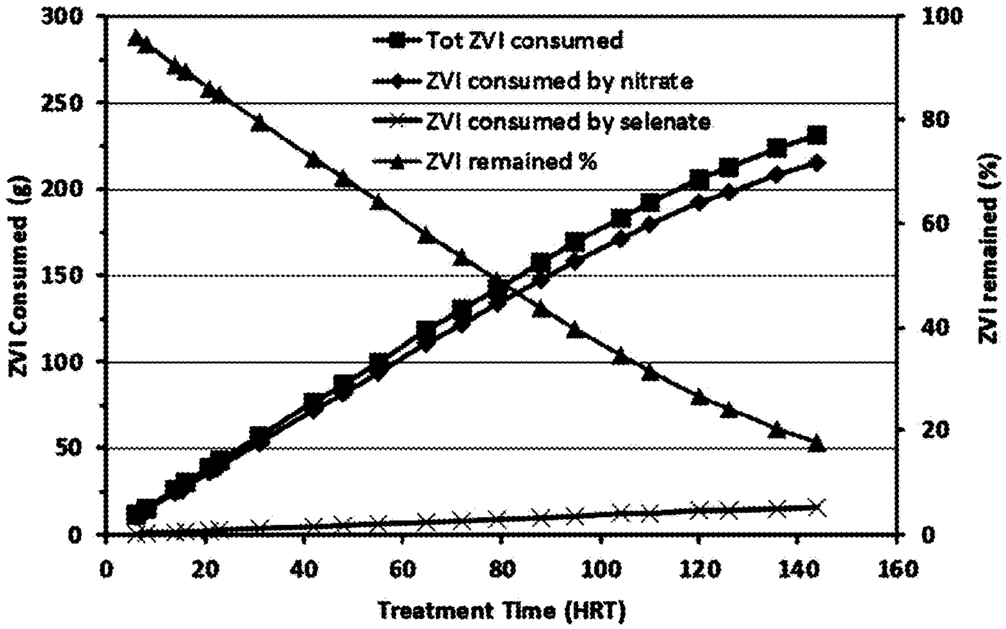

FIGS. 16C, 17C, and 18C compare ZVI consumed (g), total and by nitrate and selenium, and ZVI remaining (%) as a function of treatment time (HRTs) (1 HRT=3 hr) for 325 mesh ZVI particles, 100 mesh ZVI particles, and 5 μm ZVI particles, respectively. 325 mesh ZVI particles and 5 μm ZVI particles were consumed at about the same rate and more rapidly than 100 mesh ZVI particles.

The results showed that the hZVI system with 325 mesh ZVI particles consistently removed over 80% of nitrate for up to 96 HRTs (or 12 days) (FIG. 16A) and over 90% of selenate for up to 128 HRTs (or 16 days) (FIG. 16B). Selenate removal percentage was higher than that of nitrate. As the ZVI was consumed and its concentration decreased, system performance was not significantly decreased until ZVI dropped to below 40% of the initial concentration. In FIG. 16C, the amount of nitrate reduction and selenate reduction was used to calculate ZVI consumption based on redox reactions and their relevant stoichiometry (e.g., 1 nitrate contributes 8 electrons, 1 selenate also contributes 8 electrons). From this calculation, nitrate reduction is responsible for much of the theoretical ZVI consumption. Nitrate and selenate reduction efficiency did not decrease in parallel with the ZVI decrease due to its continuous consumption, but dropped rather abruptly only when ZVI consumption crossed 80%.

The results showed that the hZVI system with the 100-mesh ZVI particles could consistently remove about 50 to 65% of nitrate during the test period of 17 days (FIG. 17A) and about 75 to 85% of selenate (FIG. 17B). Compared to the 325 mesh ZVI results, it is clear that the system performance of both nitrate and selenate reduction was lower when the coarse ZVI media (100 mesh) was used. Nitrate reduction was responsible for much of the ZVI consumption (see FIG. 17C).

The results showed that the hZVI system with 5 μm size ZVI particles could consistently remove over 80% of nitrate (FIG. 18A) and about 95% of selenate for 11 days (FIG. 18B). Compared with the 325-mesh ZVI particle results, the system using 5 μm size ZVI particles achieve slightly better selenate and nitrate removal in the initial phase, but overall the performance difference between these two is relatively small. However, the system performance after 11 day run-time decayed rapidly and significantly with the fine ZVI media (5 μm size ZVI particles), suggesting that the fine ZVI media was consumed at a rate higher than projected by the reduction of nitrate and selenate. The lifespan of 5 μm size ZVI particles appears to be significantly shorter than the 325 mesh ZVI particles. One potential factor is that fresh ZVI can react with water through reaction $$Fe^0+2\ H_2O \rightarrow Fe^{2+}+H_2+2\ OH^-$$

until the ZVI surface is covered with a protective or passive iron oxide layer of certain thickness. As the particle size decreases, more surface area is available initially to react with water and thus a higher percentage of ZVI mass will be wasted by reacting with water.

Furthermore, the cost for 5 μm size ZVI particles is substantially higher than for 325 mesh ZVI particles, which are widely available at lower cost.

The above experiments utilized ZVI particles having three sizes: (1) 5 μm, (2) 325 mesh, and (3) 100 mesh. ZVI particles designated above as having a particle size of 5 μm are representative of zero-valent iron particles having a particle size from about 5 μm to less than about 20 μm. ZVI particles designated above as having a particle size of 325 mesh are representative of zero-valent iron particles having a particle size from about 20 μm to about 50 μm. ZVI particles designated above as having a particle size of 100 mesh are representative of zero-valent iron particles having a particle size from greater than about 50 μm to about 200 μm.

Pilot Tests

As noted above, zero valent iron particle size can be varied to provide optimal performance of the treatment system and method.

Larger particle size ZVI (e.g., 50 to about 200 microns) is used to avoid media (i.e., zero valent iron) loss. Smaller ZVI particle (e.g., 20 to about 50 microns) are more readily suspended in the reactor(s) and systems utilizing such particles and require less energy to maintain their suspension.

The following is a description of pilot tests that demonstrates advantageous performance for zero valent iron particles having a particle size from about 20 to about 50 microns.

Figure 19:
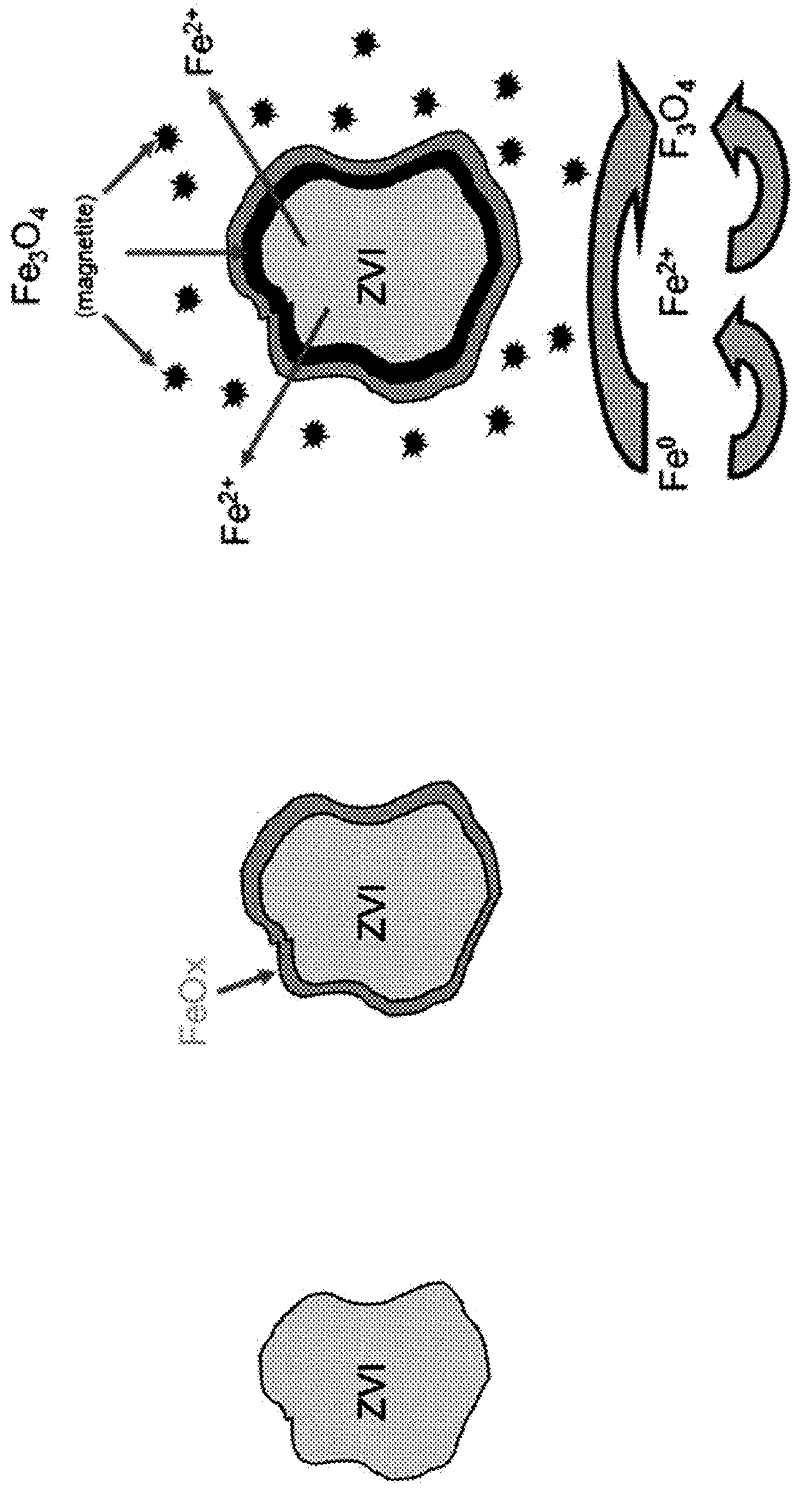
FIG. 19 is a schematic illustration of magnetite formation that occurs during treatment systems and methods of the invention that utilize zero valent iron.

FIG. 19 is a schematic illustration of magnetite formation that occurs during treatment systems and methods of the invention that utilize zero valent iron.

As noted herein, the systems and methods of the invention are useful for removing or reducing the concentration of oxyanions (e.g., nitrate, selenate, molybdate, chromate, silica, and arsenic) and heavy metals (e.g., copper, mercury, cadmium, arsenic, nickel, zinc, thallium) through immobilization via surface adsorption on $FeO_X$ produced from iron corrosion in the zero valent iron systems.

Figure 20:
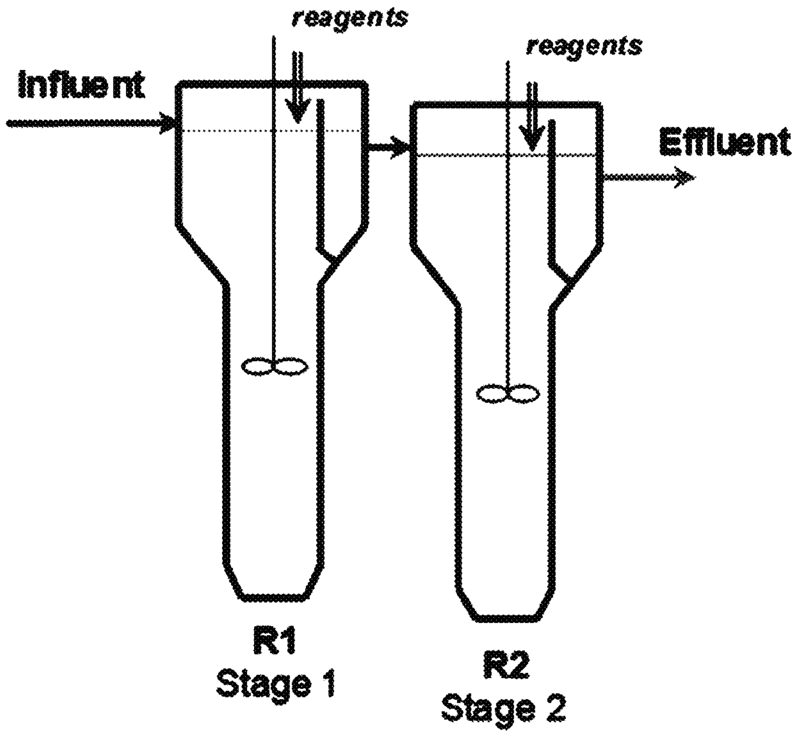
FIG. 20 is a schematic illustration of a representative two-stage system that utilizes two reactors.

FIG. 20 is a schematic illustration of a representative two-stage system that utilizes two reactors utilized in the pilot tests. The systems and methods of the invention can effectively remove or reduce the concentration of contaminants in industrial waters (FGD water and refinery water), among other water sources.

The following description relates to a pilot testing program having two phases that investigated the effectiveness of a representative system and method. In Phase 1 the feed water had high nitrate, included oxidants, and had low pH, and the zero valent iron particles had a particle size of 50 to 100 microns (e.g., first ZVI media). In Phase 2 the feed water had lower nitrate, no oxidants, and neutral pH, and the zero valent iron particles had a particle size of 20 to 50 microns (e.g., second ZVI media, Hepure Technology, Flemington, N.J.). The influent differences for Phases 1 and 2 are summarized in FIG. 21. During these pilot studies, the pond temperature ranged from 43-85° F., the treatment system temperature dropped at times to 32° F. due to ambient conditions, and the pH ranged from 3.5 to 7.2 and was not adjusted.

Figure 22:
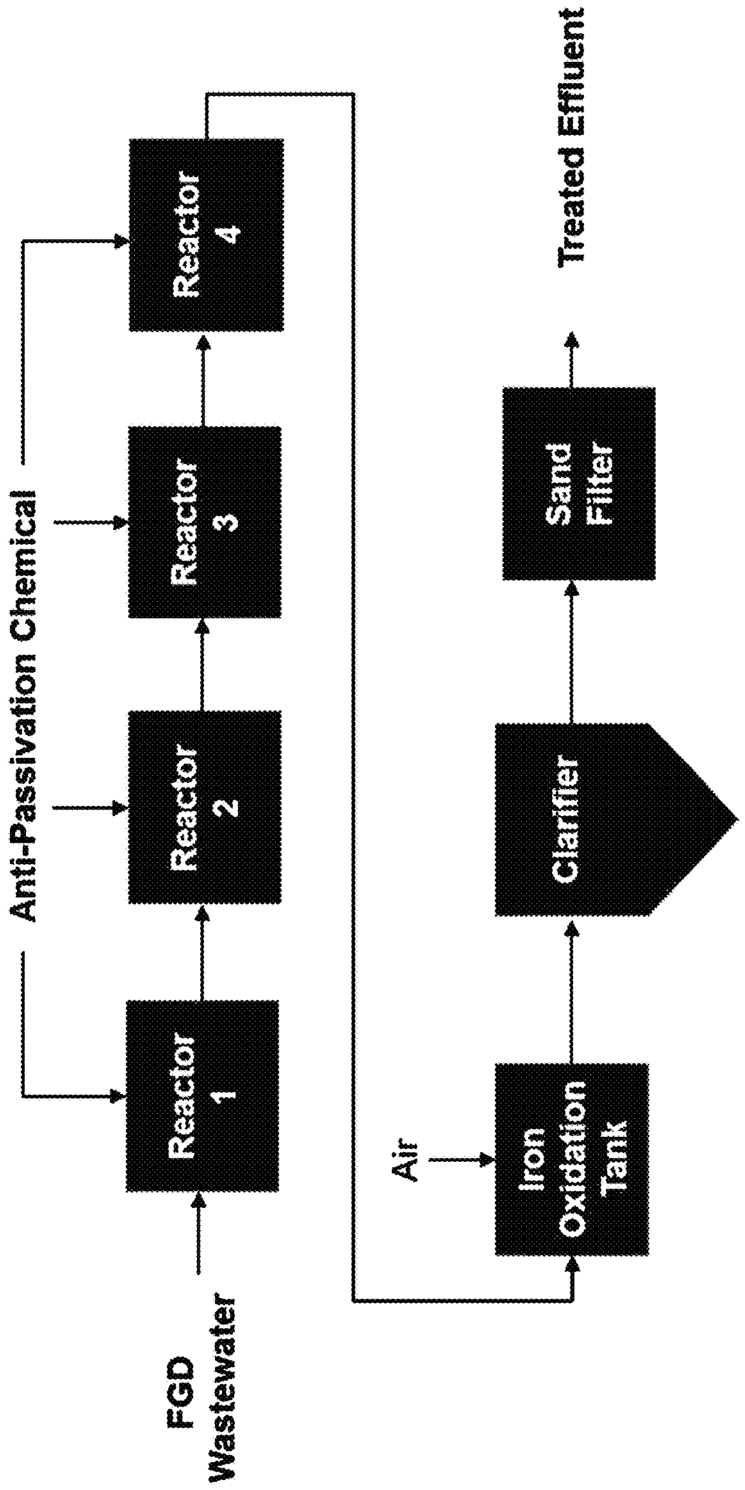
FIG. 22 is a block flow diagram for Phase 1 of the pilot testing program. The Phase 1 system included four reactors, each including anti-passivation chemicals.

A block flow diagram for Phase 1 is shown in FIG. 22. Referring to FIG. 22, the Phase 1 system included four reactors, each including an anti-passivation chemical (e.g., aqueous ferrous chloride, Hawkins, Inc., Roseville, Minn.).

Selenium removal for Phase 1 is summarized in FIG. 23. As summarized in FIG. 23, under the conditions studied, average selenium removal was 88% and maximum removal was 99.7%.

Figure 24:
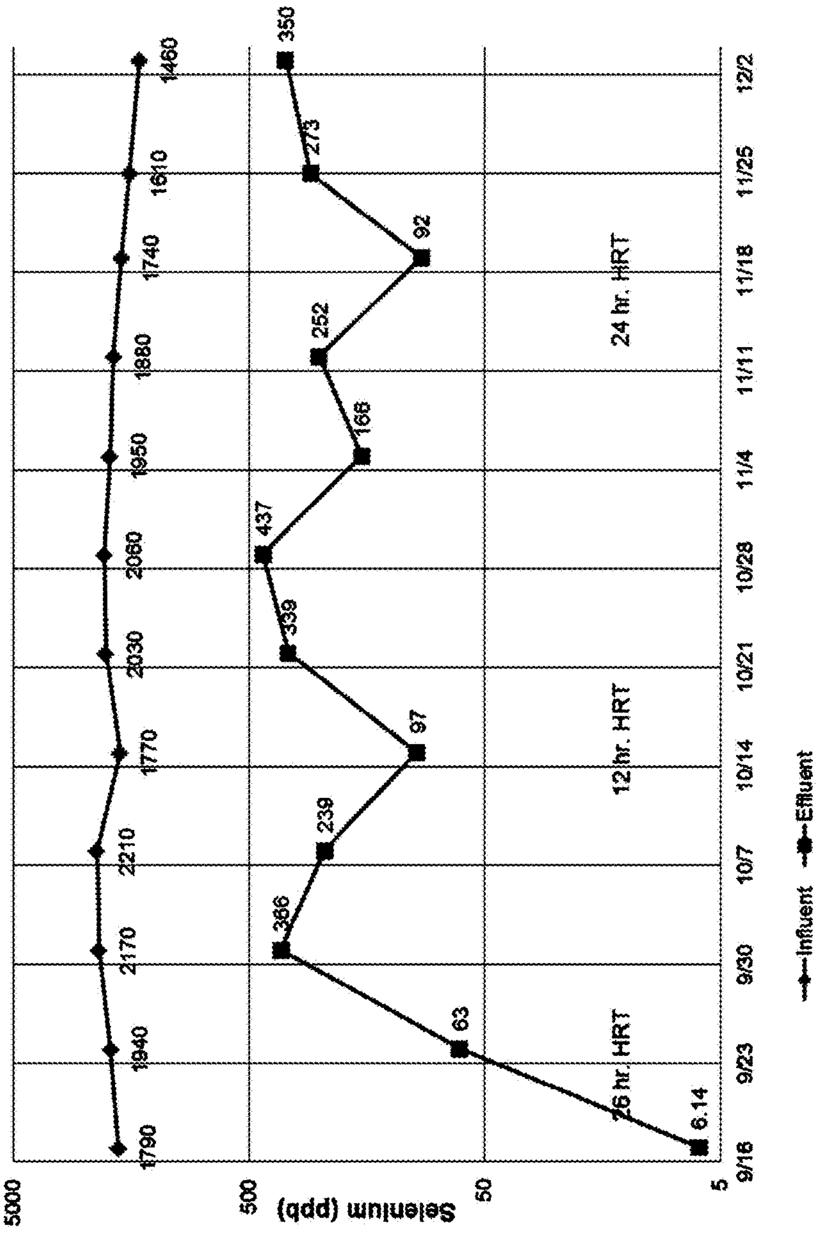
FIG. 24 summarizes results (semi-log plot) for selenium removal for Phase 1 of the pilot testing program.

Selenium results for Phase 1 are summarized in FIG. 24.

Results for other parameters for Phase 1 are summarized in FIG. 25.

In Phase 2 changes to the pilot system were evaluated. The zero valent iron particle size was decreased, a higher concentration of ZVI was used in the reactors, and solids recycle was utilized to maintain the ZVI media in the reactors. For the influent water in Phase 2, the pH was changed from pH 3.5 to 7.1, nitrate concentration was reduced from about 70 to about 30 mg/L, excess oxidant was removed, selenium was reduced from about 2000 to about 170 ug/L, and chloride was increased from about 3500 to 6500 mg/L.

Figure 26:
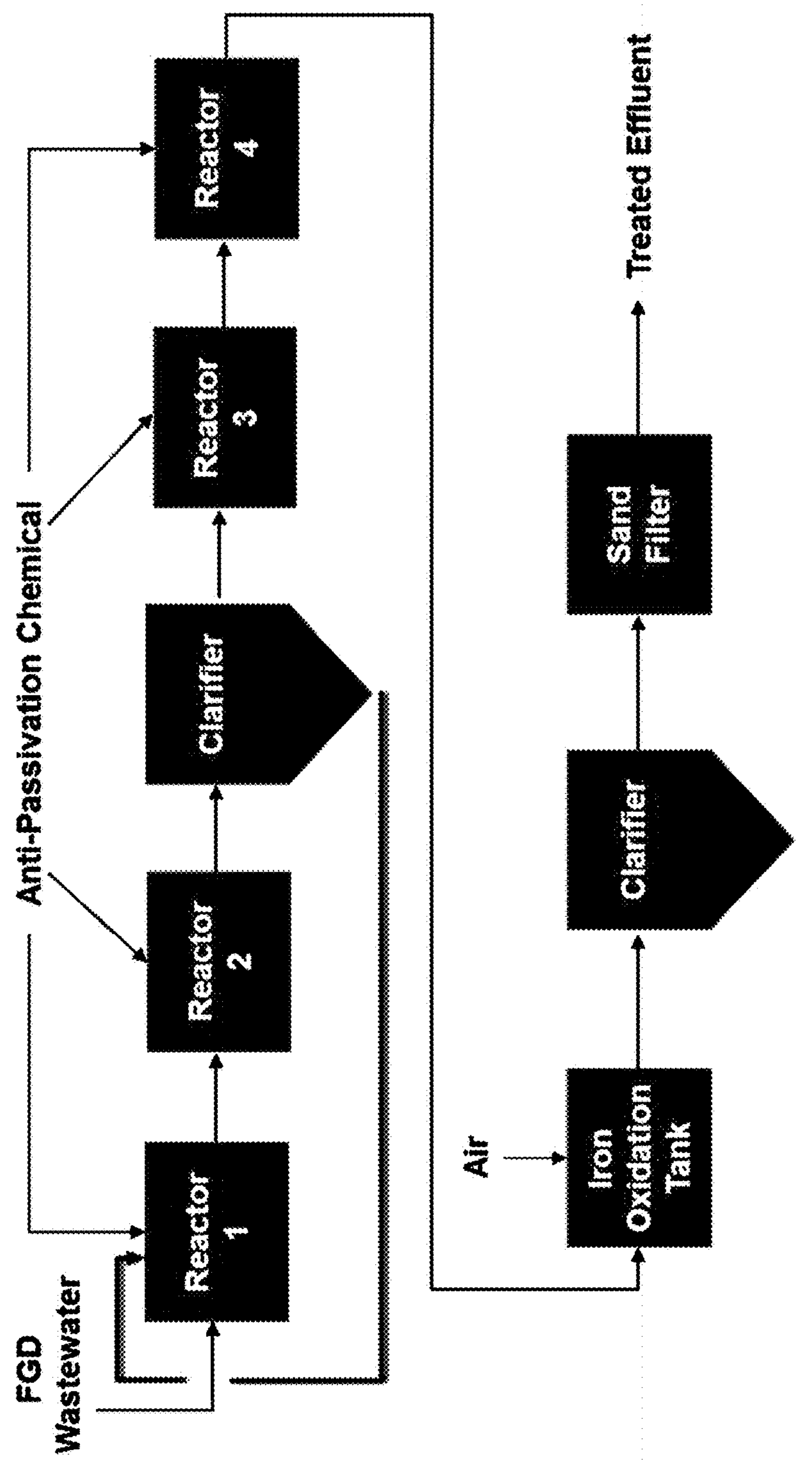
FIG. 26 is a block flow diagram for Phase 2 of the pilot testing program. The Phase 2 system included four reactors, each including anti-passivation chemicals.

A block flow diagram for Phase 2 is shown in FIG. 26. Referring to FIG. 26, the Phase 2 system included four reactors, each including an anti-passivation chemical (e.g., aqueous ferrous chloride, Hawkins, Inc., Roseville, Minn.).

Selenium removal for Phase 2 is summarized in FIG. 27. As summarized in FIG. 27, under the conditions studied, average selenium removal was 94.7% and maximum removal was 98.5%.

Figure 28:
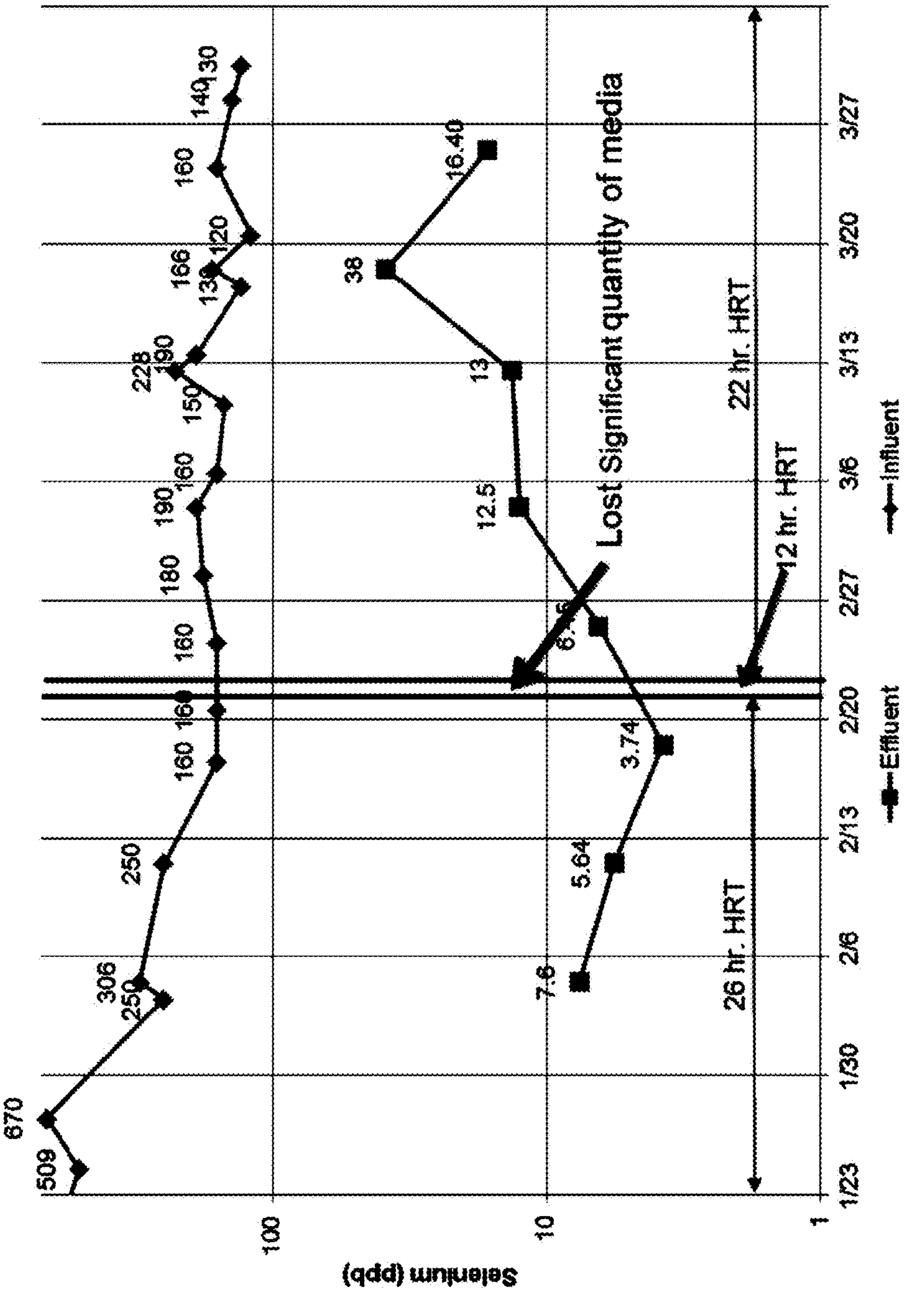
FIG. 28 summarizes results (semi-log plot) for selenium removal for Phase 2 of the pilot testing program.

Selenium results for Phase 2 are summarized in FIG. 28.

Results for other parameters for Phase 2 are summarized in FIG. 29.

Phase 2 results demonstrated significant consistent low selenium content (less than about 10 ppb).

The results demonstrated consistent compliance with USEPA TCLP Tests. See FIG. 30.

Comparison of the Phase 1 and Phase 2 results demonstrated more effective removal of selenium with a ZVI particle size of 20-50 μm as compared to use of a larger ZVI particle size of 50-100 μm.

ZVI Particle Size

In view of the above, while ZVI particles having mean particle size from about 5 to about 200 are effective in removing or reducing the concentration of contaminants in wastewaters, ZVI particles of particular mean particle size can be advantageously used depending on the nature of the treatment system, wastewater, and the nature of wastewater contaminants.

In certain aspects, the invention provides systems and methods for removing or reducing the concentration of a contaminant in a fluid. In the methods, a fluid comprising a reducible contaminant is contacted with a reactive solid and a secondary reagent (e.g., ferrous iron) is introduced to the fluid in contact with the reactive solid.

In the methods and systems of the invention, the reactive solid comprises zero-valent iron and one or more iron oxide minerals in contact therewith. The reactive solid is prepared from zero-valent iron having a particle size from about 5 μm to about 200 μm. In certain embodiments, the reactive solid is prepared from zero-valent iron having a particle size from about 5 μm to less than about 20 μm. In other embodiments, the reactive solid is prepared from zero-valent iron having a particle size from about 20 μm to about 50 μm. In further embodiments, the reactive solid is prepared from zero-valent iron having a particle size from greater than about 50 μm to about 200 μm; and in certain of these embodiments, the reactive solid is prepared from zero-valent iron having a particle size from about 50 μm to about 100 μm.

The ZVI particle sizes specified herein refer to mean ZVI particle sizes (i.e., mean diameter). It will be appreciated that particles within these ranges have a distribution of particles sizes that may fall outside the specified range. For example, ZVI particles having a particle size about 5 μm to about 200 μm refer to ZVI particles having a mean particle size in the specified range and a particle size distribution from about 3 μm to about 300 μm. ZVI particles having a particle size about 5 μm to less than about 20 μm refer to ZVI particles having a mean particle size in the specified range and a particle size distribution from about 1 μm to about 50 μm. ZVI particles having a particle size about 20 μm to about 50 μm refer to ZVI particles having a mean particle size in the specified range and a particle size distribution from about 1 μm to about 100 μm. ZVI particles having a particle size from greater than about 50 μm to about 200 μm refer to ZVI particles having a mean particle size in the specified range and a particle size distribution from about 10 μm to about 350 μm.

In the context of the ZVI particle size specified herein, the term "about" refers to +/−5% of the recited value.

C. Ferrous Iron

Ferrous iron in the hybrid ZVI reactive system may exist in various forms: dissolved $Fe^{2+}$ (including levels of $FeOH^+$ and $Fe(OH)_2$ at near neutral pH), surface-bound Fe(II) (either adsorbed or precipitated, generally reactive), and incorporated reactive Fe(II) (e.g., the Fe(II) in the non-stoichiometric $Fe_3O_4$), and structural non-reactive Fe(II) (such as Fe(II) in aged $Fe_3O_4$). Some embodiments may entail more than one type of ferrous iron. For example, in some embodiments, a porous passivating ferric oxide may partially cover an iron oxide mineral in a composite, with the pores of the porous passivating ferric oxide allowing $Fe^{2+}$ in solution to diffuse to the surface of the iron oxide mineral so as to become surface bound Fe(II).

A variety of sources may supply ferrous iron. In some embodiments, $FeCl_2$ is the source of ferrous iron. In some embodiments, $FeSO_4$ is the source. $FeCl_2$ and $FeSO_4$ are widely available and generally inexpensive in comparison to other ferrous iron sources. Other examples include ferrous bromide and ferrous nitrate. One may also generate $Fe^{2+}$ in situ in a separate reactor: for example, one may add strong acids (such as HCl, $H_2SO_4$, or $HNO_3$) to dissolve Fe(0) or $FeCO_3$ to provide $Fe^{2+}$. Persons of skill in the art are familiar with sources of ferrous iron.

Generally speaking, ferrous iron is disposed so as to facilitate maintenance of the iron oxide mineral comprised in a composite, and wherein the composite is active for removing a contaminant from a fluid. Ferrous iron may be present as $Fe^{2+}$ dissolved in an aqueous solution, such as an acidified aqueous solution. Adding small concentration of a strong acid (e.g., less than 10 mM HCl, such as 5 mM HCl) helps stabilize the solution. In a non-acidified $Fe^{2+}$ solution, hydrolysis of $Fe^{2+}$ may occur, which will form $Fe(OH)_2$ floc and be oxidized to form iron oxide precipitate. In some embodiments, ferrous iron is present as surface-bound Fe(II), such as bound to the surface of an iron oxide mineral. Fe(II) may be incorporated into reactive solids. As discussed herein, the present inventor contemplates that one possible role of Fe(II) is that surface bound Fe(II) facilitates formation and maintenance of the iron oxide mineral. Surface bound Fe(II) may facilitate conversion of ferric oxide to magnetite. Surface bound Fe(II) species may be labile. For example, a surface bound Fe(II) species may undergo one or more of the following: exchange with one or more of $Fe^{2+}$ in solution and Fe(II) in the iron oxide mineral, change valence state, or be oxidized. As a surface bound Fe(II) species undergoes a labile process it may be replenished so as to maintain the concentration of surface bound Fe(II).

In some embodiments, aluminum ion, $Al^{3+}$, may substitute for ferrous iron (e.g., added as aluminum sulfate).

D. Oxidants

Some embodiments discussed herein may involve oxidizing or oxidizing environments. For example, a contaminant removal process may include sustaining an iron corrosion reaction by providing ferrous ion to a reaction zone and maintaining the reaction zone in an oxidizing environment. Addition of ferrous ion in the presence of an oxidant in situ typically facilitates formation of activating material in situ. The oxidizing environment may be a solution may contain an oxidant, such as a dissolved oxidant. It will also be understood that a corrosion coating may result on zero-valent iron in an oxidizing environment.

In some embodiments, the hybrid ZVI/$FeO_X$/Fe(II) demonstrates high efficiency in removing dissolved oxygen carried in a fluid (e.g., feed water). Depending on temperature and other factors as is known in the art, the dissolved oxygen level in a contaminated fluid (e.g., wastewater) may vary. For example, when saturated at ambient temperature, dissolved oxygen in water may be in the range of about 7 mg/L to about 14 mg/L. In some embodiments, such as regarding a multi-stage hybrid ZVI reactor configuration, dissolved oxygen was observed to drop from about 8.0 mg/L in feed water to below 0.1 mg/L in the first stage and was non-detectable (<0.05 mg/L) in the subsequent stages. Aeration may then be optionally applied. For example, when aeration is applied, the dissolved oxygen level may slightly increase to, e.g., 0.3 mg/L. This means that any dissolved oxygen introduced through aeration may be rapidly consumed by the hybrid ZVI reactive system. Enhanced corrosion of ZVI by externally added dissolved oxygen may help improve removal of other contaminants and impurities in the water, in some embodiments.

Non-limiting examples of oxidants include dissolved oxygen, nitrate, nitrite, selenate, hypochlorite, hydrogen peroxide, iodate, periodate, bromate, and the like, and combinations thereof. An oxidant may be an oxyanion, such as selenate, nitrate, nitrite, iodate, or periodate. As discussed herein, oxidant is consumed in the activation process when a portion of the zero-valent iron is oxidized to form activating material. For example, 10 mg/L of nitrate-N may be externally added to accelerate the iron corrosion process and promote the removal of target contaminants.

When the oxidant is dissolved oxygen, the dissolved oxygen may be provided through aeration. Dissolved oxygen may also serve as an oxidant to generate magnetite, as is known in the art. Low-intensity aeration in the early stage may accelerate the magnetite-coating process and assist with contaminant removal, such as removal of dissolved silica and toxic metal removal. An example of low-intensity aeration in a bench-scale set-up is about 20-50 mL air/min per liter reactor volume at a depth of 10 cm. High-intensity aeration should be avoided because it may form large quantities of ferric oxides even in the presence of dissolved $Fe^{2+}$ and moreover, it will likely waste ZVI. An example of high-intensity aeration in a bench-scale set-up is over 50 mL air/min per liter reactor volume at a depth of 10 cm, where some of the air bubbles are allowed to circulate through the mixing propeller to enhance the aeration effect. In some embodiments, aeration is not employed.

Oxidants may be naturally-occurring in the fluid to be treated, such as wastewater, or may be externally added. When the oxidant is nitrate, nitrite, or selenate, the oxidant may be provided as a dissolved salt. Persons of skill in the art are familiar with oxidant sources. Other additives besides oxidants that may be employed in embodiments herein are described next.

E. Other Additives

In some embodiments, additives may be employed along with Fe(0) and $Fe^{2+}$, such as an additive that promotes mercury removal, or promotes removal of other toxic metals such as lead, copper, cadmium, or zinc. Additives may be externally added or generated in situ. Most dissolved toxic metal ions (e.g., mercury ions and lead ions) may bind with sulfide ions to form metal sulfides that are extremely low in solubility. According to some embodiments, a method of treating an aqueous fluid incorporates a chemical process to generate inorganic sulfide ions and introduce the sulfide ions into a treatment process that results in rapid precipitation and significantly improved removal efficiency of dissolved toxic metal including mercury and many other toxic metals of major environmental concern.

Accordingly, an additive may comprise a sulfide, such as an iron sulfide. An iron sulfide may be selected from among FeS, $FeS_2$, and combinations thereof. An iron sulfide may be pyrite. The additive sulfide may be an aqueous ion (also called dissolved ionic sulfide) or may be in the form of a solid. A particle may comprise the additive sulfide, such as iron sulfide particles. Organosulfides may be employed for assistance with toxic metal removal. Sulfide is typically added as about 1-10 mg ion/L of fluid. For most applications in which toxic metals are present in low or sub-ppm level (e.g., 10 ppm or less), addition of low ppm level of sulfide (e.g., 10 ppm or less) is sufficient to precipitate all of the concerned toxic metals. Sulfide may be generated in situ and may still be considered an additive.

Figure 4:
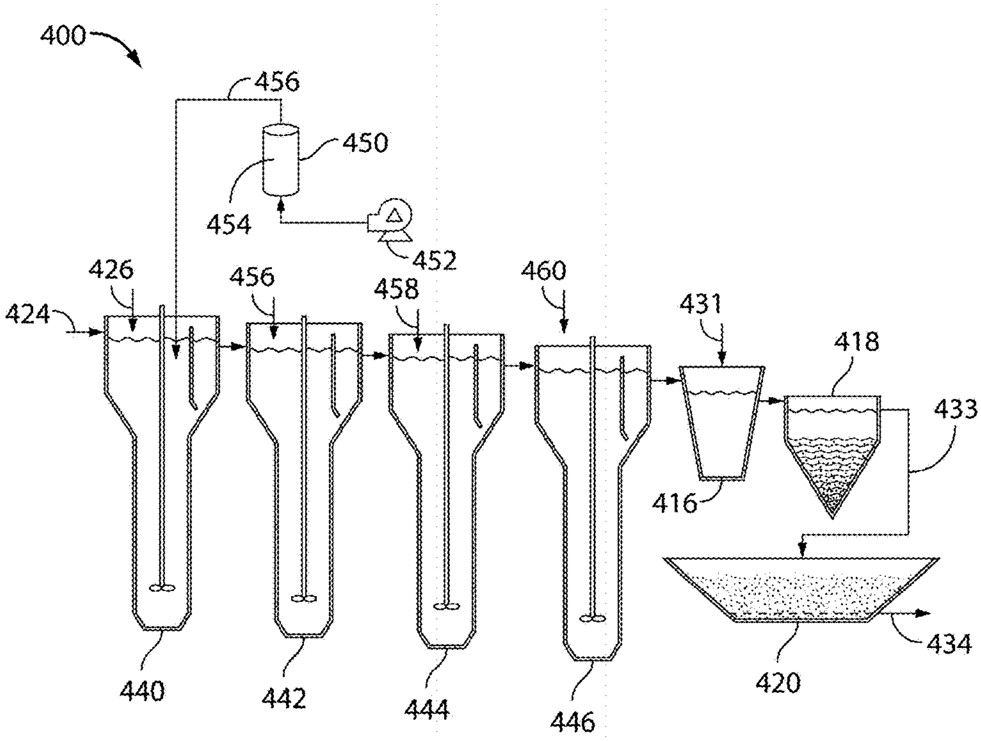
FIG. 4 is a flow-chart of a hybrid ZVI/$FeO_X$/Fe(II) prototype treatment system incorporating a sulfide generator.

Sulfide generation may use a sulfide generator. The sulfide generator may be a standalone toxic metal treatment system or a subsystem that may be incorporated into other treatment processes such as those employing a hybrid zero-valent iron/$FeO_X$/Fe(II) composite. Referring to FIG. 4, a reactor system may include a standalone sulfide generator. The standalone sulfide generator may produce small amount of sulfide ions before introduction into the reactor. The sulfide ions may contribute to precipitating toxic metals. The sulfide generator may be a packed-bed filter column filled with a powder (optionally mixed with sand to improve porosity and hydraulic conductivity). The powder may be a sulfide generating material. For example, the powder may be FeS or $FeS_2$.. A low concentration acid (e.g., 0.005 M HCl) may be flowed through the column to dissolve the powder and steadily and gradually release a stream of acid leachate rich in sulfide ions to add into the reactor. Addition of sulfide ions to the reactor is particularly useful for removal of mercury lead, copper, cadmium, zinc and the like from a liquid stream.

A filter cartridge filled with FeS as reactive material may be employed as a sulfide generator. When low concentration of acid flows through the FeS filter, acid may gradually dissolve FeS to become $Fe^{2+}$ and $S^{2-}$ (<0.0025M). Because $H_2S$ has high solubility in water (about 3.8 g/L or 0.11 M $H_2S$ at 20° C.), the small concentration of $S^{2-}$ will remain dissolved in water and therefore no $H_2S$ gas bubble will be formed, which may minimize the danger posed by toxic $H_2S$ gas. FeS acid-leaching solution may be introduced into a treatment reactor where the dissolved sulfide ion may bind with various toxic metal ions and precipitate and mineralize together with other solid phase material (e.g., various iron oxide minerals in the hybrid zero-valent iron/$FeO_X$/Fe(II) water treatment system). For most applications in which toxic metals are present in low or sub-ppm level, addition of low ppm level of sulfide is sufficient to precipitate all of the concerned toxic metals. The residual $S^{2-}$ may be readily precipitated by the dissolved $Fe^{2+}$ (accompanied with $S^{2-}$) and other non-toxic metals present in the water, and therefore pose no threat in the treated effluent.

As another example, additives such as trace amount of various metal ions (e.g., $Al^{3+}$) may contribute to enhanced toxic metal removal (e.g., mercury) through complex co-precipitation processes in the presence of high concentration of $FeO_X$ in the hybrid ZVI reactors. Depending on the specific wastewater quality and treatment level required, the amount of additives required could be as low as 1 ppm, which may be considered as "trace." In some applications, however, higher concentrations of these supplementary reagent may be needed to achieve a desired activity.

In some embodiments, periodate, iodate, or phosphate may be considered an additive. Such agents may enhance removal of $Hg^{2+}$, as described herein in experiments involving FGD water treatment. These additives may be used in combination or in isolation. These agents may be supplied in the form of soluble iodide or phosphate salts, for example. Amounts of periodate, iodate, or phosphate added are typically less than 10 ppm. The exact amount needed will depend on the specific water quality.

An additive may be employed to improve removal of dissolved silica, particularly in comparison to the use of zero-valent iron alone. The presence of maghemite ($\gamma$-$Fe_2O_3$) may improve removal of dissolved silica. Maghemite may be in the form of particles of maghemite. Maghemite formation in situ has been observed when zerovalent iron is aerated to promote iron corrosion in the presence of dissolved $Fe^{2+}$ and optionally in the absence of nitrate, selenate, or other oxidants. The present inventor believes that the maghemite is produced by oxidation of magnetite. Thus, according to some embodiments, an additive comprises maghemite, wherein maghemite is typically formed in situ.

F. pH

Some embodiments described herein, such as contaminant-removal processes, may be performed at near neutral pH. For example, reactive zone 111 in FIG. 1 may be maintained near neutral pH. The pH may be between 6 and 8. The pH may be between 7 and 8. In some embodiments, a pH of 6.5-7.5 is maintained. In some embodiments, a pH of 6.8-7.2 is maintained, such as in a fluidized zone. In some embodiments, a pH of 7.0-7.5 is maintained. Oxidation of a secondary reagent (e.g., $Fe^{2+}$) will consume alkalinity in a system and therefore will lower the pH. To accelerate oxidation of a secondary reagent in the context of a single-stage reactor, e.g., FIG. 1, aeration basin 116 may maintain a pH of above 7.0. Chemicals such as CaO, $Ca(OH)_2$, NaOH, and $Na_2CO_3$ may be used for pH control as well as HCl.

Once a system is started up successfully, the system requires only low-level maintenance effort. With respect to pH control, routine operation and maintenance include one or more of:

- Monitor the quality of fluid (e.g., wastewater) entering the system, including assessing pH, alkalinity, acidity, total suspended solid (TSS). Of course, toxic constituents in the raw wastewater should be monitored.
- Monitor the pH in the fluidized reactive zone. Performance of the system depends, in part, on pH. For a single-stage system, pH in the reactive zone is typically maintained within 6.5 to 7.5. However, increasing operating pH in the reactor to near 8.0 may achieve a much better borate removal. HCl and $FeCl_2$, for example, may be used to control the system.
- Monitor the pH in the aeration basin. Dissolved $Fe^{2+}$ may be oxidized more rapidly at pH>7.0. Formation and settling properties of ferric oxide flocculent depends also on pH. Therefore, it is recommended that aeration basin be operated at pH 7.5-8.0.

II. Fluids

A variety of fluids may be treated according to embodiments discussed herein. Fluids to be treated typically comprise a contaminant, such as a toxic material (e.g., a toxic metal or metalloid). A fluid may comprise a fluid stream. A fluid stream may comprise a waste stream. A fluid may be aqueous, such as wastewater. A fluid may comprise an aqueous stream. A fluid may comprise an influent stream. A fluid may comprise an industrial waste stream. "Industrial waste stream" refers to liquid streams of various industrial processes. An industrial waste stream may be produced at any stage of a process. A waste stream may be wastewater, which herein refers to a primarily water-based liquid stream. Wastewater may be synthetic or simulated wastewater. A fluid may be flue gas desulfurization (FGD) wastewater. A fluid waste may comprise oil refinery waste. A fluid may be tail water of a mining operation. A fluid may comprise stripped sour water. The aqueous fluid may comprise a suspension. Other examples of fluids include tap water, deionized water, surface water, and groundwater. Wetlands may comprise a fluid. A fluid may be an influent stream. A fluid may have a near-neutral pH. A fluid may have a substantially neutral pH. A fluid may have a pH between 6 and 8. A fluid may comprise an oxidant or other additive, as discussed herein.

Various treatment flow rates may be employed. In some embodiments, flow rate is about, at most about, or at least about 50, 100, 200, 300, 400, 500, 600, 700, 800, 900, or 1000 gallons per minute (gpm), or more, or any range derivable therein. In some embodiments, fluid is treated at a rate ranging up to about 1000 gpm, such as in embodiments regarding treating FGD streams, such as in the context of power plant operation. In some embodiments, fluid is treated at a rate ranging up to and including 600 gpm, such as in embodiments regarding treating stripped sour water in the context of refinery plant operation.

III. Contaminants And Contaminant Removal

A variety of contaminants may be removed from a contaminated fluid using embodiments discussed herein. A contaminant may be a toxic metal. Toxic metals exist in various dissolved forms (e.g., metal ions or various oxyanions). In FGD wastewater, for example, $Hg^{2+}$ is the main concern. Similarly, Cu and Zn may exist as metal ions ($Cu^{2+}$ and $Zn^{2+}$). For Se, selenate ($SeO_4^{2}$) may be present in greatest quantities, but selenite ($SeO_3^{2}$) or selenocyanate ($SeCN^-$) may be present. Arsenic may exist as arsenate ($AsO_5^{3-}$) or arsenite ($AsO_3^{3-}$). Chromium may exist as chromate ($CrO_4^-$). One or more of these ions may be considered a contaminant. Persons of skill in the art are familiar with the types of toxic metals that exist in contaminated fluids.

According to some embodiments, toxic metals are encapsulated within iron oxide crystalline (mainly magnetite powder) that are chemically inert and physically dense for easier solid-liquid separation and final disposal. Contaminants may be removed as precipitates. A contaminant may be reduced and then removed, such as when the contaminant is selenate, which may be reduced by employing methods described herein to selenite, which may be further reduced to elemental selenium and removed. As another example, iodate or periodate may be reduced to iodide by employing methods described herein.

Non-limiting examples of contaminants include toxic materials, such as toxic metals. Non-limiting examples of toxic metals include arsenic, aluminum, antimony, beryllium, mercury, selenium, cobalt, lead, cadmium, chromium, silver, zinc, nickel, molybdenum, thallium, vanadium, and the like, and ions thereof. Metalloid pollutants are also contemplated as contaminants, such as boron and the like, and ions thereof. Other contaminants include oxyanion pollutants, such borates, nitrates, bromates, iodate, and periodates, and the like. Combinations of contaminants are also contemplated, such as combinations of arsenic, mercury, selenium, cobalt, lead, cadmium, chromium, silver, zinc, nickel, molybdenum, and the like, and ions thereof; metalloid pollutants such as boron and the like and ions thereof; and oxyanion pollutants, such as nitrate, bromate, iodate, and periodate, and the like. Alternatively or in combination, the contaminant may be dissolved silica. A contaminant may be a nitrite or a phosphate. A contaminant may be selenium or selenate. A contaminant may be hexavalent selenium. A contaminant may be copper (e.g., $Cu^{2+}$ or $Cu^{+}$). A contaminant may be a radionuclide.

A contaminant may be a chlorinated organic compound. The use of zero-valent iron to treat chlorinated organics has been practiced in environmental remediation in the past. The known practices involve using zero-valent iron as reactive media to build underground permeable reactive barriers to treat trichloroethylene (TCE) plumes in contaminated ground water. Zero-valent iron as a reductant may react with these halogenated compounds and remove chlorine from the molecular (dechlorination). Some embodiments disclosed herein employ above-ground fluidized bed zero-valent iron reactors to treat fluids contaminated with chlorinated organic compounds such as TCE.

More than one contaminant may be removed or reduced in concentration at the same time (e.g., simultaneously, or in the same reactor, or in the presence of a single reactive zone).

Reductions in contaminant concentration may be achieved by employing embodiments described herein. For example, the reduction in contaminant concentration may be greater than 70%. The reduction in contaminant concentration may be greater than 80%. The reduction in contaminant concentration may be greater than 90%.

In some embodiments, greater than 97% of arsenic, lead, chromium, cadmium, vanadium, zinc, or nickel is removed. In some embodiments, arsenic, lead, cadmium, chromium, or vanadium is reduced to a sub-ppb level. In some embodiments, greater than 97% arsenic is removed. In some embodiments, less than 0.1 mg/L arsenic is achieved. In some embodiments, greater than 99.9% arsenic is removed. In some embodiments, greater than 70% boron is removed. In some embodiments, boron is removed in the form of borate. In some embodiments, borate is removed at a pH of about 8.0. In some embodiments, greater than 99% cadmium is removed. In some embodiments, greater than 98% chromium is removed. In some embodiments, greater than 99.8% zinc is removed. In some embodiments, greater than 99.8% vanadium is removed. In some embodiments, greater than 80% nitrate is removed. In some embodiments, greater than 99% nitrate is removed. In some embodiments, nitrate-N is reduced to below 10 mg/L. In some embodiments, nitrate-N is reduced to below 0.2 mg/L. In some embodiments, phosphate is removed to an undetectable level.

In some embodiments, about 90% mercury is removed. In some embodiments, greater than 99.9% mercury is removed, such as in a first stage. In some embodiments, greater than 99.95% mercury is removed. In some embodiments, greater than 99.99% mercury is removed. In some embodiments, mercury is removed to less than 0.2 μg/L. In some embodiments, mercury is removed to less than 0.005 μg/L. In some embodiments, mercury is removed to less than 0.5 ppb. In some embodiments, mercury is removed to less than 12 ppt or ng/L. In some embodiments, mercury is removed to less than 0.01 ppb. In some embodiments, mercury is removed to less than 5 ppt.

In some embodiments, such as in a single-stage system, 90% selenate is removed. In some embodiments, such as in a three-stage system, 96% selenate is removed. In some embodiments, about 99.8% selenate is removed. In some embodiments, greater than 98% of selenium is removed. In some embodiments, greater than 99.8% selenium is removed. In some embodiments, selenium, existing primarily as selenate ion, is reduced to less than 7 μg/L. In some embodiments, selenium is reduced to less than 0.1 mg/L. In some embodiments, selenium is reduced to less than 50 ppb. In some embodiments, selenium is reduced to less than 25 ppb. In some embodiments, selenium is reduced to less than 10 ppb.

In some embodiments, the reduction in dissolved silica concentration is greater than 70%. In some embodiments, the reduction in dissolved silica concentration is greater 80%. In some embodiments, the reduction in dissolved silica concentration is greater than 90%. In some embodiments, over 95% of dissolved silica is removed. In some embodiments, dissolved silica is reduced to below 10 mg/L. In some embodiments, dissolved silica is reduced to below 1.0 ng/L. In some embodiments, dissolved silica is removed to below 5 ppm, such as after a first stage. When the reactive system is a multi-stage reactor system, the first reactor stage may be primarily for removal of dissolved silica from a liquid stream and one or more later stages may be for other treatment of the liquid stream. In some embodiments, removal of dissolved silica consumes only about 0.5 mg zero-valent iron and 0.3 mg ferrous iron for each 1 mg of dissolved silica.

IV. Dissolved Silica Removal

As noted above, a contaminant may be dissolved silica. Embodiments herein may promote precipitation of dissolved silica from a fluid. Such embodiments typically have an advantage of economy, such as through low operating costs of using inexpensive materials. Further, the environmental benefits are also provided, such as by reducing both the amount of solid waste produced by dissolved silica removal and the energy consumption of the dissolved silica removal process. Still further, embodiments have the advantage of effective operation at neutral pH and ambient temperature, increasing efficiency.

Accordingly, some embodiments may comprise a composite for dissolved silica removal. Composites are described herein. The composite may comprise zero-valent iron and a supplementary material, which may be transformed into an activating material by virtue of exposure to a secondary reagent. Supplementary materials, secondary reagents, and activating materials are described herein. Alternatively or in combination, the composite may be produced in situ as part of the dissolved silica removal process. The activating material may be adapted to overcome the tendency of zero-valent iron to passivate in solution. Thus, the activating material may act as a promoter, in that the composite has increased activity for dissolved silica removal as compared to zero-valent iron alone. As discussed herein, dissolved silica may contribute to passivation of zero-valent iron, and ferrous iron may facilitate removal of dissolved silica from a contaminated fluid. Alternatively or in combination, the activating material may be adapted to electronically mediate an electrochemical reaction between the zero-valent iron and dissolved silica so as to facilitate precipitation of dissolved silica. Thus, the activating material may be semi-conducting. High concentrations of $FeO_X$ maintained in the reactor may contribute to the removal of dissolved silica by providing large surface area with surface charge conditions conducive to polymerization of dissolved silica. $FeO_X$ may be present as magnetite ($Fe_3O_4$). Maghemite ($\gamma$-$Fe_2O_3$) may also be present in the reactor.

In some embodiments, a dissolved silica removal process may involve contacting an influent stream with a plurality of composite particles so as to produce an effluent stream, where the effluent stream is reduced in dissolved silica with respect to the influent stream. The dissolved silica removal process may utilize a reactive system that includes a reaction zone including a fluidized bed reactor and a plurality of composite particles in the fluidized bed in the reactor. The contacting may occur in the reaction zone. The reactive system may include a plurality of reaction zones. For example, the reactive system may be a multi-stage reactor system. The reduction in the concentration of dissolved silica of the effluent stream with respect to the influent stream may be greater than 70%. For example, the reduction may be at least 80%. For example the reduction may be at least 90%. When the reactive system is a multi-stage reactor system, the first reactor stage may be primarily for removal of dissolved silica from a liquid stream and one or more later stages for other treatment of the liquid stream. For example, later stages may remove toxic materials.

A fluidized bed reactor may include an internal settling zone. The internal settling zone may help to retain a high concentration of iron corrosion products. Thus, the settling zone may facilitate the maintenance of the activating material in the composite. For example, the internal settling zone may further provide extra surface area to facilitate adsorption, polymerization, and precipitation of dissolved silica. Colloidal or precipitated silica floc, when retained in the reactor, may also contribute to polymerization and precipitation of dissolved silica.

A reactive system may further include ferrous iron as ion in solution. The ferrous iron may be adsorbed on the surface of the composite solid. While not wishing to be limited by theory, a continuous corrosion reaction of zero-valent iron may play a role in promoting rapid polymerization of dissolved silica. Addition of external ferrous ion ($Fe^{2+}$) may play a role in inducing formation of a magnetite coating on zero-valent iron and maintaining high reactivity of zero-valent iron at near neutral pH.

V. Exemplary Reactor System Of FIG. 1

According to some embodiments, referring to FIG. 1, reactor 110 includes internal settling zone 114 in communication with a reactive zone 111. The reactor is illustrated in schematic in FIG. 1. According to some embodiments, reactive zone 111 is maintained near neutral pH. According to some embodiments, internal settling zone 114 uses gravitational forces to separate solids from liquids. According to some embodiments, mostly liquids remain in settling zone 114. According to some embodiments, internal settling zone 114 is towards the top of reactor 110 (FIG. 1). According to some embodiments, communication with reactive zone 111 is via inlet 115 at the bottom of the internal settling zone 114. According to some embodiments, effluent 125 is removed from the top region of internal settling zone 114.

According to some embodiments, the effluent is very clear. It will be understood that a clear effluent is illustrative of an effluent substantially free of removable solids. As disclosed herein, removable solids may contain magnetite. Magnetite is known to be black. The present inventor believes that settling for a separating method is particularly efficient. However, other suitable separating methods are contemplated.

Still referring to FIG. 1, according to some embodiments, reactive zone 111 includes central conduit 113. Central conduit 113 improves mixing. For example, according to some embodiments, central conduit 113 promotes convective motion.

Still referring to FIG. 1, according to some embodiments, reactor system 100 operates in part as fluidized bed reactor 110 that employs motorized stirrer 138 in conjunction with central flow conduit 113 to create circular flow 119 within reactor 110 and provide an adequate mixing between reactive solids 122 and wastewater 124. Internal settling zone 114 was created to allow solid-liquid separation and return of the solid into fluidized zone 112. It will be understood that as used herein the term "fluidized bed reactor" is defined to refer to a reactor that provides a flow of reactive solids within the reactor so as to provide mixing between reactive solids and wastewater. According to some embodiments, the reactor includes a stirrer and operates similarly to a stirred tank reactor. According to some embodiments, flow is created by a conventional method known to one of ordinary skill in the art for creating flow in a fluidized bed reactor and the reactor operates with a conventional fluidized bed. Single-stage fluidized bed system 100 includes fluidized reactive zone 112, an internal solid/liquid separating zone 114, an aerating basin 116, final settling basin 118, and optional sand filtration bed 120.

Still referring to FIG. 1, fluidized zone 112 is the main reactive space where reactive solid 122, in the form of particles, is mixed with wastewater 124 and secondary reagent 126 and where various physical-chemical processes responsible for toxic metal removal occur.

Still referring to FIG. 1, internal settling zone 114 allows particles to separate from water and be retained in fluidized zone 112. For high density particles, an internal settling zone with a short hydraulic retention time is sufficient for complete solid/liquid separation. This eliminates the need of a large external clarifier and a sludge recycling system.

Still referring to FIG. 1, aeration basin 116 has at least two purposes: (1) to eliminate residual secondary reagent in effluent 125 from fluidized zone 112; and (2) to increase the dissolved oxygen level. For a single-stage reactor, effluent from fluidized reactive zone will typically contain certain amount of secondary reagent. Oxidation of secondary reagent will consume alkalinity and therefore will lower the pH. In some embodiments, to accelerate oxidation of secondary reagent, aeration basin 116 is maintained at a pH of above 7.0. Chemicals such as $Ca(OH)_2$, NaOH, and $Na_2CO_3$ may be used for pH control.

Still referring to FIG. 1, final settling tank 118 is to remove flocculent formed in aeration basin 116. The floc (fluffy) settled to the bottom may be returned as returned sludge 132 to fluidized zone 112 and transformed by secondary reagent 126 into dense particulate matter.

Still referring to FIG. 1, upon final settling, sand filtration bed 120 may be used to further polish the intermediate treated water 133 before discharge as treated water 134.

Still referring to FIG. 1, the post-FBR (fluidized bed reactor) stages (aeration-settling-filtration) may not be needed under certain operation conditions.

Still referring to FIG. 1, shown also are wastewater pump 136, reagent pumps 137, auxiliary reagent 127 (e.g., HCl), air 128, and pH control chemical 130.

VI. Exemplary Reactor System Of FIG. 2 And Multi-Stage Systems

Figure 2:
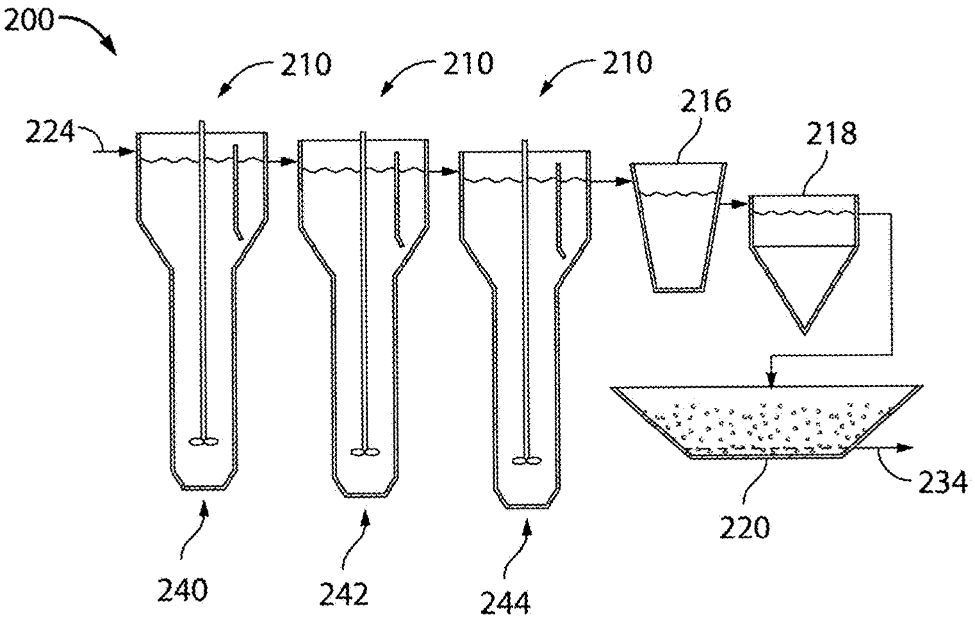
FIG. 2 is a flow chart illustrating a three-stage reactive system.

Referring now to FIG. 2, several fluidized bed reactors 210 may be combined to form a multi-stage treatment system 200. It is recommended that each stage maintain its own reactive solid. That is, the solids are separated in each stage. In order to achieve a separate solid system, each stage may have its own internal solid-liquid separation structure.

Still referring to FIG. 2, depending on operating conditions in FBRs 240, 242, 244, wastewater 224 characteristics, and discharge 234 standards, the post FBR treatments (aeration 216+final clarifier 218+sand filtration 220) may not be needed.

Although a multi-stage system is more complex and may result in a higher initial construction cost, a multi-stage fluidized bed reactor system may have several major advantages.

A multi-stage system may achieve higher removal efficiency than a single-stage system under comparable conditions. Further, the FGD wastewater may contain certain chemicals (e.g., phosphate and dissolved silica) that may be detrimental to the high reactivity of the reactive solids. A multi-stage system may intercept and transform these harmful chemicals in the first stage and thus reduce the exposure of the subsequent stages to the negative impact of these detrimental chemicals. As such, a multi-stage configuration is more stable and robust.

A multi-stage configuration facilitates the control of nitrate reduction, for example in an iron-based system. In a single-stage system, because the presence of dissolved oxygen carried in raw wastewater, it tends to be difficult to operate the system in a rigorous anaerobic environment. In a multi-stage system, stage 1 may remove virtually all dissolved oxygen; as a result, the subsequent stages may be operated under a rigorous anaerobic environment. Methods of operating reactors under anaerobic environments are known in the art.

A multi-stage system allows flexible control of different chemical conditions in each individual reacting basin. The chemical conditions in each reactive basin may be controlled by adjusting the pumping rate of supplemental chemicals and turning aeration on or off. A multi-stage system may be operated in a mode of multiple feeding points. Each stage may be operated under different pH and dissolved oxygen conditions.

A multi-stage system will typically lower chemical consumption. In a single-stage complete-mixed system, secondary reagent in the reactor is desirably maintained at a relatively high concentration in order to maintain high reactivity of reactive solids. As a result, the residual secondary reagent in the effluent will be high. This means that more secondary reagent will be wasted and more neutralizer (e.g., NaOH or lime) consumption will be required to neutralize and precipitate the residual secondary reagent in the effluent. As a result, more solid sludge will be produced and waste disposal cost will increase. In a multi-stage system, residual secondary reagent from stage 1 may still be used in stage 2. In this case, secondary reagent may be added in a way that conforms to its actual consumption rate in each stage. As a result, it is possible to control residual secondary reagent in the effluent in the final stage to be much lower than the one in a single-stage system.

VII. Exemplary Single-Stage Fluidized Bed Of FIG. 3

Figure 3:
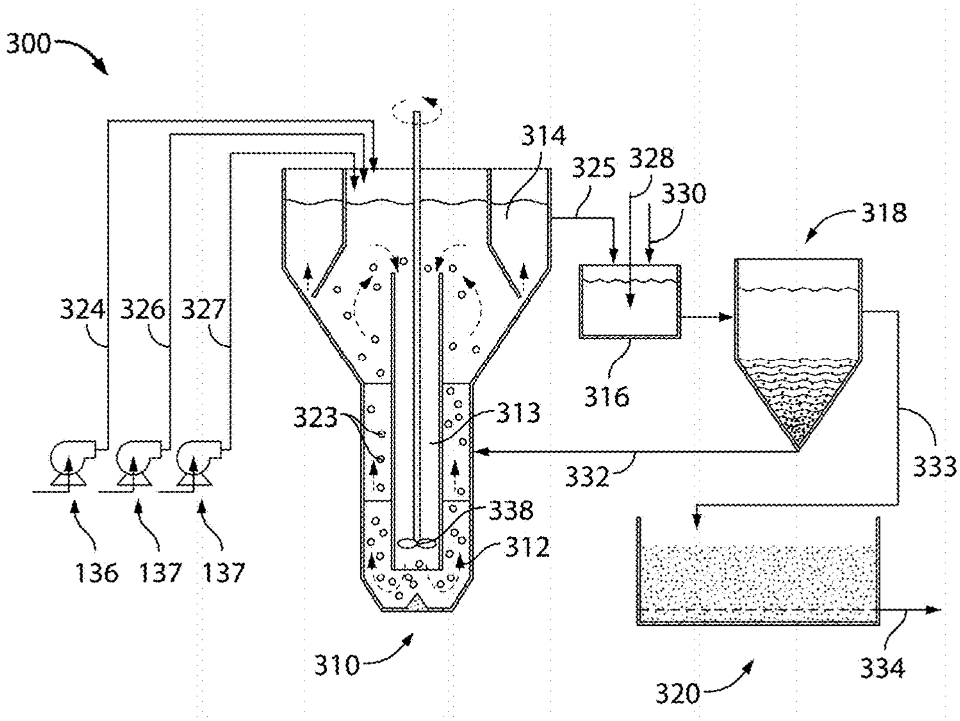
FIG. 3 is a schematic illustrating a single-stage fluidized bed ZVI/$FeO_X$/Fe(II).

Referring to FIG. 3, according to some embodiments, in the system and process illustrated by FIG. 1, the reactive solid 323 includes zero-valent iron (ZVI) and iron oxide mineral ($FeO_X$), and the secondary reagent is $Fe^{2+}$. Thus, referring to FIG. 3, single-stage fluidized bed ZVI/$FeO_X$/Fe (II) system 300 includes a fluidized reactive zone 312, an internal solid/liquid separating zone 314, an aerating basin 316, a final settling basin 318, and an optional sand filtration bed 320. Iron-based system 300 may be operated under various controlled conditions as needed.

Still referring to FIG. 3, fluidized zone 312 is the main reactive space where ZVI and $FeO_X$ reactive solids are mixed with wastewater 324 and dissolved $Fe^{2+}$ 326 and where various physical-chemical processes responsible for toxic metal removal occur.

Still referring to FIG. 3, internal settling zone 114 is to allow ZVI and $FeO_X$ to separate from water and be retained in fluidized zone 112. Because of high density of fully or partially crystallized $FeO_X$ particles, an internal settling zone with a short hydraulic retention time would be suffice for complete solid/liquid separation. This eliminates the need of a large external clarifier 318 and a sludge 332 recycling system.

Still referring to FIG. 3, aeration basin 330 has at least two purposes: (1) to eliminate residual dissolved $Fe^{2+}$ in the effluent from fluidized zone; and (2) to increase dissolved oxygen level. For single-stage reactor 310, effluent from fluidized reactive zone 312 will typically contain certain amount of dissolved $Fe^{2+}$. Oxidation of $Fe^{2+}$ will consume alkalinity and therefore will lower the pH. In some embodiments, to accelerate oxidation of dissolved $Fe^{2+}$, aeration basin 316 may be maintained at a pH of above 7.0. Chemicals such as $Ca(OH)_2$, NaOH, and $Na_2CO_3$ may be used for pH control.

Still referring to FIG. 3, final settling tank 318 is to remove iron oxide flocculent formed in aeration basin 316. The ferric oxide floc (fluffy) settled to the bottom may be returned as returned sludge 332 to the fluidized zone 312 and transformed by $Fe^{2+}$ into dense particulate matter.

Still referring to FIG. 3, upon final settling, sand filtration bed 320 may be used to further polish the treated water before discharge.

Still referring to FIG. 3, reactive solid 323 may initially be zero-valent iron, with the iron oxide mineral formed in situ. The iron oxide mineral may coat the zero-valent iron. Reactive solid 323 may be in the form of particles.

Still referring to FIG. 3, shown also are wastewater pump 336, reagent pumps 337, auxiliary reagent 327 (e.g., HCl), air 328, and pH control chemical 330.

Figure 5:
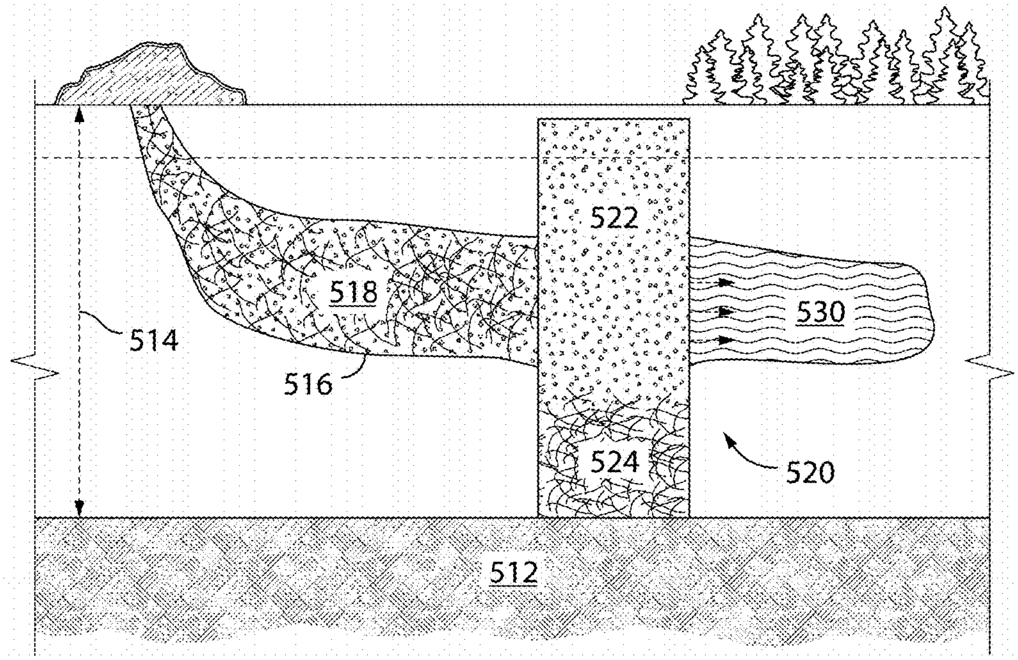
FIG. 5 is a schematic illustrating treatment of groundwater.

VIII. FIG. 5 And Exemplary Treatment Of Groundwater

Referring to FIG. 5, according to some embodiments, zero-valent iron (ZVI) is used to build a permeable reactive barrier for remediation of groundwater. FIG. 5 shows bedrock 512, permeable zone 514, contaminated plume 516, toxic materials of 518 (e.g., chlorinated organics, heavy metals), permeable reactive barrier 520, heavy metals retained 522, organics degraded 524, and remediated groundwater 530.

IX. Reactor Configuration Considerations

Most known applications employing zero-valent iron for contaminant removal involve using packed bed zero-valent iron filter rather than a continuous stirred tank reactor (CSTR). Packed-bed zero-valent iron filter may be employed, in some embodiments, such as treating low-strength water (e.g., urban storm run-off). In some situations regarding packed beds, treatment results may not be as good as a fluidized bed design (CSTR) due to several potential drawbacks that may need to be addressed individually or in combination:

- Zero-valent iron filter bed may become clogged or cementize rapidly during the operation. Iron oxides formed through zero-valent iron corrosion may reduce the porosity of filter bed and clog the flow pathways. Moreover, various water constituents (e.g., calcium and dissolved silica) may precipitate and cementize the filter bed. For FGD water treatment application, for example, oversaturated calcium in the raw wastewater may precipitate and clog the filter bed rapidly (e.g., in a few days).
- Because zero-valent iron filter bed is stationary, contact between a fluid and reactive material is typically not as efficient as a fluidized bed. A fluidized bed may ensure that all or substantially all zero-valent iron particles come into sufficient contact with a fluid (e.g., wastewater). The mass transfer rate between the bulk liquid and the solid/liquid surface reactive sites in a fluidized bed reactor may be much faster than a fixed bed reactor.
- Once clogged, it may be very difficult to remove the spent zero-valent iron and replenish with new reactive media. The filter may be permanently damaged.
- In terms of chemistry, a zero-valent iron filter bed may have different chemistries at different zones. For example, the inlet zone may have quite a different chemistry than the middle and outlet zones. In contrast, for a fluidized bed reactor, one may control the entire reactor, such as to run at a homogeneous chemical environment. When that environment is favorable, it may help achieve high performance.

Iron oxide may build up on the surface of zero-valent iron grains and thereby increase the mass transfer resistance. A fluidized bed reactor may strip off mature and aged iron oxides from the surface of zero-valent iron grains and thereby maintain a relatively thin and reactive surface iron oxide layer.

X. Further Exemplary Embodiments

According to some embodiments, a treatment system for treating a fluid stream comprises a chemical reactor system comprising a fluidized bed reactor comprising a reactive zone. The chemical reactor system may further comprise an internal settling zone in communication with the reactive zone. The internal settling zone may be located in the top region of the chemical reactor system. The internal settling zone may comprise an opening at the bottom of the internal settling zone adapted for the communication with the reactive zone. The internal settling zone may comprise an outlet adapted for removal of effluent from the internal settling zone. The reactive zone may comprise a conduit. The conduit may be central with respect to the reactive zone. The treatment system may be a multi-stage system comprising an additional reactor system. The treatment system may further comprise vessel comprising a sulfide ion generator. The reactive zone may comprise a reactive solid and a secondary reagent. The reactive solid may comprise iron. The secondary reagent may comprise ferrous iron. The reactive solid may further comprise an iron oxide mineral, as described herein. The iron oxide mineral may comprise magnetite. The treatment system may further comprise an additive reagent, as described herein. The additive reagent may comprise sulfide ion. The treatment system may further comprise an additive solid. The additive solid may comprise an iron sulfide compound. The fluid stream may comprise a waste steam. The fluid stream may comprise a contaminant (e.g., a toxic material). The toxic material may be selected from the group consisting of selenium, arsenic, mercury, aluminum, antimony, beryllium, thallium, chromium, cobalt, lead, cadmium, silver, zinc, nickel, molybdenum, nitrates, bromates, iodates, periodates, and borates.

According to some embodiments, a process for treating a fluid stream comprises feeding the fluid stream to a treatment system employing embodiments described herein. The process may further comprise removing a toxic material from the fluid stream. The removing may comprise: (a) at least one of reacting, adsorbing, and precipitating the toxic material from the fluid stream so as to form removable solids in treated effluent; and (b) separating the removable solids from the fluid stream. The removable solids may comprise at least a portion of the toxic material encapsulated in the removable solids.

According to some embodiments, a process for treating wastewater comprising a toxic material is provided, comprising exposing the wastewater to a reactive material system so as to remove toxic material from the wastewater, wherein the reactive material system comprises zero-valent iron particles and ferrous iron, wherein the exposing comprises: (a) at least one of reacting, adsorbing, and precipitating the toxic material from the wastewater so as to form removable solids in treated wastewater, wherein the removable solids comprise at least a portion of the toxic material encapsulated in at least a portion of an iron oxide mineral derived from the reactive material system; and (b) separating the removable solids from the treated wastewater. The removable solids may further comprise precipitated sulfide.

According to some embodiments, an improved fluidized bed apparatus for wastewater treatment comprises a fluidized bed, a fluidized reactive zone, an internal solid/liquid separating zone in fluid communication with said reactive zone, an aerating basin, and a settling basin. The apparatus may further comprise control and metering systems for monitoring and manipulating chemical processes within said reactor. The apparatus may further comprise a sand filtration bed. The apparatus may further comprise a central conduit in the fluidized bed reactor to promote convective fluid flow enhancing mixing. The apparatus may further comprise a motorized stirrer in conjunction with said central conduit configured so fluid flow within the conduit is down and flow within the fluidized bed reactor outside the conduit is up. The apparatus may further comprise at least one additional fluidized bed apparatus configured as stages in series with said first apparatus. The apparatus may further comprise control and metering systems for monitoring and manipulating chemical processes run within said reactors. According to some embodiments, chemical process conditions within different stages are varied to optimize results. According to some embodiments, the first stage is optimized for dissolved silica removal. The apparatus may further comprise a sulfide ion generator in fluid communication with the fluidized reactive zone. The fluidized reactive zone comprises a composition comprising zero-valent iron, iron oxide mineral, and ferrous iron. The fluidized reactive zone may further comprise sulfide ion. Alternatively or in combination, the fluidized reactive zone may further comprise an iron sulfide compound.

According to some embodiments, a composition (e.g., a composite) for treating a fluid stream comprises zero-valent iron, iron oxide mineral, and ferrous iron. According to some embodiments, a chemical system for treating a fluid stream comprises zero-valent iron, iron oxide mineral, ferrous iron, and an additive. The additive may comprise ionic sulfide. Alternatively or in combination, the additive may comprise an additive solid. The additive solid may comprise an iron sulfide compound. Alternatively or in combination, the additive solid may comprise maghemite. The additive solid may be present as particle comprising the additive solid, where the additive solid particles are distinct from the composite. The composite may be present as particles of the composite. The chemical system may comprise composite particles, each comprising a core and a layer layered on the core, where the cores comprise the zero-valent iron, and the layers comprise a first portion of an iron oxide mineral. The chemical system may further comprise secondary particles comprising a second portion of an iron oxide mineral.

According to some embodiments, a composite comprises zero-valent iron and a predetermined activating material selected so as to increase the activity of the composite for removal of a contaminant. The contaminant may be a toxic material. The toxic material may be selected from the group consisting of selenium, arsenic, mercury, aluminum, antimony, beryllium, thallium, chromium, cobalt, lead, cadmium, silver, zinc, nickel, molybdenum, nitrates, bromates, iodates, periodates, and borates. Alternatively or in combination, the contaminant may be dissolved silica. The activating material may be adapted to electronically mediate an electrochemical reaction between the zero-valent iron and the contaminant so as to facilitate precipitation of the contaminant. The activating material may be selected from the group consisting of zero-valent iron promoters, semiconductors, and combinations thereof. The activating material may comprise an iron oxide mineral. The iron oxide mineral may comprise magnetite. The composite may comprise a particle, having a core comprising zero-valent iron and a layer over the core, wherein the layer comprises the activating material. The composite particle may further comprise a second layer over the first layer. The second layer may comprise a plurality of fingers extending from the first layer. The second layer may comprise a non-activating material. The non-activating material may comprise lepidocrocite.

According to some embodiments, a reactor system for removing a contaminant from a liquid stream comprises a fluidized bed reactor configured for increasing the efficiency of removal of the contaminant from the liquid stream. The contaminant may be a toxic material. The toxic material may be selected from the group consisting of selenium, arsenic, mercury, aluminum, antimony, beryllium, thallium, chromium, cobalt, lead, cadmium, silver, zinc, nickel, molybdenum, nitrates, bromates, iodates, periodates, and borates. Alternatively, or in combination, the contaminant may be dissolved silica. The fluidized bed reactor may comprise an internal settling zone. Alternatively, or in combination, the fluidized bed reactor may comprise a central conduit.

According to some embodiments, a composite is made by a method comprising: (a) oxidizing a portion of zero-valent iron so as to produce an intermediate material; and (b) exposing the intermediate material to ferrous ion so as to produce a composite comprising the remaining zero-valent iron and an activating material. Step (b) may comprise transforming the intermediate material into the activating material. Step (a) may comprise providing a dissolved oxidant. The dissolved oxidant may be selected from the group consisting of oxygen, nitrate, nitrite, selenate, hypochlorite, hydrogen peroxide, iodate, periodate, bromate, and the like, and combinations thereof. The intermediate material may comprise an iron corrosion product. The activating material may be adapted to electronically mediate an electrochemical reaction between the zero-valent iron and the contaminant so as to facilitate precipitation of the contaminant. The activating material may be selected from the group consisting of zero-valent iron promoters, semiconductors, and combinations thereof. The activating material may comprise an iron oxide mineral. The iron oxide mineral may comprise magnetite. The activating material may increase the activity of the composite for removal of a contaminant in comparison with zero-valent iron. The contaminant may comprise a toxic material. The toxic material may be selected from the group consisting of selenium, arsenic, mercury, aluminum, antimony, beryllium, thallium, chromium, cobalt, lead, cadmium, silver, zinc, nickel, molybdenum, nitrates, bromates, iodates, periodates, and borates. The contaminant may comprise dissolved silica. The composite may comprise a particle, having a core comprising the zero-valent iron and a layer over the core, wherein the layer comprises the activating material.

According to some embodiments, a process for activating zero-valent iron for removing a contaminant from a liquid stream comprises: (a) oxidizing a portion of the zero-valent iron so as to produce an intermediate material; and (b) exposing the intermediate material to ferrous ion so as to produce a composite comprising the remaining zero-valent iron and an activating material. The contaminant may be a toxic material. The toxic material may be selected from the group consisting of selenium, arsenic, mercury, aluminum, antimony, beryllium, thallium, chromium, cobalt, lead, cadmium, silver, zinc, nickel, molybdenum, nitrates, bromates, iodates, periodates, and borates. Alternatively, or in combination, the contaminant may be dissolved silica. Step (b) may comprise transforming the intermediate material into the activating material. Step (a) may comprise providing a dissolved oxidant. The dissolved oxidant may be selected from the group consisting of oxygen, nitrate, nitrite, selenate, hypochlorite, hydrogen peroxide, iodate, periodate, bromate, and the like, and combinations thereof. The intermediate material may comprise an iron corrosion product. The activating material may be adapted to electronically mediate an electrochemical reaction between the zero-valent iron and the contaminant so as to facilitate precipitation of the contaminant. The activating material may be selected from the group consisting of zero-valent iron promoters, semi-conductors, and combinations thereof. The activating material may comprise an iron oxide mineral. The iron oxide mineral may comprise magnetite.

According to some embodiments, a process for removing a contaminant from an influent stream comprises contacting the influent stream with a composite comprising zero-valent iron and an activating material under removal-promoting conditions so as to produce an effluent stream reduced in concentration of contaminant with respect to the influent stream. The contaminant may be a toxic material. The toxic material may be selected from the group consisting of selenium, arsenic, mercury, aluminum, antimony, beryllium, thallium, chromium, cobalt, lead, cadmium, silver, zinc, nickel, molybdenum, nitrates, bromates, iodates, periodates, and borates. Alternatively, or in combination, the contaminant may be dissolved silica. The reduction in contaminant concentration may be greater than 70%. The reduction in contaminant concentration may be greater than 80%. The reduction in contaminant concentration may be greater than 90%. The activating material may be adapted to electronically mediate an electrochemical reaction between the zero-valent iron and the contaminant so as to facilitate precipitation of the contaminant. The activating material may be selected from the group consisting of zero-valent iron promoters, semi-conductors, and combinations thereof. The activating material may comprise an iron oxide mineral. The iron oxide mineral may comprise magnetite. The removal-promoting conditions may comprise substantially neutral pH. The pH may be between 6 and 8. The pH may be between 7 and 8. The removal-promoting conditions may comprise ambient temperature.

According to some embodiments, a composite for removing a contaminant from a fluid stream is provided, comprising zero valent iron, an iron oxide mineral, and ferrous iron, wherein the ferrous iron is disposed so as to facilitate maintenance of the iron oxide mineral, and wherein the composite is active for removing the contaminant from the fluid stream. The contaminant may comprise a toxic material. The toxic material may be selected from the group consisting of selenium, arsenic, mercury, aluminum, antimony, beryllium, thallium, chromium, cobalt, lead, cadmium, silver, zinc, nickel, molybdenum, nitrates, bromates, iodates, periodates, and borates. Alternatively or in combination, the toxic material may comprise a phosphate. The contaminant may comprise dissolved silica. The iron oxide mineral may comprise a zero-valent iron promoter with respect to removal of the contaminant from the fluid stream. The iron oxide may be selected from the group consisting of ferrous iron dissolved in the solution and ferrous iron bound to the surface of the iron oxide mineral. The fluid stream may be at near neutral pH. The composite may be made by a method comprising activating the zero valent iron, wherein the activating comprises adding ferrous ion and an oxidant to a solution in which the zero valent iron is suspended, where the adding allows formation of the iron oxide mineral. The adding may comprise pre-treating the zero-valent iron outside the presence of the fluid stream containing the contaminant. The adding may comprise activating the zero-valent iron in situ in the presence of the fluid containing the contaminant.

According to some embodiments, a chemical system comprises a composite according to any one of the above-described embodiments and a solution, where the composite is disposed in the solution, and where the chemical system further comprising an additive disposed in the solution. The additive may be selected from the group consisting of maghemite particles, dissolved ionic sulfide, iron sulfide particles, and combinations thereof. According to some embodiments, a treatment system for treating a fluid stream comprises a chemical system according to any of the above-described embodiments and a reactor, wherein the reactor comprises a reactive zone containing the chemical system. The reactor may further comprise a settling zone in communication with the reactive zone. Alternatively or in combination, the reactor may further comprise a central conduit adapted so as to circulate the chemical system within the reactive zone. The treatment system may comprise a second reactor such that the treatment system comprises a multi-stage system. The first reactor may be optimized for removal of dissolved silica and the second reactor may optimized for removal of the contaminant, wherein the contaminant comprises a toxic material. The treatment system may further comprise a sulfide generator in liquid communication with the reactor. According to some embodiments, a process comprises contacting a composite according to any of the above-described embodiments with a fluid stream in a reaction zone under removal-promoting conditions so as to remove a portion of the contaminant from the aqueous stream so as to produce an effluent. The removal-promoting conditions may comprise near neutral pH. The pH may be between 6 and 8. The removal-promoting conditions may comprise ambient temperature. The removal-promoting conditions may comprise removing dissolved silica so as to produce the effluent and the process may comprise removing a toxic material from the effluent. The removal-promoting conditions may comprise providing a concentration of dissolved ferrous iron in the reaction zone selected so as to optimize activity of the composite for removing the contaminant.

In some embodiments, a step, reagent, reactive solid, base material, supplementary material, secondary reagent, contaminant, reactor, component, etc., may optionally be excluded. In some embodiments, for example, nitrate removal is excluded. In some embodiments, selenocyanate removal is excluded. Further, any embodiment herein reciting "comprising" may optionally recite instead "consist of" or "consist essentially of."

It will be understood that aspects of embodiments provided in this disclosure may be used singly or in combination. Disclosed are materials, compositions, systems, and components that can be used for, can be used in conjunction with, can be used in preparation for, or are products of the disclosed methods and compositions. These and other materials are disclosed herein and it is understood that when combinations, subsets, interactions, groups, etc., of these materials are disclosed that while specific reference of each various individual and collective combinations and permutations of these compounds may not be explicitly disclosed, each is specifically contemplated and described herein. For example, if a method is disclosed and discussed and a number of modifications that can be made are discussed, each and every combination and permutation of the method, and the modifications that are possible, are specifically contemplated unless specifically indicated to the contrary. Likewise, any subset or combination of these is also specifically contemplated and disclosed. This concept applies to all aspects of this disclosure including, but not limited to, steps in methods using the disclosed compositions and components of systems. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed. It is therefore contemplated that any embodiment discussed in this specification can be implemented with respect to any method, composite, reactive solid, supplemental material, secondary reagent, system (e.g., reactive system), activating material, etc., described herein, and vice versa.

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the standard deviation of error for the device or method being employed to determine the value. In any embodiment discussed in the context of a numerical value used in conjunction with the term "about," it is specifically contemplated that the term about can be omitted.

Following long-standing patent law, the words "a" and "an," when used in conjunction with the word "comprising" in the claims or specification, denotes one or more, unless specifically noted.

XI. Additional Examples

EXAMPLE 1

Experimental Results of Using a Hybrid ZVI/$FeO_X$/Fe(II) Reactive System to Treat FGD Wastewater Initial research conducted by the present inventor focused on developing a cost-effective method for removing toxic metals in the flue gas desulfurization (FGD) wastewater generated from wet scrubbers of coal-fired steam electric power plants. Although developed specifically for treating the FGD wastewater with selenium as the main target contaminant, this chemical reactive system is suitable for general application of removing a wide spectrum of toxic metals in fluids, such as industrial wastewater, tail water of mining operations, and contaminated groundwater, and like contaminated aqueous streams containing like contaminants.

According to various experimental embodiments, as shown herein, a single-stage may achieve 90% selenate removal from synthetic wastewater within 4 hr reaction time. A three-stage system, in comparison, may achieve a 96% removal rate from synthetic wastewater. The synthetic wastewater did not contain dissolved silica. As disclosed herein, when the aqueous stream to be treated contains dissolved silica, the present inventor contemplates removal of the dissolved silica in one or more stages before removal of other contaminants such as toxic materials.

The present inventor believes that some exemplary aspects are as follows. A first aspect is discovery of the role of externally-added $Fe^{2+}$ in sustaining the reactivity of Fe(0) with respect to selenate reduction. Externally-added $Fe^{2+}$ may convert less reactive ferric oxide coating on Fe(0) particles into a highly reactive and electron-conducting mixed-valent iron oxide coating (e.g., $Fe_3O_4$) and therefore rejuvenate the passivated Fe(0) surface. A second aspect is discovery that surface-bound Fe(II) on magnetite ($Fe_3O_4$) particles can rapidly reduce selenate to insoluble elemental Se and be removed from the liquid phase. A third aspect is discovery that chemical conditions promote the formation of magnetite ($Fe_3O_4$) as a reaction product from the oxidations of Fe(0) and surface-bound Fe(II) (coupled with reductions of dissolved oxygen, nitrate, and selenate in the water). A fourth aspect is development of a fluidized bed with an internal settling zone and a central conduit that may (a) retain high concentration of $Fe_3O_4$ solid particles and therefore offer abundant reactive surface area that can host surface bound Fe(II)-selenate redox reactions; (b) offer an effective mixing condition so that Fe(0), $Fe_3O_4$, and surface-bound Fe(II) can achieve their respective roles in removing toxic metals; and (c) avoid excess diffusion of oxygen from air into the reactive system so that less Fe(0) and Fe(II) are wasted. A fifth aspect is development of a multiple-stage fluidized bed system that may (a) achieve better toxic metal removal efficiency than a single stirred-tank reactor; (b) mitigate the inhibitive effect of certain impurities in water, such as dissolved silica, on an iron corrosion reaction through the use of first stage so as to maintain high toxic metal removal efficiency in the following stages; (c) control nitrate reduction efficiency to a level of desire; (d) reduce consumption of ferrous salt and Fe(0); and (e) reduce or completely eliminate residual dissolved $Fe^{2+}$.

Bench Scale Tests

Single-Stage Reactor

Three bench-scale fluidized bed reactors were fabricated and operated.

Reactor#1 had an internal settling zone (a compartment on the left side) in which it allows reactive solid to separate from the water and be retained within the fluidized zone. Reactor#2 is identical to Reactor#1. Reactor#1 and #2 both had an operating capacity of 7.2 L and had an internal settling zone (0.5 L) within the reactors.

Reactor#3 was an integral system that had an internal settling zone (far left), an aeration basin (near left), and a second settling basin (right) within the reactor. Reactor#3 had an operating capacity of 10 L. It had a built-in aeration basin (0.6 L) and a built-in final settling basin (see FIGS. 5A and 5B). Peristaltic pumps (Mastedlex® pumps, Cole-Parmer, Illinois) were used to pump in wastewater and the needed chemical reagents. A small aquarium air pump (purchased from Wal-Mart®) was used to provide aeration. A motorized stirrer (max. 27 watt, adjustable rpm 100-2000, three-blade propeller stirrer) was used to provide mixing conditions.

Zero-valent iron powder used in the tests was obtained from Hepure Technology Inc., including H200+ and HC15 (see Batch Test results for more details). Other reagents used in the operation include HCl, $FeCl_2$, and NaOH.

Start Up

Figure 10:
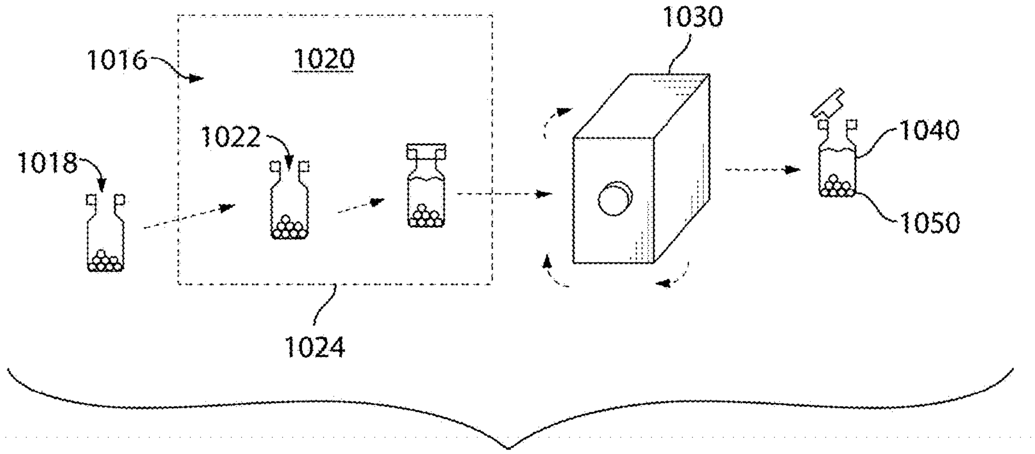
FIG. 10 is schematic of batch testing of ZVI/$FeO_X$/Fe(II) particles.

Contrary to what many experts in ZVI technology believe, fresh ZVI is not necessarily more effective for chemical reduction of selenate. Batch test results confirmed that ZVI grains coated with magnetite could achieve a much higher reaction rate than ZVI grains of a relative fresh surface with little or very thin iron rusts. An exemplary batch testing is shown in FIG. 10. ZVI 1018 (e.g., 0.5 g) is added to a serum vial and placed in anaerobic box 1020, wherein reactant solutions 1016 are fed into the box and deoxygenated before entering the vial as 1022. The vial is sealed and placed in tumbler 1030, rotating at 30 rpm. For each batch test, a dozen or more of serum vial reactors are prepared under the same initial conditions. At specific time intervals (e.g., every 1 hr), one reactor is withdrawn from the tumbler and opened for analysis. After removing the vial, filtrate 1040 may be HPLC or GC-MS tested and pH tested while product 1050 represents removed contaminants.

To improve performance of a ZVI system, a unique start-up process was employed to coat the ZVI powder surface with a more reactive and passivation-resistant, chemically-stable magnetite coating. When a reactor was started with using fresh ZVI powder, it took some time under carefully controlled chemical environment to coat ZVI with a magnetite layer.

Several factors are desirably considered in order to have a rapid and successful start-up for a treatment system. First, the physical chemical properties of iron, such as the size distribution of iron particles, are considered. Both reductions of selenate by ZVI and by surface-bound Fe(II) (s.b. Fe(II)) on magnetite are surface-mediated heterogeneous reactions; therefore, increasing solid-liquid interfacial area would increase overall reaction rate. Fine ZVI powders typically provide larger surface area and therefore achieve higher selenate reduction under comparable conditions. This was confirmed in batch tests. The continuous flow reactor tests were successfully started up five times. It appeared that finer iron particles (dominant size: <45 μm in diameter) may be started up faster than larger particles (dominant size: 45-150 μm in diameter). The chemical purity of ZVI powder was found to not a major factor. In batch and continuous-flow tests, various purities and composition of ZVI powder were used. No major differences were observed among the different iron sources with respect to reaction mechanism and rate for selenate reduction. Over time, the zero-valent iron grains may all be coated with a magnetite coating and in the present of dissolved $Fe^{2+}$, they all may achieve high reactivity for selenate reduction.

As discussed herein, generation of a magnetite coating on a ZVI particle is helpful to the success of a system. Batch and continuous flow reactor tests showed that in order to generate magnetite from iron corrosion reaction, a pH of 6.5 to 7.5 is preferable, adequate dissolved $Fe^{2+}$ that can form s.b. Fe(II) is preferable, and use of appropriate species and concentration of oxidants is preferable. Oxidants may be certain oxyanions such as selenate, nitrate, nitrite, iodate ($IO_3^-$) and periodate ($IO_4^-$) in the wastewater, or other oxidants described herein. Oxidation of ZVI by these oxidants tends to form ferric oxides (e.g., lepidocrocite, γ-FeOOH). The small quantity of ferric oxides may be transformed to magnetite in the presence of surface-bound Fe(II). Dissolved oxygen may also serve as an oxidant to generate magnetite. Low-intensity aeration in the early stage may accelerate the magnetite-coating process. High-intensity aeration should be avoided because it may form a large quantity of ferric oxides even in the presence of dissolved $Fe^{2+}$ and moreover, it will typically waste ZVI. Experiences from five successful start-ups using simulated FGD wastewater indicated that in general, the system will take about one to two weeks for the fresh ZVI to mature; over time, the system will gradually improve before reaching a state of high performance.

As an alternative (and recommended) start-up procedure, a nitrate solution was used (addition of 30 mg/L nitrate-N in tap water, operating hydraulic retention time (HRT)=12 hr) instead of simulated FGD wastewater to feed the system. Nitrate would be completely reduced and in the presence of adequate dissolved $Fe^{2+}$, a high quality (better crystallized and less amorphous, containing less ferric oxides or ferrous hydroxides) magnetite coating may be formed on ZVI particles. Start-up with nitrate solution typically takes only two days.

A general start up procedure and exemplary controlled parameters included one or more of the following:

(1) Selection of ZVI sources. Iron powder (<50 μm) is preferred. Low iron purity and rusty surface in general are not a problem.

(2) Add 80-100 g/L ZVI powder in the fluidized zone. Turn on mixing equipment.

(3) Start-up with FGD wastewater

Feed FGD wastewater at a rate equivalent to HRT=12 hrs. The exact compositions of raw FGD wastewater may vary widely, but in general contains high concentration of $Cl^-$, sulfate, and relative high concentration of nitrate.

Feed $FeCl_2$ solution (0.1 M $FeCl_2$ in 0.005 M HCl solution) at a rate equivalent to 1.5 mmole $Fe^{2+}$ per 1 L wastewater.

Feed HCl at a rate to control the pH in the fluidized zone at 6.8-7.2.

If the FGD wastewater contains limited concentration of nitrate (e.g., below 10 mg/L nitrate-N), then a low intensity aeration in the fluidized bed is recommended to accelerate the formation of a magnetite coating.

Start-Up with Nitrate Solution:

Feed nitrate solution (30 mg/L nitrate-N) at a rate equivalent to HRT=12 hrs.

Feed $FeCl_2$ solution (0.1 M $FeCl_2$ in 0.005 M HCl solution) at a rate equivalent to 1.5 m mole $Fe^{2+}$ per 1 L wastewater.

Adjust HCl solution (0.1 M HCl) feeding rate to control the pH in the fluidized zone at 7.0-7.5.

Normal Operation

Once started up successfully, the system requires only low-level maintenance effort. Routine operation and maintenance may include one or more of:

(a) Monitor the quality of wastewater entering the system, including assessing pH, alkalinity, acidity, and total suspended solid (TSS). Of course, toxic constituents in the raw wastewater should be monitored.

(b) Monitor the pH in the fluidized reactive zone. Performance of the system depends in part on pH. For a single-stage system, pH in the reactive zone is typically maintained within 6.5 to 7.5. Both HCl and $FeCl_2$, for example, may be used to control the system.

(c) Monitor the pH in the aeration basin. Dissolved $Fe^{2+}$ may be oxidized more rapidly at pH>7.0. Formation and settling properties of ferric oxide flocculent depends also on pH. Therefore, it is recommended that aeration basin be operated at pH 7.5-8.0.

(d) Monitor the performance of settling tank and sand filtration bed. The maintenance requirements are no different from those unit processes in typical water or wastewater treatment plants. The settled sludge should be discharged or returned at an appropriate rate to avoid excessive build-up of the reactor.

(e) Excess solid discharge and disposal.

If the raw wastewater contains relative high suspended solids, a pre-settling basin may be needed to reduce TSS in wastewater before entering the system. This may avoid accumulation of inert TSS in the fluidized reactive zone that might dilute the effective ZVI/$FeO_X$ solid concentration.

For a single-stage reactor, the concentration of total solid in the fluidized zone may be maintained between 80 and 120 g/L. Assuming that 30 mg $Fe^{2+}$/L be converted to $Fe_3O_4$ and the reactor is operated at HRT=4 hours (based on test results), it is estimated that it will add 0.25 g/L $FeO_X$ solid per day and therefore will take 160 days for the reactor to increase its solid from 80 g/L to 120 g/L. This estimate conforms to the fact that during a three-month continuous flow test (hydraulic retention time varies between 3 to 12 hours), no solid was discharged from the fluidized bed reactor. ZVI/$FeO_X$ reactive solids are considered mature when the surface of ZVI grains is covered with well crystallized magnetite (dark black color after dry) and a significant presence of discrete magnetite crystalline (may be aggregated into a larger particle due to its strong magnetic property). Unlike typical ZVI powder, matured ZVI/$FeO_X$ reactive solids will not cement easily when settled at the bottle. Therefore, the reactor may be stopped for weeks with no risk of iron powder cementation. That is, the reactor may be stopped and restarted very flexibly without a need to vacate the ZVI/$FeO_X$ mixture from the reactor.

Results

The results demonstrate that a single-stage reactive system alone may effectively remove high concentration of selenate within a relatively short reaction time. A multiple-stage system may further improve the overall performance. Because for most FGD wastewater, Se(VI) concentration will be lower than 5 mg/L used in this test (most typically, 1-2 mg/L), the present inventor estimates that an HRT of less than 4 hours would be sufficient for most applications. Moreover, the reactor is operated at near neutral pH.

Multi-Stage Reactor

The start-up procedure and normal operation requirements described for a single-stage system may be similarly applied for a multi-stage system. Again, it is desirable that nitrate solution be used for rapid start-up. Nitrate solution was also found to be very effective in rejuvenating a fouled system in which the system was accidentally acidified (pH dropped to below 4.0) for a few hours, which might permanently damage iron oxide reactivity and result in extremely poor performance even after returning to normal operation conditions.

In this test, Reactor#1, #2, and #3 was combined in sequence to form a three-stage FBRs treatment system. This system was a 24-liter three-stage ZVI/$FeO_X$/Fe(II) fluidized bed reactor system.

Continuous flow tests were conducted for six months on the bench-scale (24 liter) three state fluidized bed system based on the ZVI/$FeO_X$/Fe(II) technique with high-strength raw FGD wastewater.

The system was demonstrated during a 6 month testing period to be successful, as shown in Table 1.

TABLE 1

| Major Pollutants | Concentration in FGD wastewater | Concentration after treatment | Removal Efficiency |
|---|---|---|---|
| Selenium | 7.8 mg/L $SeO_4^{2-}$—Se | dissolved Se <0.15 mg/L | >98% |
| Mercury | 335 μg/L dissolved Hg | dissolved Hg <0.2 μg/L | >99.9% |
| Arsenic* | 400 μg/L dissolved As(III) and As(V) | dissolved As <0.2 μg/L | >99.9% |
| Nitrate | 26 mg/L nitrate-N | nitrate-N <5.0 mg/L | >80% |
| Boron | 200~600 mg/L dissolved B | N/D | projected to be >70% |

Notes:
*The original raw FGD wastewater contains only less than 0.6 μg/L total dissolved As. To evaluate arsenic treatment effectiveness, 400 μg/L arsenite-As and arsenate-As was added.

Laboratory Tests

This inventor has conducted extensive batch tests in addition to the continuous flow tests to investigate the fundamental chemistry and application issues in the complicated reactive system comprised of Fe(0), dissolved $Fe^{2+}$, various $FeO_X$ in different forms and compositions, dissolved oxygen, simulated FGD wastewater or real FGD wastewater with a very complex matrix of constituents. Settling of reactive solid (black) from fluid (clear) has been observed by the present inventor.

Findings from these tests are summarized as below:

(1) In rigorous anaerobic conditions, selenate (at ppm level concentration) cannot be effective reduced by pure Fe(0) (with fresh surface that contains negligible iron oxides). Only negligible selenate could be reduced. That is, reactivity of Fe(0) will be naturally passivated by the presence of selenate. This explains why previous investigators failed to achieve a sustainable removal when using Fe(0) to reduce selenate.

$$SeO_4^{2-}+2\ Fe^0+2\ H_2O \rightarrow Se^0\downarrow+2\ FeOOH+2\ OH^- \quad \text{(Eq. 1)}$$

Lepidocrocite (γ-FeOOH) forms a passive coating on the surface of Fe(0) particles and therefore inhibits further reaction between Fe(0) and selenate.

(2) In the presence of dissolved oxygen, selenate may be reduced by Fe(0) at a modest rate; however, to sustain the desired selenate-Fe(0) reaction, much of Fe(0) will be wastefully consumed by dissolved oxygen as a result. The implication is that an excessively aerated Fe(0) system may remove selenate, but the process is economically infeasible due to wasteful consumption of Fe(0) by oxygen and generation of large quantity of iron oxide sludge.

(3) Reduction of selenate may be greatly accelerated in the presence of dissolved $Fe^{2+}$ at circum-neutral pH environment. The reaction rate increases as dissolved $Fe^{2+}$ increases. A presence of 0.3 mM dissolved $Fe^{2+}$ may be adequate. At near neutral pH and an anaerobic environment, the reaction will form magnetite as a product.

$$SeO_4^{2-}+2\ Fe^0+Fe^{2+} \rightarrow Se(0)\downarrow+Fe_3O_4 \quad \text{(Eq. 2)}$$

In this reaction, the direct role of $Fe^{2+}$ might be to facilitating the conversion of passive FeOOH to reactive $Fe_3O_4$, thereby greatly accelerating the reaction.

(4) Selenate may be rapidly reduced by s.b.Fe(II) on activated magnetite surface at near neutral or weak acidic pH in the absence of Fe(0).

$$Fe^{2+}(\text{aqueous}) \xrightarrow{Fe_3O_4} s.b.\ Fe^{(II)} + 2H^+ \quad \text{(Eq. 3)}$$

$$SeO_4^{2-} + 9\ s.b.Fe^{(II)} \rightarrow Se(0)\downarrow + 3\ Fe_3O_4 + 2\,OH^- \quad \text{(Eq. 4)}$$

Unlike $Fe^{2+}$ in the equation 2, Fe(II) here serves as a reductant and directly contributes one electron to the reduction of selenate.

(5) Nitrate, which is often present at tens of ppm level in the FGD wastewater, will not inhibit selenate reduction by Fe(0). Indeed, nitrate was found to slightly accelerate selenate reduction by Fe(0). In contrast, reduction of nitrate by Fe(0) will be inhibited by the presence of selenate. In a rigorous anaerobic environment, reduction of nitrate by Fe(0) may occur only after selenate is completely reduced in the system.

(6) Both reductions of nitrate and selenate by Fe(0) will consume certain amount of $Fe^{2+}$. Nitrate reduction consumed 0.75 mM Fe(II)/1.0 mM nitrate; selenate reduction consumed approximately 1.0 mM Fe(II)/1.0 mM selenate.

(7) The complex matrix of constituents in FGD wastewater may affect the selenate reduction rate in a Fe(0)/$FeO_X$/Fe(II) system. Sulfate will slow down the reaction rate several folds. Chloride at a concentration below 800 mg/L does not affect the reaction rate. Even with the interference of high concentrations of chloride and sulfate, the overall reaction rate still remains reasonably fast.

(8) Source of Fe(0). The mechanisms of Fe(0)-selenate reaction will not be altered by the use of difference Fe(0) sources. Tests with different purities of Fe(0) show that Fe(0) purity has no apparent relationship with the achievable reaction rate. There is no obvious advantage from the use of high pure (>99%), little rusted, electrolytic iron powder (Fisher Scientific) over low-grade (95%), industrial iron filings. The size of iron powder may influence the reaction depending on a variety of reaction conditions (e.g., wastewater and contaminant concentrations). In some circumstances, smaller particle size iron powder will provide more reactive surface than coarse iron powder, and smaller particle size iron powder may mature faster and ease system start-up.

Pilot Scale Tests (Prophetic)

The success of the laboratory-scale prototype paved the road for constructing a pilot-scale system and conducting extended field demonstrations to further evaluate, develop, and refine the technology. The present inventor contemplates a pilot-scale treatment system based on a proved laboratory-scale prototype to conduct long-term field tests to further develop the technique and finalize its design for commercialization.

The pilot scale test may involve one or more steps, such as: design and construct a pilot treatment system based on the laboratory prototype; conduct on-site long-term demonstrations in conjunction with further laboratory mechanistic study; collaborate closely with industry and other stakeholders to further refine the system to meet the industrial needs and environmental goals.

The present inventor contemplates an integral treatment system that may treat FGD wastewater at a flow rate of 2 to 5 gallon per minute, which represents about 1% of wastewater expected from a 1,000 megawatt power plant. The pilot system may be mounted on a trailer that is adapted to be hauled to different test sites.

Example 4 below describes field experiments that are a realization of on-site bench-scale continuous-flow treatment demonstration tests.

Industrial Operation (Prophetic)

Based on the bench scale test described above in Example 1, the present inventor estimates that for treating a 500 gpm FGD waste stream from a 1,000 megawatt, an iron-based system will consume per year: 200 to 400 ton of iron chemical (est. bulk price: $1,000 to $2,000/ton); 200 to 400 tons of concentrated HCl; and 50-200 kilowatt electric power consumption. Further, the present inventor estimates that for treating a 500 gpm FGD waste stream from a 1,000 megawatt coal-fired facility, a iron-based (e.g., hybrid ZVI/$FeO_X$/Fe(II)) treatment system will generate per year: 300 to 800 tons of iron oxide (weight in dry mass; laden with toxic metals) solid waste to be disposed.

EXAMPLE 2

Sulfide Generation for Enhancing Toxic Metal Removal in Hybrid Zero-Valent Iron/$FeO_X$/Fe(II) Water Treatment System This example demonstrate use of sulfide generation to provide sulfide ions to further improve the heavy metal removal capability of a hybrid zero-valent iron/$FeO_X$/Fe(II) water treatment system described in Example 1. The hybrid zero-valent iron/$FeO_X$/Fe(II) water treatment system was demonstrated in Example 1 to remove selenium from industrial wastewater (represented by flue gas desulfurization wastewater) by chemically transforming highly soluble selenate-selenium to insoluble elemental or selenide-selenium. The treatment system was also found to be effective in removing significant percentages of most toxic metals and metalloids of major environmental concern. Despite the great success in selenium removal, the hybrid ZVI process may have difficulty in meeting the future EPA guideline for total mercury<12 ppt without further process improvement.

A bench-scale prototype hybrid zero-valent iron/$FeO_X$/Fe (II) treatment system was developed and demonstrated through a continuous-flow field test for treating real FGD wastewater. The removal efficiency for selenate-selenium and total mercury (dissolved $Hg^{2+}$ varied from about 2 ppb to 60 ppb in raw FGD wastewater) was found to be about 99.8% and 99.99%, respectively, with total Se<10 ppb and total Hg<5 ppt in the treated effluent. The prototype also achieved over 97% removal for many other toxic metals including arsenic, lead, chromium, cadmium, vanadium and nickel. Despite the high success of field test, the removal mechanism of the treatment system for toxic metals other than selenium, such as mercury, was not completely understood.

The bench scale test was followed up with the field test to conduct additional laboratory tests (both batch and continuous-flow) to verify the treatment effectiveness of both conventional ZVI and the hybrid ZVI/$FeO_X$/Fe(II) for mercury removal. It was found that both conventional and hybrid ZVI ensured 90% removal of dissolved $Hg^{2+}$ removal in a simpler water matrix (simulated wastewater spiked with $Hg^{2+}$). For example, when using the prototype reactor to treat a Hg-spiked tap water (supplied from groundwater, with various concentration of $Ca^{2+}$, $Mg^{2+}$, $Na^{+}$, $Cl^{-}$, $SO_4^{2-}$, carbonate, dissolved silica, etc.), 12 hr treatment reduced $Hg^{2+}$ from 150 ppb to about 10 to 25 ppb. Extending reaction time from 2 hrs to 24 hrs only marginally improved mercury removal. The 90% removal of mercury was not acceptable to the industry. Similar results were observed when treating DI water spiked with $Hg^{2+}$. Separate batch tests with various combinations of water quality and constituents confirmed that high removal of mercury by ZVI process was not guaranteed.

The high mercury removal observed in the field demonstration may be attributed to certain constituents in the real FGD wastewater. This was confirmed from controlled batch test that compared mercury removal from real FGD wastewater with synthetic (composition known) wastewater. In comparable batch tests, a ZVI reactive system reduced dissolved $Hg^{2+}$ from 153 ppb to below 0.5 ppb when treating real FGD wastewater; in contrast, it only reduced $Hg^{2+}$ from 150 ppb to about 20 ppb when synthetic wastewater was used. A number of factors (pH, nitrate, selenate, and $Cl^{-}$, sulfate, dissolved silica, etc.) were screened. Two most likely constituents in the real FGD water were identified that may be responsible for enhancing $Hg^{2+}$ removal: one is iodate (or periodate), another is phosphate. The iodate (or periodate—the two could not be differentiated with the IC analysis) are present in the FGD wastewater at ppm level. Phosphate also existed in low ppm level. In a continuous-flow test, when the synthetic wastewater (spiked with 150 ppb $Hg^{2+}$) was spiked with 5 ppm iodate and 5 ppm phosphate, significant improvement of mercury removal was observed: the dissolved $Hg^{2+}$ in the treated effluent was lowered from >15 ppb without iodate/phosphate additive to about 0.7 ppb with iodate/phosphate additive.

The presence of both iodate and phosphate in the raw FGD water during the field demonstration may be the main contributing factor for achieving a 99.99% mercury reduction. From previous batch tests, it was demonstrated that iodate or periodate could be rapidly reduced to iodide in a hybrid zero-valent iron/$FeO_X$/Fe(II) system. Therefore, the true effective constituent that enhances mercury removal could be iodide through formation of mercury iodide minerals. Other factors such as trace amount of various metal ions (e.g., $Al^{3+}$) may contribute to enhanced mercury removal through complex co-precipitation process in the presence of high concentration of $FeO_X$ in the hybrid ZVI reactors.

Potential solutions to improve mercury removal of hybrid ZVI systems are as follows. Solution 1 adds a small amount (e.g., 5 mg/L) of iodate/periodate/iodide into the reactor to improve mercury removal in the hybrid ZVI process. Solution 2 adds a small amount (e.g., 5 mg/L) of phosphate into the reactor to improve mercury removal in the hybrid ZVI process. Solution 3 is adding sulfide constituents into the reactor to improve mercury removal in the hybrid ZVI process. Solution 1 and 2 may be easily prepared by using soluble iodide or phosphate salts. Solution 3 may be accomplished by the use of, e.g., organosulfide as additive to the hybrid ZVI reactor. Other sulfide sources are described herein. Use of a standalone sulfide generator is an alternative solution.

Removing toxic metal through sulfide-metal chemistry is desirable in consideration of the characteristics of the hybrid ZVI reactor. First, the hybrid ZVI reactor may provide an anaerobic and neutral pH environment where sulfide ion may play a dedicated role in precipitating mercury and other toxic metals. Although sulfide may be precipitated by ferrous iron, most toxic metal sulfide has a much lower solubility than that of FeS. For example, FeS has a solubility constant of $K_{sp}=8\times10^{-19}$; in comparison, HgS has a solubility constant of $2\times10^{-53}$ and CuS of $8\times10^{-37}$. As such, in the co-presence of these metal ions, sulfide may first be used to form less soluble precipitate like HgS. Once formed, trace amounts of metal sulfides may be assimilated and encapsulated in the bulk of $FeO_X$, which will drive the continued reduction of mercury and other toxic metals through the treatment trains.

To exploit the metal sulfide chemistry with the hybrid ZVI/$FeO_X$/Fe(II) system, different methods were tried.

First Method: Additive Solid

This method involves adding FeS (or $FeS_2$) into the reactor as part of reactive solid to provide adsorption and precipitation sites for mercury. This approach was evaluated in continuous flow reactor tests. It was found that addition of 30 g of FeS (and $FeS_2$ in a second test) into the mixture of 500 g hybrid ZVI/$Fe_3O_4$/Fe(II) only improved mercury removal slightly compared to the ones without adding FeS. The less-than-expected removal improvement is probably attributable to the fact that the hybrid ZVI reactor is operated at near neutral pH and thus the dissolution of FeS is negligible. In addition, in the presence of substantial dissolved Fe(II) and continued precipitation of Fe(II) to form $FeO_X$, any reactive FeS surface suitable for $Hg^{2+}$ adsorption and precipitation might be quickly occupied by fresh Fe(II) precipitation. Therefore, unless the reactor is operated under acidified conditions (e.g., pH<4), adding FeS in a solid powder form will not be able to significantly improve mercury (or other toxic metals) removal. For a multi-stage hybrid ZVI/$FeO_X$/Fe(II) reactor, it is feasible that the first stage reactor could be operated under acidic conditions (e.g., feeding adequate HCl) that the added HCl could be consumed to dissolve both Fe(0) and FeS and produce $Fe^{2+}$ and $S^{2-}$. The produced $Fe^{2+}$ and $S^{2-}$ may be used in the second (and subsequent) stage reactors where the operating conditions may resemble that of a typical hybrid ZVI/$FeO_X$/Fe(II) reactor. The disadvantage is that this modification will consume more ZVI and produce excessive $H_2S$ that may pose a safety danger or result in odor problem.

Second Method: Additive Reagent

As an alternative to adding FeS to promote toxic metal sulfide precipitation, the reactive system may include a standalone sulfide generator (see FIG. 4) to produce small amount of sulfide ions before introducing into the reactor to precipitate toxic metals.

A sulfide generator may be a packed-bed filter column filled with FeS (or $FeS_2$) powder (optionally mixed with sand to improve its porosity and hydraulic conductivity). A low concentration acid (e.g., 0.006 M HCl) is flowed through the column to dissolve FeS and steadily and gradually release a stream of acid leachate rich in sulfide ions to add into the reactor.

In-situ generation of sulfide is generally easier than using $Na_2S$ salt to supply sulfide. $Na_2S$ is highly reactive, dangerous to handle, and highly unstable in atmospheric environment (e.g., it may react with moisture and oxygen). In contrast, FeS is relatively stable under typical environment. The gradual dissolution of FeS by a low concentration of acid may be relatively safely handled.

FIG. 4 shows a flow-chart of the hybrid ZVI/$FeO_X$/Fe(II) prototype treatment system 400 incorporating sulfide generator 450 to improve mercury removal. Referring to FIG. 4, toxic metals were removed as wastewater influent 424 as cascaded through four reactors in series. Sulfide ions 456 were introduced in to Reactor 1 440 by virtue of FeS column 454 as supplied with HCl from input 452. $Fe^{2+}$ as 426, 456, 458, and optionally 460 was added to Reactor 1 440, Reactor 2 442, Reactor 3 444, and optionally Reactor 4 446. Lime 431 was added to aerating basin 416. Final clarifier 418 was employed and the effluent 433 may optionally pass through sand filtration unit 420 to provide treated effluent 434.

Example

Experimental Set-up: hybrid ZVI/$FeO_X$/Fe(II) in two stages (R1 and R2), each 6.0 L effective reactive volume; sulfide generator: 1 in internal diameter×8 in height glass column, filled with 20 g FeS mixed with 75 mL silica sand (grain diameter 0.25-0.42 mm). Sulfide leachate is introduced into R1.

Operating conditions: Wastewater feed solution: simulated wastewater made of tap water spiked with 200 ppb $Hg^{2+}$; flow rate: 16.7 mL/min (or 1 liter per hour); equivalent reaction time=6 hr for each stage reactor (12 hr in total); sulfide generator feed: 5 mM HCl; flow rate: 0.3 mL/min; estimated $S^{2-}$ (including $H_2S$ and $HS^-$) in the leachate=80 mg/L. Equivalent dose per liter wastewater=1.5 mg/L; $Fe^{2+}$ feed: 0.5 mM.

Results

When sulfide generator was operated to add 1.5 mg $S^{2-}$ per 1 liter wastewater, $Hg^{2+}$ concentration in effluent of R1 was below detection limit (0.1 ppb) of AAS-hydride generation method. That is, 99.95% mercury removal may be achieved in a single stage within 6 hr reaction time. Thus, it appears that such high removal was achieved almost instantly in the reactor. A reaction time of 6 hr was not essential. Note that the actual mercury concentration in the effluent might be substantially lower than 0.1 ppb.

In the absence of sulfide generator, dissolved $Hg^{2+}$ concentration was about 20 ppb in the effluent of R1 and >10 ppb in the effluent of R2. That is, the hybrid ZVI/$FeO_X$/Fe (II) only removed about 90% dissolved mercury. The poor additional Hg removal suggests that extending reaction time and stages would not significantly improve Hg removal.

A small amount of sulfide (in this test, 1.5 mg/L) was sufficient for greatly improving mercury removal. The presence of significant concentration of $Fe^{2+}$ did not impede the function of sulfide. The small amount of sulfide did not interfere with reactivity of ZVI in term of selenate reduction.

During the test, there was no noticeable $H_2S$ odor in the R1. The added sulfide was fully consumed (or fixed) in the reactor.

EXAMPLE 3

Treatment of Fluid Streams Containing Dissolved Silica

A bench scale prototype hybrid ZVI/$FeO_X$/Fe(II) system with an effective volume of 20 liters was built. Laboratory and field continuous flow tests were conducted for four months. The system treated 40 liters water of high dissolved silica. Both artificially composited water and real industrial water were tested. The results demonstrated that the reactive system could efficiently reduce dissolved silica in water from 230 mg/L (as $SiO_2$) to below 10 mg/L. It was observed that iron corrosion products accounted for up to 80% of 200 g/L of reactive solid in the reactor. The reactor operated at substantially neutral pH. Conditions included ambient temperature and atmospheric pressure. The process produced limited solid waste.

Removal Efficiency

A single-stage reactor demonstrated high removal efficiency. In particular, over 90% of dissolved silica was removed. In a field demonstration for treating flue gas desulfurization wastewater, a single-stage reactive system, with one reactor, consistently reduced dissolved silica from about 70 mg/L as $SiO_2$ to below 4.0 mg/L within 6 hours. In treating artificially composited water, the single-stage reactor reduced dissolved silica from about 250 mg/L to below 10 mg/L.

In a two stage reactive system, with the first reactor the same as in the one stage system, in the field demonstration for treating flue gas desulfurization wastewater, after passing a second reactor, dissolved silica in the wastewater was further reduced to below 1.0 mg/L.

Materials Consumption

Removal of dissolved silica consumes only about 0.5 mg zero-valent iron and 0.3 mg ferrous iron for each 1 mg of dissolved silica.

pH

Removal was achieved in experiments between pH 7 and 8. Therefore the process required no significant pH adjustment to the water of most industrial applications. This avoids the use of chemicals for increasing pH in pretreatment of a liquid stream before dissolved silica removal. Further, it avoids non-neutral pH driven precipitation of Ca and Mg ions that account for much of excessive waste solids when they are present in treated water.

Temperature

The experiments giving high removal efficiency were conducted at ambient temperature. Ambient temperature is typically 22° C., but it will be understood by one of ordinary skill in the art that ambient temperature may be within a range near that typical value.

Energy

The experiments used a motorized stirrer to provide adequate (not intensive) mixing between the composite solids and water.

Liquid Stream Composition

The process was effective for removing dissolved silica from various water qualities and compositional matrices. For example, high total dissolved salts (including Nat, $Ca^{2+}$, $Mg^{2+}$, $Cl^-$, $SO_4^{2-}$, and $HCO_3^-$ ions) up to 20,000 mg/L was found to barely affect the overall removal efficiency of the system in experiments. Organic matters (such as sugar and acetate) in the water up to 2,000 mg/L did not affect the dissolved silica removed by the process.

Field Testing within a Waste Treatment Process

The high efficiency and reliability of a waste treatment process incorporating dissolved silica removal was demonstrated in a five-week field test conducted with a multi-stage four reactor, 30-liter prototype system. The prototype accepted raw FGD wastewater, reduced all major pollutants of concern, and produced a high-quality effluent. Reactor 1 alone removed over 95% of dissolved silica, from about 70 ppm to below 5 ppm. Reduction of dissolved silica by Reactor 1 aided the function of the other reactors. The multi-stage prototype consistently reduced total selenium, which existed mainly as selenate ion, from about 3,000 μg/L to <7 μg/L. Total mercury was reduced from about 50 μg/L to <0.005 μg/L. Nitrate was reduced from about 25 mg/L to <0.2 mg/L. In addition, arsenic, lead, cadmium, chromium and vanadium were all reduced to sub-ppb level.

The waste treatment process used inexpensive chemicals and produced limited amount of solid waste. The expendable chemical cost for treating 1 $m^3$ of the FGD wastewater is estimated to be less than $0.5. Leaching tests (following the USEPA TCLP method) were conducted to determine the toxicity of the resultant solid waste. The leachate was found to contain <0.1 mg/L of total Se, <0.2 μg/L of total Hg and <0.1 μg/L of total As, all of which are well below the regulatory limits. The solid waste may be treated as non-hazardous waste.

EXAMPLE 4

Field Demonstration of a Hybrid ZVI/$FeO_X$/Fe(II) Reactive System for Treating FGD Wastewater This example illustrates that the hybrid system may be adapted to help industries to meet stringent effluent regulations for toxic metals.

The wet scrubber is becoming more popular as an effective technology for flue gas desulfurization in coal-fired electric power industry. While wet scrubbers may significantly reduce air pollution, wet scrubbers produce waste liquid streams that are laden with various toxic metals including mercury and selenium of various forms.

The field demonstration described in this example illustrates that the hybrid system may provide a high-performing, cost-effective, and reliable technology that is capable of treating flue gas desulfurization (FGD) wastewater to comply with rigorous discharge regulations on toxic metals. For example, the results met a desired reduction level for selenium and mercury of: total Se<50 ppb and total Hg<12 ppt, respectively.

The field demonstration permitted evaluation of the effectiveness of an exemplary hybrid ZVI/$FeO_X$/Fe(II) chemical treatment process for removing toxic metals in the wastewater generated from the FGD processes of coal-fired power plants. The main target pollutants in the field demonstration were dissolved selenium (Se) and mercury (Hg) in the FGD wastewater. Further, the field demonstration permitted evaluations of removal of other contaminants of concern including various trace toxic metals such as arsenic (As), lead (Pb), cadmium (Cd), chromium (Cr), nickel (Ni), vanadium (V), and zinc (Zn); nutrients such as nitrate and phosphate; and boron (B).

General Apparatus, Materials, and Methods

The field demonstration described in this example used a hybrid ZVI/$FeO_X$ treatment system, exemplary of the treatment system shown in FIG. 3. The hybrid ZVI/$FeO_X$/Fe(II) treatment system employed the reactivity of elemental iron to create a highly reactive solid mixture of zero-valent iron particles and a special type of iron oxide for chemical transformation and mineralization of most toxic metals in water. The hybrid system was particularly effective for removing hexavalent selenium. This process employed a special mechanism to reverse the loss of chemical reactivity of zero-valent iron powder due to the formation of passive corrosion coatings on the zero-valent iron surface. The process featured a reactor design adapted to promote and direct the reactive power of the iron corrosion process toward cleaning up various harmful constituents in impaired water. The system was designed to minimize wasteful consumption of zero-valent iron power and thus significantly reduce waste sludge production.

The treatment system included reactor units and post-treatment units. A four-stage continuously stirred tank reactor (CSTR) reactive unit (similar to FIG. 2, with four stages, rather than three), with sequential CSTR stages termed R1, R2, R3, and R4, was used in this field test. Dissolved Se, Hg and other toxic metals and contaminants were transformed and removed in the reactors. The post-treatment consisted of aeration+final clarification+rapid sand filtration, which was used to remove the residual dissolved iron and the suspended solids.

The combined effective volume of four reactors was 30 liters. The effective volumes of R1-R4 were 9.0, 9.0, 6.0, and 6.0 liters, respectively. The influent (FGD wastewater) and chemical reagent solutions were delivered by peristaltic pumps (Masterflex® pumps, Cole-Palmer). The mixing in each reactor was provided by an overhead motorized stirrer. Aeration was provided by a small aeration pump (purchased from a Wal-Mart® store, for household aquarium use).

Three main chemicals used were zero-valent iron, Reagent B, and Reagent C:

- ZVI: The zero-valent iron powder used in this test consisted of various sizes (5-50 microns) and shapes of fine particles (see FIG. 4). The surface of ZVI powder was covered with rust. The purity of Fe(0) was about 95%, where impurities consisted of about 3.5-4.5% carbon, max. 1.5% silicon, and max. 2.5% oxygen. The specific surface area of iron powder (BET surface) was measured as 1.5 $m^2$/g.
- Reagent B to the reactor: Surface regeneration solution (secondary reagent) was an acidified $FeSO_4$ solution (75 mM $Fe^{2+}$ and 3 mM HCl).
- Reagent C to the aerating basin: Solution of 150 mM $NaHCO_3$ and 150 mM $Na_2CO_3$.

The field test lasted for five weeks. The first week was the start-up period, during which the treatment system was optimized and stabilized. At the beginning of the start-up, 400 g fresh ZVI was added to each reactor. To ease and accelerate the start-up at the field site, the iron powders had been pre-conditioned for one week in order to modify their surface composition and enhance their surface reactivity. The partially started-up reactors were sent to field site for use. After the treatment system was re-assembled the first-week's effort involved mainly adjusting flow rates of Reagent B and C to optimize system performance. The flow rate of Reagent B was adjusted between 0.1 and 0.4 L/d. Flow rate of Reagent C was adjusted between 0.2 and 0.6 L/d.

After the start-up (Week 1), the treatment system operated without major accidents or problems. In Week 2, the main outlet of Reactor 1 was clogged, resulting in overflow of unknown amount of the reactive solids from Reactor 1 into Reactor 2. The outlet was cleaned up and the tubing was replaced to restore normal effluent flow. Since the accident caused no significant changes in the overall system performance, no additional measurement was taken to compensate the loss of reactive solid in Reactor 1. The accident in the second week inevitably complicated efforts to estimate ZVI consumption rates in Reactor 1 and 2. A power outage of lasting unknown period might have also occurred during the weekend of second week. The treatment system was operated under more normal conditions during the final three weeks.

Throughout five week test period, raw FGD wastewater was fed at a constant rate of 30 liter/day (or 1.25 liter/hr). The corresponding hydraulic retention time was about 24 hr. During Week 2 to Week 5, Reagent B was pumped at an equal flow rate of 0.3 L/day into each of Reactors 1, 2, and 3. Reagent B was used to maintain reactivity of zero-valent iron and to produce secondary, highly reactive species for removal of toxic metals. Reactor 4 did not receive Reagent B. Reagent C was pumped at a flow rate of 0.5 L/day into the aeration basin. Reagent C was used to neutralize and precipitate the residual dissolved $Fe^{2+}$ in the effluent from reactors.

The prototype system was used to treat raw FGD wastewater that was pretreated only with settling in an equalization tank. A 250 liter tank was used as a feeding tank to store raw FGD wastewater for use of one week. In total, five tanks of wastewater were used. Raw FGD wastewater had an initial pH of 6.7. The pH was slightly increased to about 7.1 to 7.3 by adding NaHCO3 at an amount of 0.06 g/L. The wastewater was highly brackish, containing about 20 g/L total dissolved salts.

Temperature was not controlled during the test. The operating temperature appeared to minor the ambient temperature, which varied from standard room temperature when the windows were closed to outdoor temperature when the windows were open, which was as low as 40° F. in the early morning.

Influent and effluent samples were taken twice a week on Monday and Thursday and submitted for outside analysis of toxic metals. The results from the EPA-certified outside laboratory were used to evaluate system performance in selenium and mercury removal. Additional water samples were collected daily during workdays and transferred to the present inventor's laboratory for supplementary analysis. These results were mainly used to monitor the status of the system and adjust its operation. The present inventor's laboratory also analyzed and characterized iron oxide samples.

Removal of Contaminants

The performance for removal of contaminants was evaluated. Table 2 provides summary results for removal of selected contaminants in treating high-strength raw FGD wastewater.

TABLE 2

| Pollutants | Influent (as total metal) | Effluent | Removal Efficiency |
|---|---|---|---|
| Selenium | 2950 ppb | Total Se <7 ppb | >99.8% |
| Mercury | 22 to 61 ppb | Total Hg <0.005 ppb | >99.99% |
| Arsenic | 6.4 to 10.6 ppb | Total As <0.3 ppb | >97% |
| Cadmium | 45 to 73 ppb | Total Cd <0.3 ppb | >99% |
| Chromium | 25 to 55 ppb | Total Cr <0.6 ppb | >98% |
| Nickel | 231 to 266 ppb | Total Ni <7.0 ppb | >97% |
| Lead | 3.3 ppb | Total Pb <0.08 ppb | >97% |
| Zinc | 901 to 1350 ppb | Total Zn <2.0 ppb | >99.8% |
| Vanadium | 17 to 23 ppb | Total V <0.15 ppb | >99.8% |
| Nitrate | 30 ppm Nitrate-N | Nitrate-N <0.2 ppm | >99% |

Removal of specific contaminants is described below.

Figure 11:
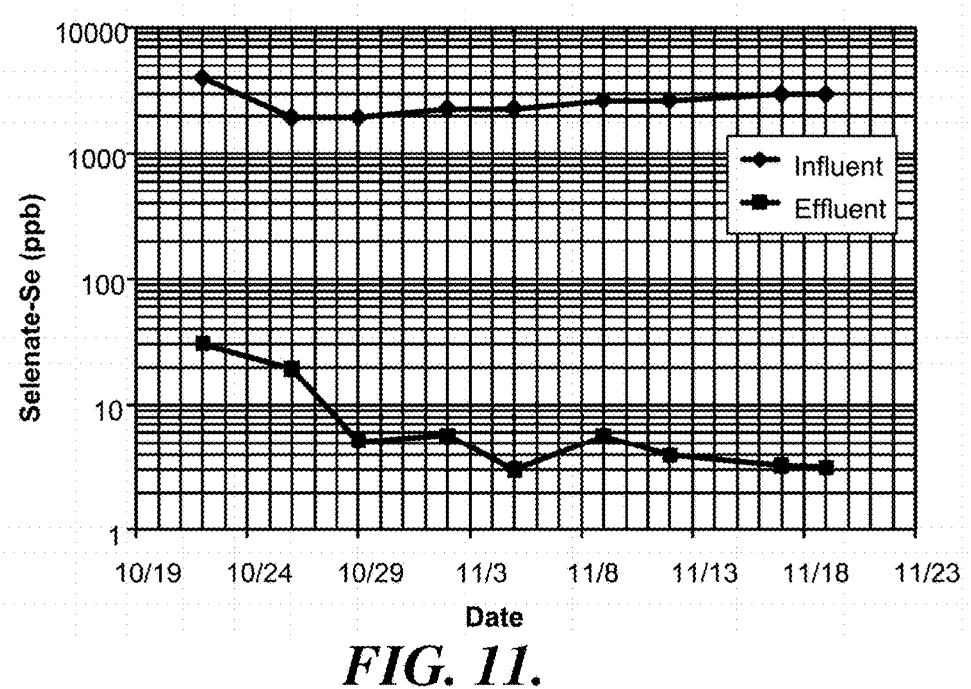
FIG. 11 shows data illustrating removal of selenate-Se from FGD wastewater by a treatment system containing ZVI/$FeO_X$/Fe(II) particles.

Selenium. The treatment system was proven to be capable of effectively removing dissolved selenium in form of selenate at ppm levels (FIG. 11). Removal of selenate is considered the main technical challenge for FGD wastewater treatment. During the entire test period, total selenium in the final effluent had never been higher than 50 ppb. In fact, total selenium in the final effluent was consistently below 10 ppb once the system was successfully started-up. The effluent from Reactor 2 contained less than 25 ppb, which means that over 99% selenate-Se had been removed by the first two stages. For selenium removal, stages 3 and 4 appeared to be redundant, which meant that the treatment time of 24 hr could be significantly shortened. The results demonstrate that the technology can meet the targeted treatment standard (total Se<50 ppb) anticipated by the industry and governments.

Figure 12:
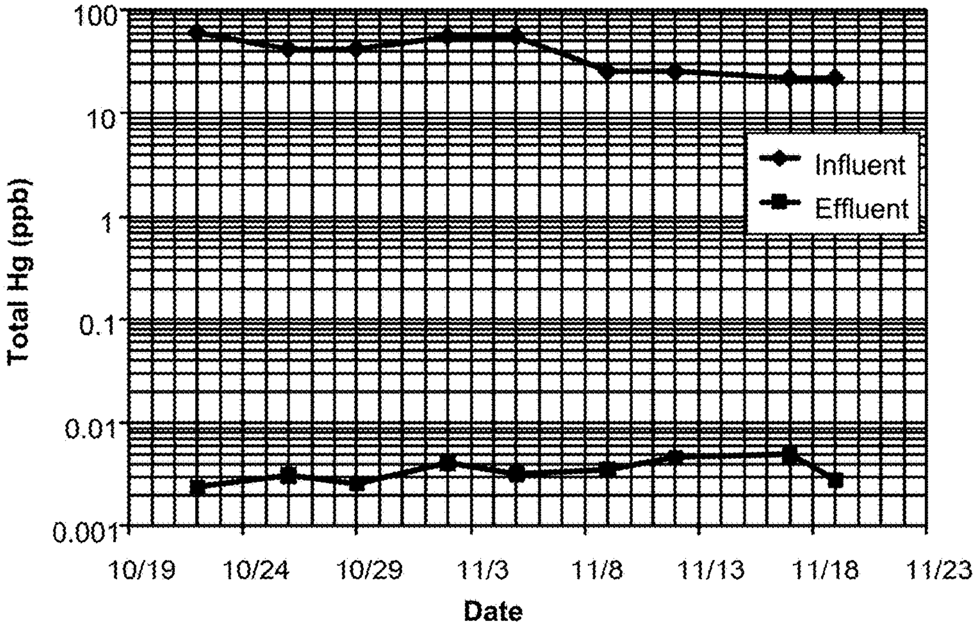
FIG. 12 shows data illustrating removal of total mercury over time from FGD wastewater by a treatment system containing ZVI/$FeO_X$/Fe(II) particles.
Figure 13A:
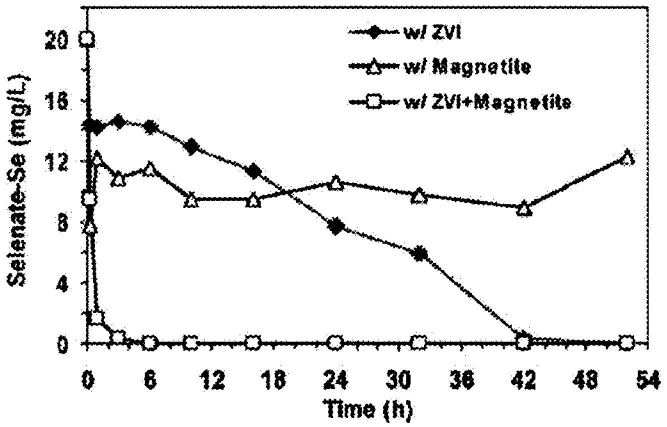
FIGS. 13A-13C show test results on the role of magnetite in a hybrid ZVI/$FeO_X$/Fe(II) system. Test conditions: (1) w/ZVI: 0.1 g Fe(0)+1.0 mM $Fe^{2}$++20 mg/L selenate-Se+anaerobic condition; (2) w/Magnetite: 0.1 g magnetite powder (Fisher black Fe(II)/Fe(III) oxide)+1.0 mM $Fe^{2+}$+20 mg/L selenate-Se+anaerobic condition; (3) w/ZVI+Magnetite: 0.1 g Fe(0)+1.0 mM $Fe^{2}$++20 mg/L selenate-Se+anaerobic condition. In all three tests, magnetite and ZVI was bathed in 1.0 mM $Fe^{2+}$ solution for three days (72 hrs) to activate the reactive surface of solid particles (magnetite in particular). The results show that s.b. Fe(II) on magnetite could rapidly remove significant amount of selenate in a short time. In the presence of both ZVI and magnetite, selenate could be rapidly and completely removed. Compared to the test w/ZVI only, the hybrid system achieves a much faster removal rate than in the absence of magnetite.
Figure 13B:
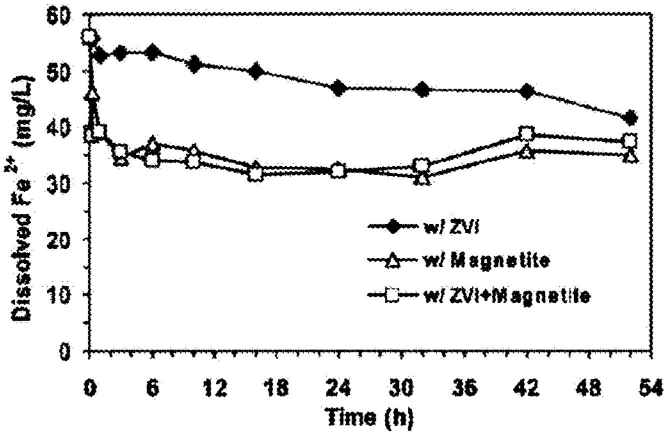
Figure 13C:
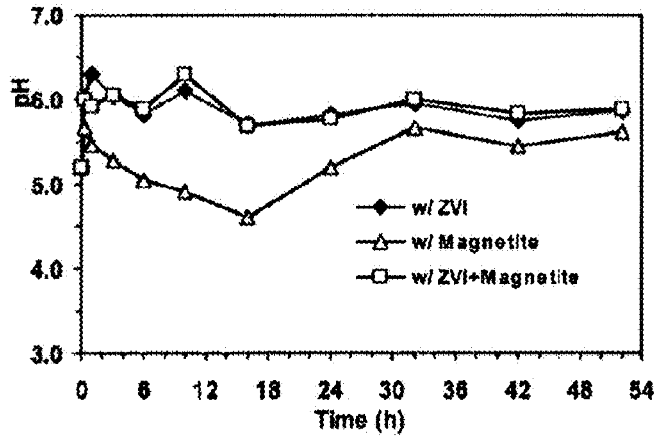
Figure 14A:
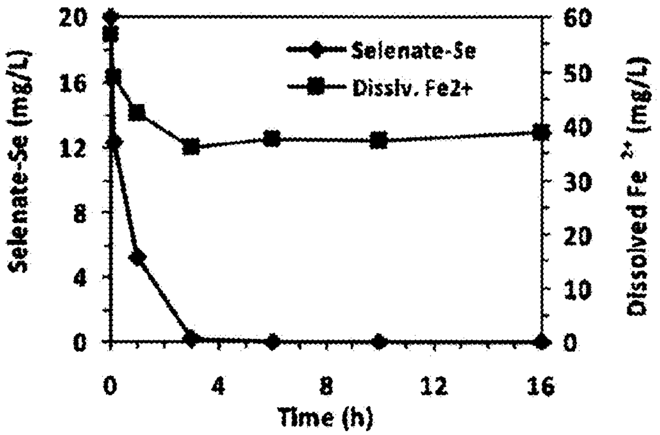
FIGS. 14A-14C show rapid removal of selenate-Se in hydrid ZVI/$Fe_3O_4$/Fe(II) systems. Test conditions: (a) 0.1 g Fe(0)+0.1 g $Fe_3O_4$+1 mM $Fe^{2+}$+anaerobic condition+20 mg/L selenate-Se (added after 3 days) (FIG. 14A); (b) 0.1 g Fe(0)+0.2 g $Fe_3O_4$+1 mM $Fe^{2+}$+ anaerobic conditions (FIG. 14B); (c) 0.2 g Fe(0)+0.1 g $Fe_3O_4$+1 mM $Fe^{2+}$+ anaerobic conditions (FIG. 14C). During the test period, pH in the three tests remained relatively stable between 6.2 and 6.5 in all three tests.
Figure 14B:
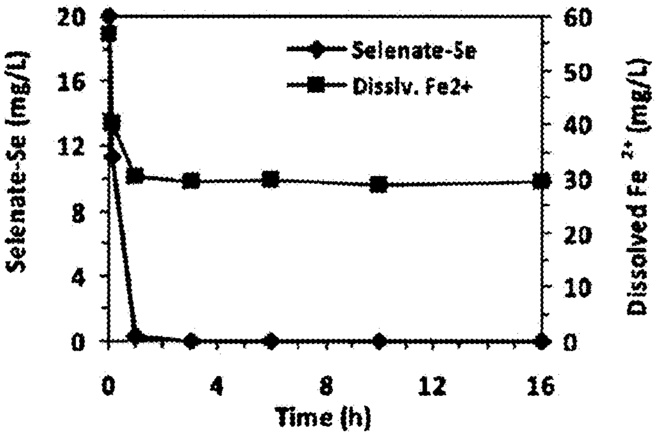
Figure 14C:
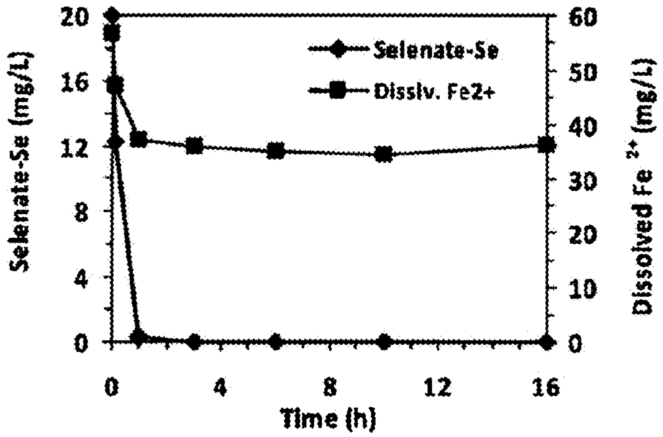

Mercury. The treatment system achieved a remarkable mercury removal efficiency, consistently reducing mercury from tens of parts per billion to below 0.01 ppb. During the entire test period (including the start-up stage), total mercury in the effluent was never above 0.005 ppb (see FIG. 12). The treatment may meet the most stringent wastewater discharge standard for mercury (i.e., 0.012 ppb). Analysis indicated that total mercury was reduced to below 0.1 ppb in the effluent of Reactor 1, which means that over 99.9% total mercury was removed in the first stage. The results suggest that the reaction time for reducing total mercury to below 0.0012 ppb may be significantly less than 24 hr.

Various Other Toxic Metals. The results confirmed that this treatment system may effectively remove a broad spectrum of toxic metals including arsenic, cadmium, chromium, nickel, lead, zinc, and vanadium. The treatment system consistently removed over 97% of these metals.

Copper. Dissolved $Cu^{2+}$ (or Cut) is known to easily react with Fe(0) and be reduced to Cu(0) (solid). Previous laboratory investigation had confirmed that dissolved Cu can be easily removed by a zero-valent iron reactive system. According to outside analysis, however, Cu was the only metal that the system not only did not remove, but actually increased after treatment. This abnormality might be most likely caused by the corrosion of a copper weight block that was attached to the influent end of the reagent tubing to ensure that the intake reached to the bottom of Reagent C tank. Copper appeared to have corroded in alkaline ($Na_2CO_3$) conditions, releasing significant amount of dissolved cupric ions and resulting in increased level of Cu in the final effluent.

Nitrate. The ZVI reactors consistently removed over 99% of nitrate during the test. Nitrate-N was reduced from about 25 mg/L to below 0.2 mg/L. Most nitrate (>99%) had been removed by Reactor 3. The nitrate concentration in the effluent was well below 10 mg/L as N, which is the Maximum Contaminant Level for drinking water. It appears that most of nitrate was converted to ammonium. $NH_4^+$-N concentration increased from negligible to about 20 mg/L in the final effluent. As a result of this transformation, break-point chlorination would be desirable as a post-treatment process to oxidize ammonium to nitrogen gas to complete the removal of nitrogen nutrient for the FGD wastewater. Break-point chlorination is a mature and cost-effective technology that has been widely used in industry to remove low level ammonium in water/wastewater.

Dissolved Silica. Dissolved silica was removed very effectively by the system. Reactor 1 alone removed over 95% of dissolved silica, from about 70 ppm to below 5 ppm. The increase of dissolved silica after Reactor 1 may be caused by dissolution of silica sand in filtration bed or redissolution of polymerized silica in Reactor 3 and 4.

Boron. Boron existed mainly as borate. Based on outside analysis, no significant amount of borate was removed during the treatment. However, previous laboratory tests suggested that the treatment system may achieve a much improved boron removal under certain conditions. For example, increasing operating pH in the reactor to near 8.0 was found to achieve a much better borate removal.

Total Dissolved Solids (TSS). The system didn't reduce or increase total dissolved solids in any significant scale. $Ca^{2+}$ and $Mg^{2+}$ ions in the influent passed the treatment system without much change. Limited removal of $Ca^{2+}$ and $Mg^{2+}$ are desirable because it means that $Ca^{2+}$ and $Mg^{2+}$ will not contribute to excessive solid waste production. There is an obvious increase in $Na^+$ as $NaHCO_3$ and $Na_2CO_3$ are added during the treatment.

Other Impurities. Fluoride and bromide ions are present at a level of about 10 mg/L in the influent. In the effluent, $I^-$ concentration appears to be reduced to below 5 mg/L. Phosphate in the influent was below ppm level and not detected in the treated effluent. In a ZVI/$FeO_X$/Fe(II) system, phosphate is expected to be completely precipitated and removed from the solution. $I^-$ was not present in the influent, but was detected at a level of a few mg/L in the treated effluent. It was likely that iodate ($IO_3^-$) and/or periodate ($IO_4^-$) ions were present in the influent. Previous laboratory tests confirmed that $IO_3^-$ and $IO_4^-$ may be converted to $I^-$ by the treatment system.

Chemicals Consumed

Based on the field test results, for treating one cubic meter of high strength FGD wastewater, the system will consume: 150-250 g Fe(0), which costs about $1.5/kg; 200-300 g iron salt, which costs about $0.2/kg; and <50 g CaO (lime). The total expendable chemical cost is projected to be less than $0.5 per 1 $m^3$ wastewater. For treating a 500 gpm FGD waste stream, the projected expendable chemical cost will be less than $500,000 per year.

Solid Waste Produced

Production of solid waste may be calculated by applying principle of mass balance. Based on the amount of chemicals added into the system and the changes of total dissolved solids in the water, it can be estimated that the system will produce 0.5-1.0 kg waste solid per 1 $m^3$ wastewater treated.

The solid waste was mainly composed of magnetite and polymerized silica. X-ray diffraction spectra of spent solid particles from the four reactors were obtained. The analyses showed that the main compositions of the solids are magnetite ($Fe_3O_4$) crystalline. TEM and EDS micrographs of the reactive solids collected in R1 at the end of test were obtained. The analyses showed that the solids mainly consisted of magnetite crystalline (P2) and polymerized silica (P1). Several other forms of iron oxide minerals like hematite, maghemite, and lepidocrocite may also be present. The well crystallized magnetite and ferric oxides in general are chemically stable.

Leaching tests following the USEPA TCLP method were conducted to determine the toxicity of the resultant solid waste. The leachate was found to contain <0.1 mg/L of total Se, <0.2 μg/L of total Hg and <0.1 μg/L of total As, all of which are well below the regulatory limits. TCLP hazardous limits are 1.0 mg/L for total selenium, 0.2 mg/L for total Hg, and 5.0 mg/L for total As. Concentrations of other toxic metals (lead, zinc, etc.) in the leachate were not analyzed. These results suggest that the solid waste may be treated as non-hazardous waste.

Speciation of Se was analyzed. It was found that elemental selenium accounts for about 60% and selenide for about 40% of total selenium in the solid waste. Thus, results demonstrate that soluble selenate was removed from liquid phase through chemical reduction by ZVI to become insoluble elemental selenium and FeSe.

It is suggested that solid wastes may come from several sources. A first source may be iron oxides formed through a corrosion reaction of ZVI. The corrosion reaction may involve one or more of reduction of nitrate, reduction of dissolved oxygen (carried over in the influent or aeration through open liquid surface in the reactors), reduction of water, and reduction of other oxyanions such as iodate. A second source may be polymerization and precipitation of dissolved silica (possibly in association with $FeO_X$). A third source may be iron oxides formed through precipitation and oxidation of externally added $Fe^{2+}$. A fourth source may be $CaCO_3$ precipitate formed when $Na_2CO_3$ (or CaO) is used to provide alkalinity and maintain pH.

Discussion

Most of nitrate and selenate reduction had been removed in the first and second reactor. Most of toxic metals may have been removed in Reactor 1. In this field test, Reactors 3 and 4 appeared to operate in an idle mode, receiving negligible pollutants from upstream. It may be inferred from this result that hydraulic retention time may be significantly shortened in future tests; e.g., from 24 hrs to 12 hrs. Reagent B added into Reactor 3 was wasted. By the present inventor's estimate, consumption of Reagent B may be halved. In fact, during the start-up stage Reagent B was once provided at a rate of about 0.15 L/d per reactor for two days; the results showed that the system still achieved well acceptable performance.

The system was operated at a rather conservative mode due to the lack of in-situ monitoring measurement. The strategy was also used to reduce the maintenance need and improve flexibility and adaptability of the system in handling variable wastewater qualities. Under operation with in-situ, real-time monitoring and automation, consumption of chemicals and other operating controls may be further optimized.

The example illustrates that the present technology offers many competitive advantages to industry. In particular, simplicity, reliability, and efficiency are advantages of the present technology. More particularly, eight exemplary advantages of the present process for removing a contaminant from an aqueous stream are simplicity, versatility, robustness, low initial capital cost, low operating cost, limited maintenance, limited sludge production, and minimization of risky byproducts. With respect to simplicity, the present process requires no complicated and expensive pretreatments or post-treatments, and it accepts raw wastewater and produces dischargeable effluent in a single integral process. With respect to versatility, the present process removes most toxic metals and metalloids from various industrial waste streams. With respect to robustness, the present process is less susceptible to temperature variation and water quality disturbance and is suitable for treating water with high salts and dissolved organic matter. With respect to low initial capital cost, the present process does not require expensive equipment. With respect to low operating cost, the present process uses common, inexpensive, nontoxic substances (zero-valent iron and iron salts). For example, the expendable material operating cost may be less than $0.5 per cubic meter for treating highly polluted and complicated FGD wastewater. With respect to limited maintenance, the present process facilitates process monitoring and adjustment with standard sensors and operational controls. With respect to limited sludge production, the present process operates at near-neutral pH, which reduces chemical consumption and limits sludge production. With respect to minimization of risky byproducts, the present process involves little chance of forming extremely toxic organic mercury (or selenium) compounds.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

The invention claimed is:

1. A method of removing or reducing the concentration of a contaminant in wastewater, comprising:

(a) contacting wastewater comprising a contaminant with a reactive solid, wherein the reactive solid comprises zero-valent iron and magnetite in contact therewith, and wherein the zero-valent iron from which the reactive solid is prepared has a particle size from about 10 μm to about 40 μm;

(b) introducing an added secondary reagent to the wastewater in contact with the reactive solid, wherein the added secondary reagent is ferrous iron.

2. The method of claim 1 further comprising adding a secondary solid to the wastewater in contact with the reactive solid, wherein the added secondary solid comprises magnetite.

3. The method of claim 2, wherein the secondary solid comprises a plurality of particles.

4. The method of claim 1, wherein the added secondary reagent is continuously introduced.

5. The method of claim 1, wherein the reactive solid comprises a plurality of particles.

6. The method of claim 1, wherein the wastewater is industrial wastewater.

7. The method of claim 1, wherein the wastewater is flue gas desulfurization wastewater.

8. The method of claim 1, wherein the contaminant comprises a metal, metal ion, metalloid, oxyanion, chlorinated organic compound, or a combination thereof.

9. The method of claim 1, wherein the contaminant is selected from an arsenic, aluminum, antimony, beryllium, mercury, selenium, cobalt, lead, cadmium, chromium, silver, zinc, nickel, molybdenum, thallium, vanadium compound or an ion thereof; borates, nitrates, bromates, iodates, and periodates; trichloroethylene; dissolved silica; and combinations thereof.

10. The method of claim 1, wherein the contaminant is selenate.

11. A method of removing or reducing the concentration of a contaminant in wastewater, comprising:

(a) treating zero-valent iron with an oxidant and ferrous iron to provide a reactive solid comprising zero-valent iron and magnetite in contact therewith, wherein the zero-valent iron has a particle size from about 10 μm to about 40 μm; and (b) contacting wastewater comprising a contaminant with the reactive solid and an added secondary reagent, wherein the added secondary reagent is ferrous iron.

12. The method of claim 11, wherein the oxidant is aqueous nitrate.

13. The method of claim 11 further comprising adding a secondary solid to the wastewater in contact with the reactive solid, wherein the added secondary solid comprises magnetite.

14. The method of claim 13, wherein the secondary solid comprises a plurality of particles.

15. The method of claim 11, wherein the added secondary reagent is continuously introduced.

16. The method of claim 11, wherein the reactive solid comprises a plurality of particles.

17. The method of claim 11, wherein the wastewater is industrial wastewater.

18. The method of claim 11, wherein the wastewater is flue gas desulfurization wastewater.

19. The method of claim 11, wherein the contaminant comprises a metal, metal ion, metalloid, oxyanion, chlorinated organic compound, or a combination thereof.

20. The method of claim 11, wherein the contaminant is selected from an arsenic, aluminum, antimony, beryllium, mercury, selenium, cobalt, lead, cadmium, chromium, silver, zinc, nickel, molybdenum, thallium, vanadium compound or an ion thereof; borates, nitrates, bromates, iodates, and periodates; trichloroethylene; dissolved silica; and combinations thereof.

21. The method of claim 11, wherein the contaminant is selenate.

* * * * *

UNITED STATES PATENT AND TRADEMARK OFFICE

CERTIFICATE OF CORRECTION

PATENT NO. : 10,329,179 B2
APPLICATION NO. : 14/836790
DATED : June 25, 2019
INVENTOR(S) : Y. Huang It is certified that error appears in the above-identified patent and that said Letters Patent is hereby corrected as shown below:

On the Title Page

| Column | Line | Error |
|---|---|---|
| (74) Column 2 | Attorney, Agent, or Firm | "Christensen O'Connor Johnson Kindndess PLLC" should read --Christensen O'Connor Johnson Kindness PLLC-- |
| (56) Pg. 3, Column 2 | Refs. Cited (Other Publications, Item 17) | "Degradataion" should read --Degradation-- |
| (56) Pg. 3, Column 2 | Refs. Cited (Other Publications, Item 17) | "Iron Dxide" should read --Iron Oxide-- |
| (56) Pg. 3, Column 2 | Refs. Cited (Other Publications, Item 26) | "communication" should read --Communication-- |

In the Specification

| | | |
|---|---|---|
| 2 | 61 | "Representative the" should read --Representative-- |
| 3 | 43 | "Representative the" should read --Representative-- |

Signed and Sealed this
Fifth Day of November, 2019

Andrei Iancu
*Director of the United States Patent and Trademark Office*

| | | |
|---|---|---|
| 4 | 40 | "amount of" should read --amounts of-- |
| 7 | 13 | "exposed a" should read --exposed to a-- |
| 10 | 23 | "in term of" should read --in terms of-- |
| 10 | 25 | "tends to be" should read --tend to be-- |
| 10 | 56 | "dominated magnetite" should read --dominated by magnetite-- |
| 12 | 2 | "type of" should read --types of-- |
| 12 | 47 | "amount of" should read --amounts of-- |
| 15 | 40 | "of certain" should read --of a certain-- |
| 18 | 49 | "solution may" should read --solution that may-- |
| 20 | 9 | "produce small" should read --produce a small-- |
| 20 | 43 | "amount of" should read --amounts of-- |
| 22 | 49 | "such borates," should read --such as borates,-- |
| 24 | 48 | "providing large" should read --providing a large-- |
| 26 | 23 | "amount of" should read --amounts of-- |
| 27 | 63 | "basin 330" should read --basin 316-- |
| 29 | 26 | "comprise vessel" should read --comprise a vessel-- |
| 35 | 45-46 | Delete "(see FIGS. 5A and 5B)" |
| 36 | 30 | "not a" should read --not to be a-- |
| 38 | 15 | "bottle" should read --bottom-- |
| 39 | 65 | "amount of" should read --amounts of-- |
| 40 | 50 | "ton of" should read --tons of-- |
| 40 | 66 | "demonstrate use" should read --demonstrates use-- |

| | | |
|---|---|---|
| 41 | 50 | "test that" should read --tests that-- |
| 44 | 11 | "in term" should read --in terms-- |
| 47 | 20 | "of second" should read --of the second-- |